(12) United States Patent
Nagatomo et al.

(10) Patent No.: US 9,177,590 B2
(45) Date of Patent: Nov. 3, 2015

(54) RECORDING APPARATUS, RECORDING METHOD, REPRODUCING APPARATUS, AND REPRODUCING METHOD

(71) Applicant: Sony Corporation, Tokyo (JP)

(72) Inventors: Takashi Nagatomo, Kanagawa (JP); Hideyuki Nakamuro, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 5 days.

(21) Appl. No.: 13/847,286

(22) Filed: Mar. 19, 2013

(65) Prior Publication Data

US 2013/0258828 A1  Oct. 3, 2013

(30) Foreign Application Priority Data

Mar. 28, 2012 (JP) ................. 2012-074704

(51) Int. Cl.
| | |
|---|---|
| *G06F 12/00* | (2006.01) |
| *G06F 12/02* | (2006.01) |
| *G11B 5/58* | (2006.01) |
| *G11B 7/0045* | (2006.01) |
| *G11B 20/18* | (2006.01) |
| *G11B 20/10* | (2006.01) |
| *G11B 20/12* | (2006.01) |

(52) U.S. Cl.
CPC ........ *G11B 7/00456* (2013.01); *G11B 20/1889* (2013.01); *G11B 2020/10916* (2013.01); *G11B 2020/1277* (2013.01); *G11B 2020/1873* (2013.01); *G11B 2020/1893* (2013.01); *G11B 2020/1896* (2013.01); *G11B 2220/235* (2013.01)

(58) Field of Classification Search
USPC .............................. 369/53.2, 44.11
See application file for complete search history.

(56) References Cited

U.S. PATENT DOCUMENTS

| | | | |
|---|---|---|---|
| 2006/0007826 A1* | 1/2006 | Hwang et al. ................. | 369/53.2 |
| 2009/0010125 A1* | 1/2009 | Hwang et al. ................. | 369/53.17 |
| 2009/0257329 A1* | 10/2009 | Kato et al. .................... | 369/47.15 |
| 2010/0039910 A1* | 2/2010 | Ko et al. ...................... | 369/47.14 |
| 2010/0135129 A1* | 6/2010 | Mahnad ...................... | 369/44.11 |
| 2011/0197024 A1* | 8/2011 | Thomas ....................... | 711/114 |
| 2011/0264855 A1* | 10/2011 | Kasako ....................... | 711/114 |

FOREIGN PATENT DOCUMENTS

JP      2000-040310      2/2000

* cited by examiner

*Primary Examiner* — Dionne Pendleton
(74) *Attorney, Agent, or Firm* — Hazuki International, LLC

(57) ABSTRACT

There is provided a recording apparatus including a light radiating unit that radiates light to an optical recording medium, a recording unit that performs light emission control of the light radiating unit, and performs recording on the optical recording medium, and a control unit that performs control in a manner that, in a state in which a logical address space, a virtual address space obtained by adding at least a spare area to the logical address space, and a physical address space obtained by adding a buffer area to the virtual address space are defined, a process for replacing a recording area of the optical recording medium with the spare area is executed using a virtual address.

18 Claims, 34 Drawing Sheets

FIG. 6
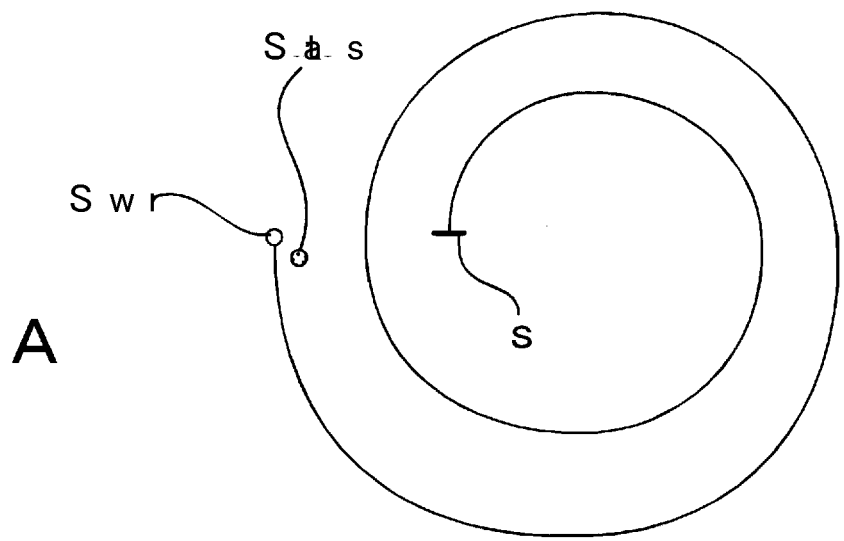
A
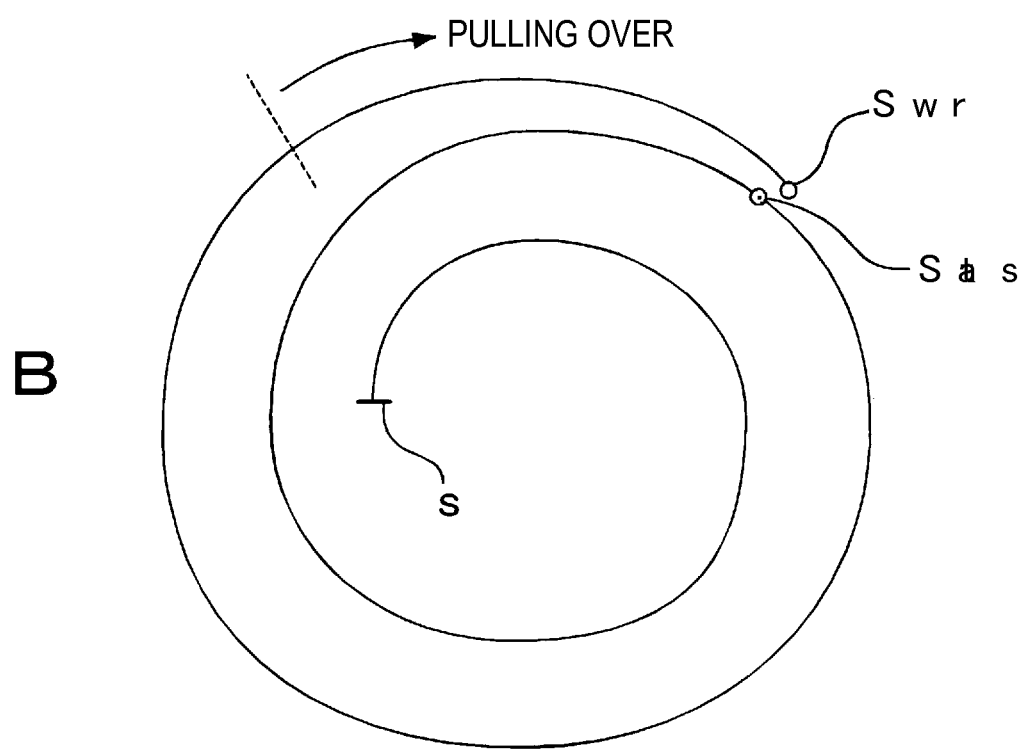
B

| PIT STRING F | — | — | — | — | — | — | — | — | * | — | — | — | — | — | — | ⋮ |
| PIT STRING E | — | — | — | — | — | — | — | * | — | — | — | — | — | — | — | ⋮ |
| PIT STRING D | — | — | — | — | — | — | * | — | — | — | — | — | — | — | — | ⋮ |
| PIT STRING C | — | — | — | — | — | * | — | — | — | — | — | — | — | — | — | ⋮ |
| PIT STRING B | — | — | — | — | * | — | — | — | — | — | — | — | — | — | — | ⋮ |
| PIT STRING A | * | — | — | — | — | — | — | — | — | — | — | — | — | — | — | ⋮ |

\* ON EACH PIT STRING IS 1ch bit

B

4ch bit = 1011 = Data bit 「0」

4ch bit = 1101 = Data bit 「1」

C

12ch bit = 1111 | 1111 | 1011 = Sync1

12ch bit = 1111 | 1111 | 0111 = Sync2

12ch bit = 1111 | 1111 | 1101 = Address Mark

FIG. 19

SSI ENTRY

A

| Byte0/bit7 | Reserve |
|---|---|
| Byte0/bit6~0 & Byte1~3 | Start PSN of Pre Spiral |
| Byte4/bit7 | Reserve |
| Byte4/bit6~0 & Byte5~7 | Start PSN of Spiral |
| Byte8/bit7~1 | Reserve |
| Byte8/bit0 & Byte9~11 | size of Spiral |
| Byte12/bit7~4 | status1 |
| Byte12/bit3~0 | status2 |
| Byte13~15 | size of Slipping Buffer | status1

B

| 0000b | UNUSED |
|---|---|
| 0001b | PRESPIRAL WRITING |
| 0010b | IN USE |
| 0011b | USED |
| OTHERS | Reserve |

FIG. 25

EXAMPLE OF SSI

A

| Start PSN of pre Spiral | Start PSN of Spiral | size of Spiral |
|---|---|---|
| 0x10000 | 0x10220 | 0x7000 |
| 0x18000 | 0x18200 | 0x17000 |
| 0x30000 | 0x0 | ... |

EXAMPLE OF VSN/PSN CONVERSION TABLE

B

| Start VSN of Spiral | Start PSN of pre Spiral | Start PSN of Spiral | size of Spiral |
|---|---|---|---|
| 0x100000 | 0x10000 | 0x10220 | 0x7000 |
| 0x107000 | 0x18000 | 0x18200 | 0x17000 |
| 0x11E000 | 0x30000 | 0x0 | ... |

RECORDING APPARATUS, RECORDING METHOD, REPRODUCING APPARATUS, AND REPRODUCING METHOD

CROSS REFERENCES TO RELATED APPLICATIONS

The present application claims priority to Japanese Priority Patent Application JP 2012-074704 filed in the Japan Patent Office on Mar. 28, 2012, the entire content of which is hereby incorporated by reference.

BACKGROUND

The present disclosure relates to a recording apparatus and a reproducing apparatus that perform recording and reproducing with respect to an optical recording medium, respectively, and a recording method and a reproducing method.

As optical recording media in which a signal is recorded or reproduced by radiation of light, so-called optical disc recording media (hereinafter, simply referred to as optical discs) such as a compact disc (CD), a digital versatile disc (DVD), and a Blu-ray disc (BD: registered trademark) have spread widely.

In an optical disc, for example, a replacement process may be executed in consideration of a defect on the disc.

FIGS. 31A and 31B are diagrams illustrating an example of a replacement process executed in an optical disc according to the related art.

Specifically, FIGS. 31A and 31B are diagrams illustrating an outline of the replacement process using a spare area executed in the BD.

First, it is assumed that a host apparatus of a drive device performing recording and reproducing with respect to an optical disc manages recording areas on the disc by logical addresses based on logical sector numbers (LSNs). The drive device manages the recording areas on the disc by physical sector numbers (PSNs) functioning as physical addresses, in a state in which a physical address space where at least the spare area is added to a logical address space (corresponding to a data area) managed by the LSN is defined.

For example, as illustrated in FIG. 31A, when a defect D occurs in a certain section on the disc, a replacement process for replacing a recording area of data to be recorded on the section with the spare area is executed.

In an example of FIG. 31A, a section of PSN_A and PSN_B becomes a defect section and a recording area of data to be recorded on the section of PSN_A and PSN_B is replaced with the spare area.

In the BD, management relating to the replacement of the recording area with the spare area is performed using a defect list (DFL) (or a temporary defect list (TDFL)) illustrated in FIG. 31B.

Specifically, the defect list is a list in which PSNs of replacement sources and PSNs of replacement destinations are associated with each other, as illustrated in FIG. 31B.

Specifically, when the defect D occurs during recording, an area for replacement is secured in the spare area. For example, as illustrated in FIG. 31A, an area of PSN_X and PSN_Y in the spare area is secured.

In this case, in the defect list, PSN_A and PSN_B to be an occurrence section of the defect D are registered as information of the replacement source PSNs and PSN_X and PSN_Y secured in the spare area are registered as information of the replacement destination PSNs.

The defect list is recorded with respect to the optical disc, which results in appropriately reproducing data of which a recording area is replaced with the spare area with reference to the defect list, when reproducing is performed (for example, refer to Japanese Patent Application Laid-Open No. 2000-40310).

SUMMARY

However, according to the replacement method using the spare area described above, seek with respect to the spare area is generated for each occurrence section of the defect D. Due to the seek, a recording rate may decrease at the time of recording and a reproducing rate may decrease at the time of reproducing.

Therefore, instead of the replacement of the recording area with the area corresponding to the spare area and provided outside the data area, execution of so-called slipping replacement in the data area is considered.

FIGS. 32A and 32B are diagrams illustrating slipping replacement.

FIG. 32A illustrates an example of a physical address space to be set when the slipping replacement is executed and FIG. 32B illustrates an example of an aspect (recording state on a disc) of a physical address space when the slipping replacement is executed.

First, in order to enable the slipping replacement, an address space that is obtained by adding a buffer area for the slipping replacement (slipping buffer in FIG. 32A) to the logical address space based on the LSN as illustrated in FIG. 32A is set as the physical address space.

In this case, an area other than the slipping buffer in the physical address space has the same size as the size of the data area managed by the logical address, that is, has the same recording capacity as the total recording capacity of user data of the optical disc managed by the host apparatus side. If the defect D does not occur and the replacement process is not executed, recording of all data (user data) is completed in only the area other than the slipping buffer and the slipping buffer is not used.

As can be seen from FIGS. 32A and 32B, the slipping replacement is performed by skipping the occurrence section of the defect D in the data area and restarting recording of the remaining data.

FIG. 32B illustrates an example of an aspect (recording state on the disc) of a physical address space after the slipping replacement is executed for each of defects D, due to occurrence of the defects in a plurality of places in the data area, when data corresponding to the capacity of the "data area" illustrated in FIG. 31A is recorded on the optical disc.

In the example of FIG. 32B, when all data to be recorded is recorded, the slipping buffer is used by an amount shown by "Us".

If the slipping replacement is performed, the seek distance for the replacement can be decreased as compared with the case of performing the replacement of the recording area with the spare area and the recording rate and the reproducing rate can be effectively suppressed from decreasing.

However, if a limitation of the data recordable capacity of the optical disc is considered, it may be difficult to sufficiently greatly set the capacity of the slipping buffer. In this case, if the case in which an occurrence rate of the defect D is high as in the optical disc corresponding to an inferior product is assumed, the replacement process may not be executed by using only the slipping buffer.

Therefore, execution of a combination of the slipping replacement and the replacement of the recording area with the spare area is considered.

Specifically, when the slipping buffer is consumed and all data to be recorded is not completely recorded, a recording area of the remaining data is replaced with the spare area.

However, when the replacement process in which the slipping replacement and the replacement of the recording area with the spare area are combined (hereinafter, simply referred to as combination replacement process) is realized, the following problems occur.

FIG. 33 illustrates an example of a relation of a logical address space and a physical address space when an area reserve from the side of a host apparatus is performed in actuality.

Specifically, FIG. 33 illustrates an example of the case in which two continuous recording areas of SRR1 and SRR2 (SRR: Sequential Recording Range) are set from the side of the host apparatus.

According to setting of the two continuous recording areas of the SRR1 and the SRR2, a recording area of the optical disc is divided into a data area for the SRR1 and a data area for the SRR2. In this case, for the replacement of the recording area with the spare area, the spare area is added in the physical address space. For the slipping replacement, in the physical address space, an area functioning as the slipping buffer is added to each of the data area for the SRR1 and the data area for the SSR2.

However, it should be noted that the area division is performed and the spare area is not necessarily disposed at the position adjacent to the continuous recording area, in actuality.

FIGS. 34A and 34B are diagrams illustrating a problem that occurs when the combination replacement is realized.

FIG. 34A illustrates a relation (mainly, a relation of the data area for the SRR1 and the spare area) of the logical address space and the physical address space when the area division illustrated in FIG. 33 is performed.

FIG. 34B illustrates an aspect where a plurality of defects D occur on the disc and the slipping replacement is performed according to the occurrence of the defects, when data of the SRR1 is continuously recorded.

In FIG. 34B, the slipping replacement is performed according to occurrence of a fourth defect D, so that a total section length (total section length of the slipping) of the defect D is more than the capacity of the slipping buffer. In this case, the capacity of the remaining data (shaded portion in FIG. 34B) to be recorded is more than the capacity of the remaining area in the data area for the SRR1. For this reason, even if recording of the remaining data is executed, a portion shown by "Ov" is not recorded.

With respect to the non-recorded data, the replacement of the recording area with the spare area should be performed.

However, as described above, the replacement of the recording area with the spare area in the related art is performed using the defect list in which the replacement source PSN and the replacement destination PSN are associated with each other, which is illustrated in FIG. 31B. That is, the replacement of the recording area with the spare area is performed using the PSN functioning as the physical address.

In this case, in a surplus portion (portion more than the residual capacity in the data area) of the remaining data to be recorded, which is shown by "Ov" in FIG. 34B, there is no PSN to be given to the surplus portion (because the corresponding PSN corresponds to a head portion of the SRR2).

With respect to the data portion to which the PSN may not be given, information as the "replacement source PSN" may not be stored in the defect list. As a result, with respect to the data portion becoming the capacity excess, the replacement of the recording area with the spare area may not be performed.

It is desirable to enable a recording area to be replaced with a spare area, even when there is no physical address to be given to recording data, due to repetition of slipping replacement.

According to an embodiment of the present application, there is provided a recording apparatus including a light radiating unit that radiates light to an optical recording medium, a recording unit that performs light emission control of the light radiating unit, and performs recording on the optical recording medium, and a control unit that performs control in a manner that, in a state in which a logical address space, a virtual address space obtained by adding at least a spare area to the logical address space, and a physical address space obtained by adding a buffer area to the virtual address space are defined, a process for replacing a recording area of the optical recording medium with the spare area is executed using a virtual address.

Further, according to an embodiment of the present application, there is provided a reproducing apparatus including a light radiating unit that radiates light to an optical recording medium in which, in a state in which a logical address space, a virtual address space obtained by adding at least a spare area to the logical address space, and a physical address space obtained by adding a buffer area to the virtual address space are defined, a process for replacing a recording area of the optical recording medium with a spare area is executed using a virtual address, a reproducing unit that reproduces recording information of the optical recording medium, on the basis of a light reception signal with respect to the light radiated to the optical recording medium by the light radiating unit, and a control unit that causes the reproducing unit to execute a reproducing operation on the basis of first relationship information showing a relationship between a logical address and the virtual address, according to a reproducing instruction based on the logical address.

As described above, in the recording apparatus (recording method) according to the embodiment of the present disclosure, the logical address space, the physical address space, and the virtual address space are defined and the replacement of the recording area with the spare area is performed using the virtual address. The management based on the virtual address is further performed, so that the virtual address can be used as the address consumed by only the recording portion of the real data (user data or management information data). In other words, the virtual address can be used as the address that is not consumed in the defect section. By performing the management based on the virtual address, generation of a situation where there is no address to be given to the non-recorded data due to repetition of the slipping replacement can be prevented.

Therefore, according to the recording apparatus according to the embodiment of the present disclosure, the replacement of the recording area of the non-recorded data with the spare area can be appropriately performed.

According to the reproducing apparatus (reproducing method) according to the embodiment of the present disclosure, because reproducing is performed on the basis of the first correspondence relation information showing the correspondence relation of the logical address and the virtual address, the instructed data can be appropriately reproduced, with respect to the optical recording medium in which recording is performed under the management based on the virtual address.

According to the embodiments of the present disclosure described above, even when there is no physical address to be given to recording data, due to repetition of slipping replacement, replacement of a recording area with a spare area can be appropriately performed using a virtual address.

According to the embodiments of the present disclosure described above, instructed data can be appropriately reproduced, with respect to an optical recording medium in which recording is performed under management based on a virtual address.

Additional features and advantages are described herein, and will be apparent from the following Detailed Description and the figures.

BRIEF DESCRIPTION OF THE FIGURES

FIGS. 6A and 6B are diagrams illustrating an example of a write method when recording based on the ATS starts;

FIGS. 11A to 11C are diagrams illustrating an example of recording of specific address information with respect to a reference surface;

FIGS. 19A and 19B are diagrams illustrating spiral management information;

FIGS. 25A and 25B are diagrams illustrating a method of converting a virtual address into a physical address;

DETAILED DESCRIPTION

Figure 1:
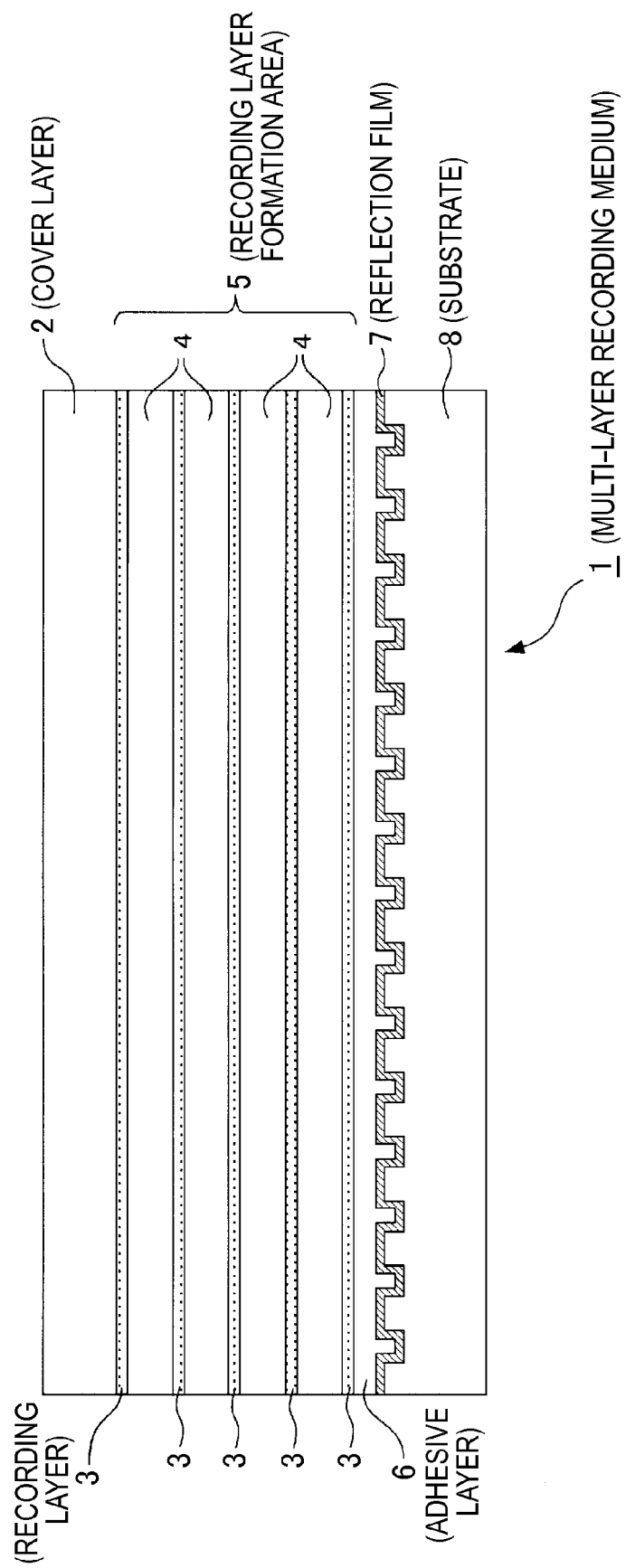
FIG. 1 is a diagram illustrating a cross-sectional structure of a recording medium according to an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description will be made in the order described below.

<1. First Embodiment>
[1-1. Recording Medium according to Embodiment]
[1-2. Position Control Method]
(i. Basic Concept)
(ii. ATS)
(iii. Reference Surface Seek and Correction Seek)
(iv. Write Method of ATS)
(v. ATS+)
(vi. Recording of Prespiral)
[1-3. Any Pitch Spiral Movement Control]
[1-4. Correspondence Relation of Reference Surface Address and Recording Layer Address]
[1-5. Configuration of Recording/Reproducing Apparatus according to Embodiment]
[1-6. Recording Method according to Embodiment]

[1-7. Reproducing Method according to Embodiment]
[1-8. Process Sequence]
<2. Second Embodiment>
<3. Modification>

<1. First Embodiment>

[1-1. Recording Medium According to Embodiment]

FIG. 1 illustrates a cross-sectional structure of a multi-layer recording medium 1 that corresponds to a recording medium according to an embodiment.

As illustrated in FIG. 1, the multi-layer recording medium 1 includes a cover layer 2, a recording layer formation region 5 having a plurality of recording layers 3 formed therein, an adhesive layer 6, a reflection film 7, and a substrate 8, which are sequentially formed from an upper layer side.

In the present disclosure, the "upper layer side" indicates an upper layer side when a surface on which laser light from the side of a recording apparatus (a recording/reproducing apparatus 10) described below is incident is defined as a top surface.

In the multi-layer recording medium 1, the cover layer 2 is formed of a resin and functions as a protection layer of the recording layer formation region 5 formed on a lower layer side thereof.

The recording layer formation region 5 has the plurality of recording layers 3 and intermediate layers 4 inserted between the recording layers 3, as illustrated in FIG. 1. That is, the recording layer formation region 5 is formed by repetitive stacking of the recording layer 3→ the intermediate layer 4→ the recording layer 3→ the intermediate layer 4 . . . → the recording layer 3.

The recording layer 3 is formed of a translucent recording film. The intermediate layer 4 is formed of a resin material such as a thermoplastic resin or an ultraviolet curable resin.

In FIG. 1, the five recording layers 3 are formed in the recording layer formation region 5 to simplify the drawing. However, the number of recording layers is only exemplary and may be a number other than "5".

Hereinafter, the recording layers 3 that are formed in the recording layer formation region 5 may be represented as recording layers L0 to L4 sequentially from the lower layer side.

In the recording layer formation region 5, a position guider associated with formation of grooves or pit strings is not formed in each recording layer 3 as apparent from the drawing. That is, each recording layer 3 is formed in a planar shape.

When the recording layer formation region 5 is formed, a formation process of the position guider for each recording layer that is necessary to manufacture the present multi-layer disc can be removed. As a result, a manufacturing cost and a mass production cost of the multi-layer recording medium 1 can be efficiently decreased.

On the lower layer side of the recording layer formation region 5, the reflection film 7 is formed with the adhesive layer (intermediate layer 6) formed of a necessary adhesive material therebetween.

In the reflection film 7, a position guider to guide a recording/reproducing position is formed. As described above, the formation of the position guider on the reflection film means that the reflection film is formed on an interface on which the position guider is formed.

Specifically, in this case, the position guider is formed with respect to one surface of the substrate 8 in FIG. 1, so that an uneven cross-sectional shape is formed. The reflection film 7 is formed on the surface of the substrate 8 having the uneven cross-sectional shape, so that the position guider is formed on the reflection film 7.

The substrate 8 is formed of a resin such as polycarbonate. The substrate 8 can be formed by injection molding using a stamper to form the uneven cross-sectional shape functioning as the position guider.

In this case, in the present recordable optical disc, address information (absolute position information: radius position information and rotation angle information) showing an absolute position in a direction parallel to an in-plane direction of a recording surface of the multi-layer recording medium 1 can be recorded by the formation of the position guider. For example, the absolute position information can be recorded by a change of a meandering (wobble) period of the grooves, when the position guider is formed of the grooves, and can be recorded by a change of lengths or a formation interval of the pits, when the position guider is formed of the pit strings.

As will be described below, in this example, the position guider is formed of the pit strings.

As described above, the position guider is not formed with respect to the recording layer 3. Control of a recording position on the recording layer 3 is performed on the basis of reflection light from the reflection film 7 provided with the position guider as will be described below.

In this sense, the reflection film 7 (reflection surface) provided with the position guider is represented as a "reference surface Ref".

[1-2. Position Control Method]

(i. Basic Concept)

Figure 2:
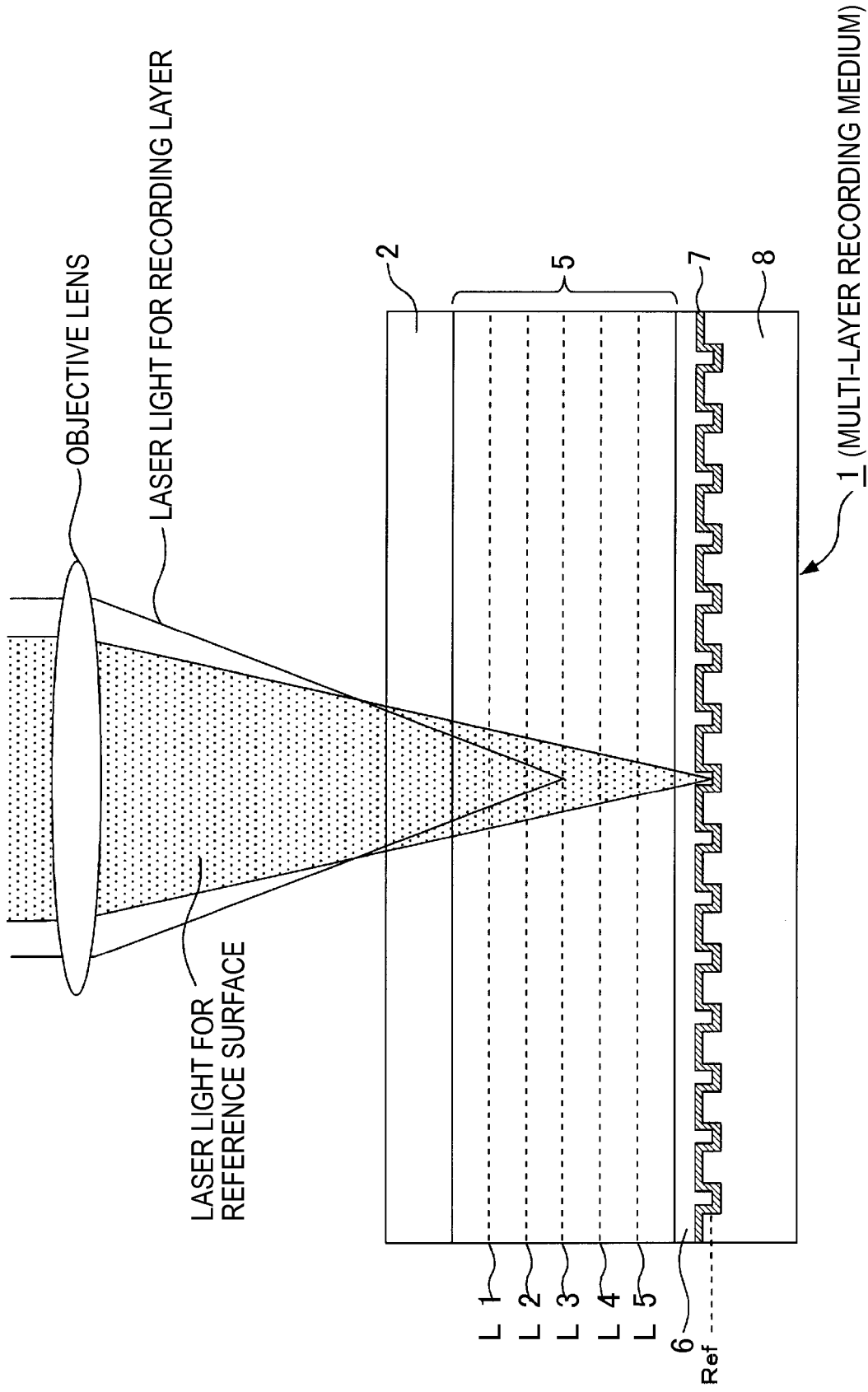
FIG. 2 is a diagram illustrating a position control method using a position guider formed on a reference surface.

FIG. 2 is a diagram illustrating a position control method using the position guider formed on the reference surface Ref.

First, laser light for a recording layer to be radiated to the recording layer 3 is radiated to the multi-layer recording medium 1.

In order to realize position control with respect to the laser light for the recording layer when recording is performed, laser light (hereinafter, referred to as laser light for a reference surface) to perform position control based on the position guider in the reference surface Ref is also radiated to the multi-layer recording medium 1.

Specifically, the laser light for the recording layer and the laser light for the reference surface are radiated to the multi-layer recording medium 1 through a common objective lens (objective lens 20 to be described below), as illustrated in FIG. 2.

When a mark for the recording layer 3 is recorded, the laser light for the reference surface is radiated to be focused on the reference surface Ref and the position control of the objective lens is performed according to a tracking error signal obtained on the basis of reflection light of the laser light (that is, tracking servo is applied).

Thereby, a position of the laser light for the recording layer radiated through the same objective lens in a tracking direction can be controlled together.

Meanwhile, position control when reproducing is performed can be realized as follows.

When the reproducing is performed, because mark strings (that is, recording completed tracks) are formed in the recording layer 3, the tracking servo can be applied to the mark strings by the laser light for the recording layer. That is, the tracking servo at the time of the reproducing can be realized by performing the position control of the objective lens according to the tracking error signal obtained on the basis of the reflection light of the laser light for the recording layer.

When the position control method is adopted, if light of the same wavelength band as the laser light for the recording layer is used as the laser light for the reference surface, with respect to the reference surface Ref from which the reflection light of the laser light for the reference surface is obtained, reflectance with respect to the laser light for the recording layer should be increased. That is, a stray light component may be increased according to the increase in the reflectance and reproducing performance may be remarkably deteriorated.

For this reason, light of different wavelength bands are used as the laser light for the reference surface and the laser light for the recording layer and a reflection film having wavelength selectivity is used as the reflection film 7 forming the reference surface Ref.

As a specific example, a wavelength of the laser light for the recording layer is about 405 nm equal to that in the case of the BD and a wavelength of the laser light for the reference surface is about 650 nm equal to that in the case of the DVD. As the reflection film 7, a wavelength selecting reflection film that selectively reflects light of the same wavelength band as the laser light for the reference surface and transmits or absorbs light of the other wavelength bands is used.

By this configuration, unnecessary reflection light components of the laser light for the recording layer can be prevented from being generated from the reference surface Ref and a superior signal/noise ratio (S/N ratio) can be secured.

Meanwhile, in the multi-layer recording medium 1 in which the position guider such as the grooves is not formed in the recording layer 3, seek with respect to a recording start position at the time of the recording is performed using the address information recorded on the reference surface Ref.

Specifically, when recording is performed on the recording layer 3, a recording start address on the reference surface Ref is specified on the basis of a write command and the seek is performed with respect to the recording start address on the reference surface Ref first by the laser light for the reference surface. According to the completion of the seek, recording using the laser light for the recording layer starts. Thereby, from a position on the recording layer 3 corresponding to the recording start address, recording of data can start.

With respect to reproducing of the information recorded on the recording layer 3 of the multi-layer recording medium 1, first, the seek using the address on the reference surface Ref is performed. Specifically, a seek operation using the laser light for the reference surface is executed with a reproducing start address on the reference surface Ref specified on the basis of a read command as a target.

After the seek based on the address of the reference surface Ref is performed, the tracking servo control with respect to the objective lens is switched from servo control based on the reflection light of the laser light for the reference surface to servo control based on the reflection light of the laser light for the recording layer. Thereby, a beam spot of the laser light for the recording layer can be made to follow a track in the vicinity of the reproducing start position on the recording layer 3.

Then, address information recorded on the recording layer 3 is read so that the beam spot can be moved to a predetermined reproducing start position and data reproducing from the reproducing start position can start.

(ii. ATS)

The basic concept of the position control method to perform recording/reproducing with respect to the multi-layer recording medium 1 in which the position guider is not formed in the recording layer 3 has been mainly described. However, when recording/reproducing is performed with respect to the multi-layer recording medium 1, in actuality, a deviation of information recording positions generated due to a deviation of spot positions between the laser light for the recording layer and the laser light for the reference surface, which will be described below, should be considered.

When the position control method described above is adopted, a deviation of information recording positions in a tracking direction is generated due to a lens shift of the objective lens caused by eccentricity of the multi-layer recording medium 1 or backlash of a slide mechanism of an optical pickup.

The lens shift that is caused by the backlash of the slide mechanism described herein means that the position of the objective lens during the tracking servo control is shifted to absorb the displacement, when the optical pickup is displaced rapidly (momentarily) due to generation of mechanical backlash in the slide mechanism, during the slide servo control.

Figure 3:
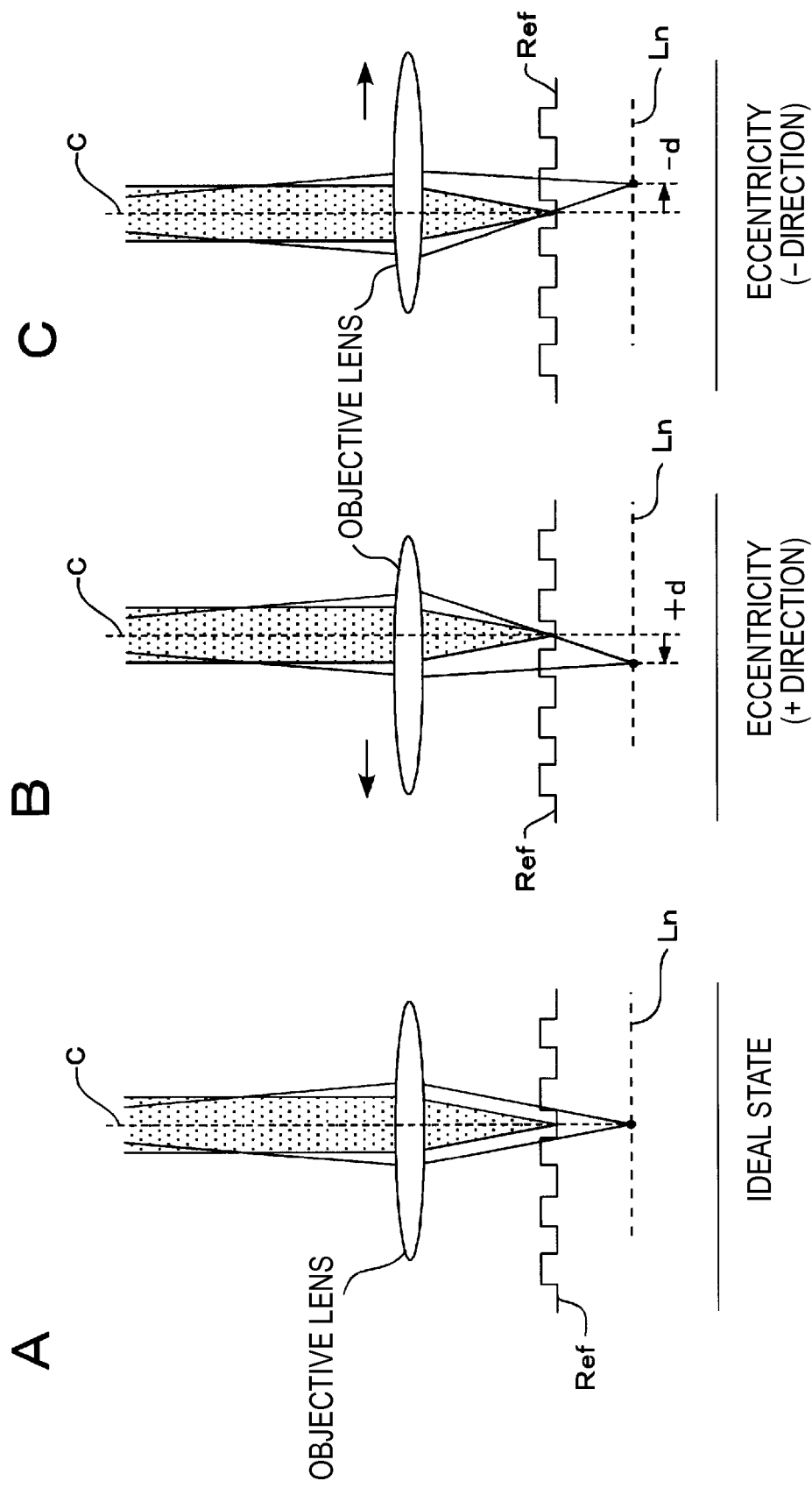
FIGS. 3A to 3C are diagrams illustrating the principle of a deviation of an information recording position being caused by a lens shift of an objective lens.

FIGS. 3A to 3C are diagrams illustrating the principle of a deviation of information recording positions being caused by a lens shift of an objective lens.

FIG. 3A illustrates an ideal state in which the eccentricity of the multi-layer recording medium 1 or the backlash of the slide mechanism is not generated and the lens shift of the objective lens is not generated. FIG. 3B illustrates the case in which a lens shift (referred to as eccentricity of a + direction) of a leftward direction of a plane of paper (for example, outer circumferential direction) is generated, and FIG. 3C illustrates the case in which a lens shift (referred to as eccentricity of a − direction) of a rightward direction of paper (for example, inner circumferential direction) is generated.

FIGS. 3A to 3C illustrate an example of the case in which the reference surface Ref is formed on the upper layer side of the recording layer 3 under the circumstances of illustration. However, a deviation of information recording positions is generated on the same principle even in the case in which the reference surface Ref is formed on the lower layer side of the recording layer 3, similar to FIG. 2 described above.

First, a center axis c in FIGS. 3A to 3C is a center axis set in designing an optical system and in the ideal state illustrated in FIG. 3A, the center of the objective lens is matched with the center axis c.

Meanwhile, when the lens shift of the + direction illustrated in FIG. 3B is generated, the center of the objective lens is shifted in the + direction with respect to the center axis c of the optical system.

At this time, because the laser light (patterned laser beam) for the reference surface is incident on the objective lens by parallel light, a position change of the focus position in a tracking direction is not generated, even when the shift is generated from the center axis c of the objective lens.

Meanwhile, because the laser light (outlined laser beam) for the recording layer is incident on the objective lens by non-parallel light to be focused on the recording layer 3 formed at a depth position different from the reference surface Ref, the focus position (information recording position) of the laser light for the recording layer may change in the + direction by an amount according to a lens shift amount (deviation amount +d in FIG. 3B), when the shift of the objective lens in the + direction is generated.

When the lens shift of the − direction illustrated in FIG. 3C is generated, the information recording position based on the laser light for the recording layer changes in the − direction by the amount according to the lens shift amount (deviation amount −d in FIG. 3C).

As such, in the configuration of the recording/reproducing apparatus with respect to the multi-layer recording medium 1 described above with reference to FIG. 2, that is, the configuration in which the laser light for the recording layer and the laser light for the reference surface are radiated through the common objective lens, the focus position of the laser light for the recording layer and the focus position of the laser light for the reference surface are different from each other, and the tracking servo control of the objective lens is performed such that the focus position of the laser light for the reference surface follows the position guider formed in the reference surface Ref, the information recording position based on the laser light for the recording layer may deviate in the tracking direction, due to the eccentricity of the disc or the backlash of the slide mechanism.

At this time, depending on the magnitude of the eccentricity or setting of the track pitch (formation interval of guide grooves), information recording positions may overlap between adjacent guide grooves. In this case, a recording signal may not be correctly reproduced.

The lens shift of the objective lens has been described as a main factor of the deviation of the information recording position. However, the deviation of the information recording position is also caused by a disc tilt.

As one measure to resolve the problem of the deviation of the information recording position described above, a method of increasing the track pitch to become more than the change amount of the information recording position may be exemplified.

However, this method may cause the recording capacity to decrease due to the increase in the track pitch.

As another method, a method of configuring a system in which a disc may not be attached/detached may be exemplified.

In this case, as a factor of the eccentricity, an error of a disc inner diameter and a clamp diameter with respect to a spindle motor is exemplified. In terms of processing, because it is not possible to make the error of the disc inner diameter and the clamp diameter become zero, the eccentricity is generated. Even if it is possible to make the error of the disc inner diameter and the clamp diameter become zero, the center of a recording signal on the reference surface of the disc and the center of a spindle shaft of the apparatus side are not aligned. For this reason, the eccentricity is generated. Therefore, if the system in which the disc may not be attached/detached is configured, overlapping of the recording positions can be avoided, because an influence by the eccentricity is equalized. Thereby, the track pitch can be decreased and the recording capacity can be increased by the decrease in the track pitch.

However, because the disc may not be exchanged in the above method, only the disc may not be exchanged when a defect of the disc occurs. In addition, data that is recorded by any apparatus may not be read by another apparatus. That is, at this point, convenience is impaired.

Therefore, as an effective method to avoid the problem described above, so-called adjacent track servo (ATS) may be adopted. The ATS has been originally examined as a self-servo track writer (SSTW) in a hard disc drive.

Figure 4:
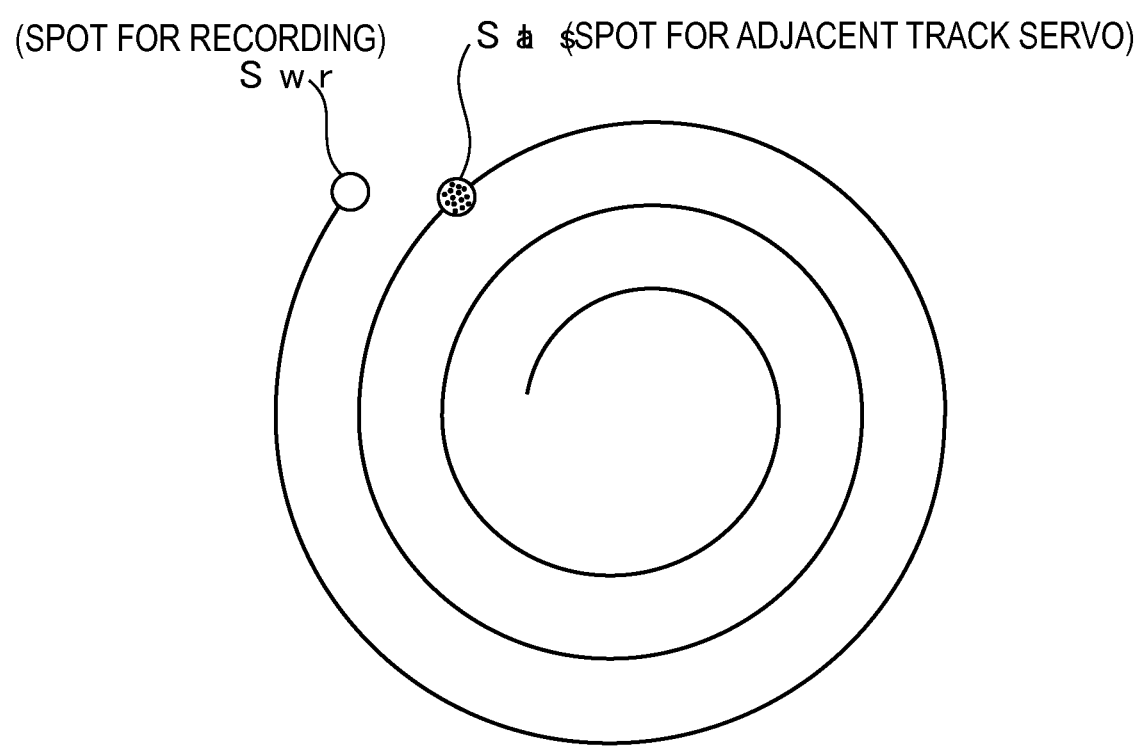
FIG. 4 is a diagram illustrating ATS.

FIG. 4 is a diagram illustrating the ATS.

As illustrated in FIG. 4, in the ATS, a spot Swr for recording and a spot Sats for adjacent track servo are formed on the recording layer 3. The spots Swr and Sats are formed by radiating light beams becoming origins thereof to the recording layer 3 through the common objective lens. At this time, a distance between the spots is fixed to a predetermined length.

In the ATS, the spot Swr for the recording is defined as a preceding spot (that is, the outer circumferential side when an advancement direction of recording is inner circumference→outer circumference) and the spots Sats for the adjacent track servo is defined as a following spot and the tracking servo is applied by the spot Sats for the adjacent track servo, with respect to a mark string formed by the spot Swr for the recording. That is, the tracking servo control of the objective lens is performed such that the spot Sats for the adjacent track servo follows an immediately previous track formed by the spot Swr for the recording.

According to the ATS, because the track pitch can be constant at the distance between the spots S, the tracks can be prevented from being overlapped due to an influence of the eccentricity. That is, it is not necessary to sufficiently increase the track pitch in consideration of the deviation of the information recording position due to the eccentricity or configure the system in which the disc may not be attached/detached, as described above.

Figure 5:
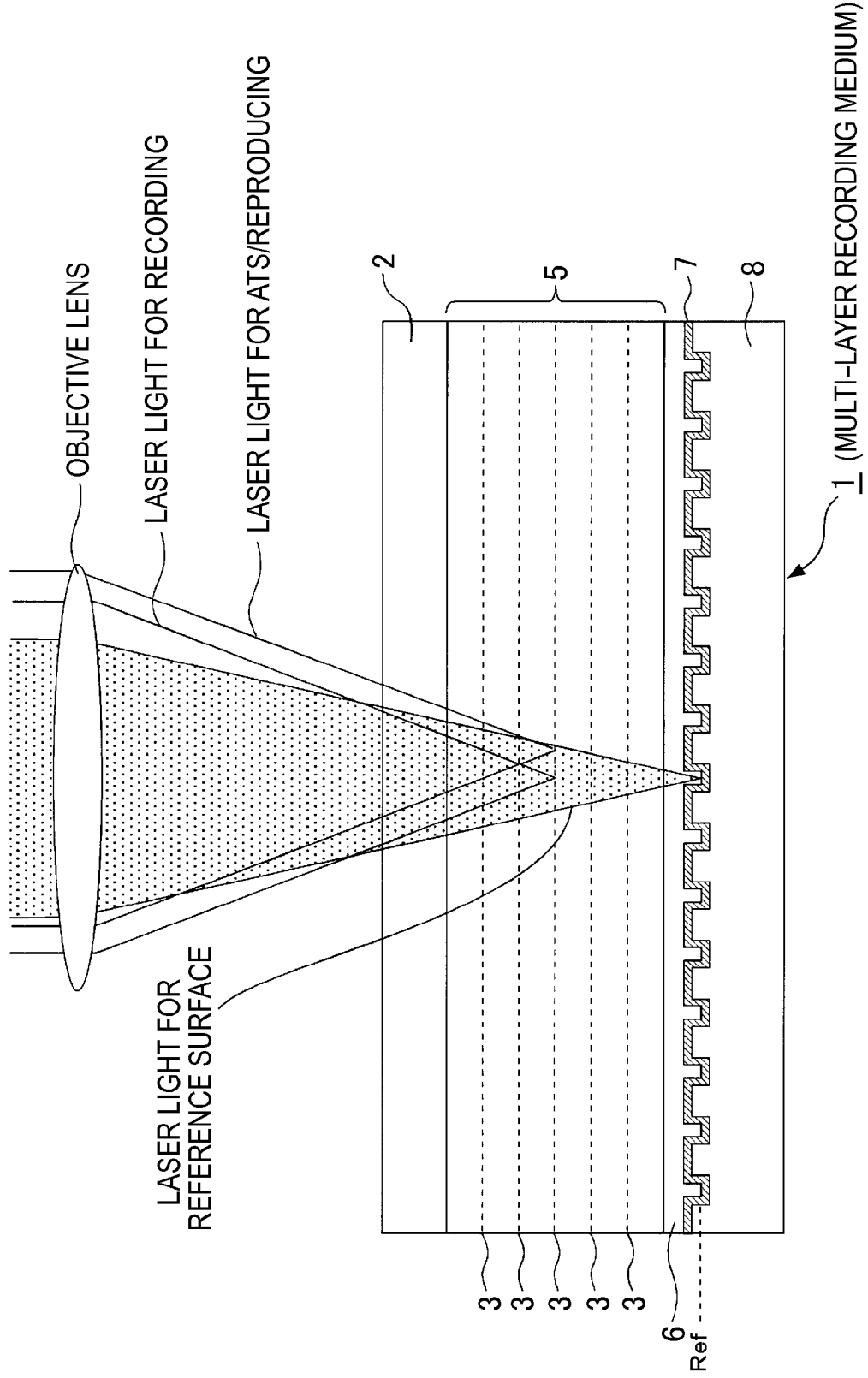
FIG. 5 is a diagram illustrating an example of each laser light to be radiated to a recording medium when the ATS is assumed.

FIG. 5 is a diagram illustrating an example of each laser light to be radiated to a recording medium when the ATS is assumed.

When the ATS is performed, as the laser light for the recording layer radiated to the recording layer 3, laser light for recording (refer to FIG. 5) and laser light different from the laser light for the recording are radiated.

In this case, the laser light for the recording becomes laser light to form the recording spot Swr illustrated in FIG. 4 described above. The "different laser light" becomes laser light that is radiated to form the spot Sats for the adjacent track servo.

In this example, the "different laser light" that is radiated for the adjacent track servo functions as laser light for reproducing. In this sense, the "different laser light" is represented as laser light for ATS/reproducing, as illustrated in FIG. 5.

Even in this case, the laser light for the reference surface is also radiated to the multi-layer recording medium 1 to realize servo control based on the position guider of the reference surface Ref.

The laser light for the reference surface, the laser light for the recording, and the laser light for the ATS/reproducing are radiated to the multi-layer recording medium 1 through the common objective lens, as illustrated in FIG. 5.

(iii. Reference Surface Seek and Correction Seek)

Meanwhile, in the multi-layer recording medium 1 in which the position guider is not formed in the recording layer 3, because a preaddress may not be given to the recording layer 3, seek using an address of the reference surface Ref is performed when recording is performed, as described above. Specifically, when recording starts from a necessary recording start position, as described above, seek based on the laser light for the reference surface is performed with respect to the recording start address on the reference surface Ref specified from a write command. In addition, recording based on the laser light for the recording layer starts according to the completion of the seek.

Even in the reproducing, when a necessary reproducing start position on the recording layer 3 is accessed, the seek using the address of the reference surface Ref is first performed.

In this case, as a recording state of the recording layer 3, a non-recorded area may be embedded between recorded areas. If this recording state is assumed, the reproducing start position may not be appropriately accessed by only the seek of the recording layer 3. For this reason, even when the reproducing is performed, the seek using the reference surface Ref is performed.

By performing the seek, the spot of the laser light for the reproducing can be positioned in the vicinity of the reproducing start position. After the seek is completed, the tracking servo control of the objective lens is switched from the servo control based on the laser light for the reference surface to the tracking servo control based on the laser light for the recording layer. If pull-in of the tracking servo based on the laser light for the recording layer (tracking servo pull-in with respect to the track on the recording layer) is succeeded, address information of the recording layer 3 can be read. Therefore, the seek can be performed with respect to the reproducing start position on the basis of the address information (correction seek).

As can be understood from the above description, the preaddress is not given to the recording layer 3. However, when data recording is performed, the address information is given according to the data recording.

As can be understood from the above description, in the multi-layer recording medium 1, address information (hereinafter, represented as a reference surface address AD_wr) that functions as the preaddress is given to the reference surface Ref. In the recording layer 3, address information (represented as a recording layer address AD_wr) is given (later) according to the data recording.

In this case, because the reference surface address AD_ref is the preaddress, the reference surface address is previously given to the entire disc, regardless of recording/non-recording of the recording layer 3. Meanwhile, the recording layer address AD_wr is given to only an area where data recording has been performed and is not given in a state in which the recording layer 3 is in a non-recording state.

The recording operation is not necessarily performed continuously and in the recording layer 3 in which recording is performed to some degree, a non-recorded area may discretely exist, that is, an area in which the recording layer address AD_wr does not exist may be scattered.

In the method of performing the seek on the reference surface Ref and starting the recording or reproducing, it is assumed that a correspondence relation of an address of the reference surface Ref (hereinafter, represented as reference surface address AD_ref) and address of the recording layer L (hereinafter, represented as a recording layer address AD_wr) is previously determined.

That is, it is assumed that a certain reference surface address AD_ref_x on the reference surface Ref corresponds to a certain recording layer address AD_wr_X on the recording layer 3 and a corresponding recording layer address AD_wr can be specified from the certain reference surface address AD_ref and a corresponding reference surface address AD_ref can be specified from the certain recording layer address AD_wr.

At this time, if a section length corresponding to one address with respect to the reference surface address AD_ref and the recording layer address AD_wr and a length (that is, track pitch) of a turn of a track at each radius position are already known, a correspondence relation of the reference surface address AD_ref and the recording layer address AD_wr can be previously assumed.

Actually, the correspondence relation of the reference surface address AD_ref and the recording layer address AD_wr is not matched with the previously assumed relation (ideal correspondence relation), due to the generation of the deviation of the spot position described above. However, after the reference surface seek is performed, the correction seek (small amount of seek) on the recording layer 3 is performed. Therefore, access on the desired recording layer address AD_wr is realized.

A specific method to calculate a corresponding reference surface address AD_ref from the recording layer address AD_wr will be described in detail later.

(iv. Write Method of ATS)

Meanwhile, recording with respect to the recording layer 3 is performed while the ATS is applied as described above.

As described above, the ATS becomes a method of applying the tracking servo by the spot Sats for the adjacent track servo, with respect to the immediately previous track subjected to recording by the spot Swr for the recording. When the recording based on the ATS starts, existence of a recorded track to apply the ATS is necessary in the recording layer 3.

That is, in the cases other than the case in which data is additionally recorded on a continuation portion of the recorded track, it is necessary to form a track to apply the ATS, by the spot Swr for the recording.

FIGS. 6A and 6B are diagrams illustrating an example of a write method when recording based on the ATS starts.

First, in FIGS. 6A and 6B, a position that is shown by "S" indicates a recording start position based on the spot Swr for the recording. The position S corresponds to a position of the spot Swr for the recording, when the seek based on the reference surface address AD_ref is performed using the laser light for the reference surface as described above to have access to the recording start position.

In order to start the recording based on the ATS, first, as illustrated in FIG. 6A, recording corresponding to the predetermined number of turns is executed from the position S (formation of the track for the guide). The formation of the track for the guide is performed by the spot Swr for the recording, under the tracking servo control by the laser light for the reference surface.

At this time, if recording is performed under the tracking servo control by the laser light for the reference surface, track crossing may be generated during recording of the track for the guide, due to the deviation of the spot position caused by the generation of the eccentricity or the backlash of the thread described above.

Therefore, when recording is performed on the track for the guide, a shift speed of the objective lens with respect to the side of a recording advancement direction is increased by provision of an offset with respect to a servo loop of the tracking servo performed on the basis of the laser light for the reference surface and the track is greatly expanded to the side of the recording advancement direction.

As a result, the pitch of the track for the guide becomes larger than a track pitch of the recording layer 3 (interval of the spot Swr for the recording and the spot Sats for the adjacent track servo in the tracking direction).

After the recording corresponding to the predetermined number of turns described with reference to FIG. 6A, as illustrated in FIG. 6B, the spot Swr for the recording and the spot Sats for the adjacent track servo are shifted to the side opposite to the side of the recording advance direction (for example, inner circumferential side when recording of inner circumference→outer circumference is performed). That is, the spot Swr for the recording and the spot Sats for the adjacent track servo are pulled over gradually toward the side of the recorded track.

The pulling over can be realized by compulsorily shifting the objective lens, by provision of the offset with respect to the servo loop of the tracking servo performed on the basis of the laser light for the reference surface.

By performing the pulling over, the spot Sats for the adjacent track servo is settled within a servo pull-in enabled range with respect to the recorded track and the tracking servo (that is, ATS) based on the spot Ssts for the adjacent track servo can be applied to the recorded track.

Specifically, when the pulling over is performed, a tracking error signal with respect to the laser light for the adjacent track servo is monitored and it is determined whether the spot Sats for the adjacent track servo is settled within the servo pull-in enabled range, from the change of amplitude. When it is determined that the spot Sats for the adjacent track servo is settled within the servo pull-in enabled range, the tracking servo control with respect to the objective lens is switched from the servo control based on the laser light for the reference surface to the servo control based on the laser light for the adjacent track servo. Thereby, recording based on the ATS starts.

(v. ATS+)

As described above, according to the ATS, because the track pitch of the recording layer 3 can be set to be constant, reproducing disabling of recording information can be prevented from being generated due to the track crossing.

Figure 7:
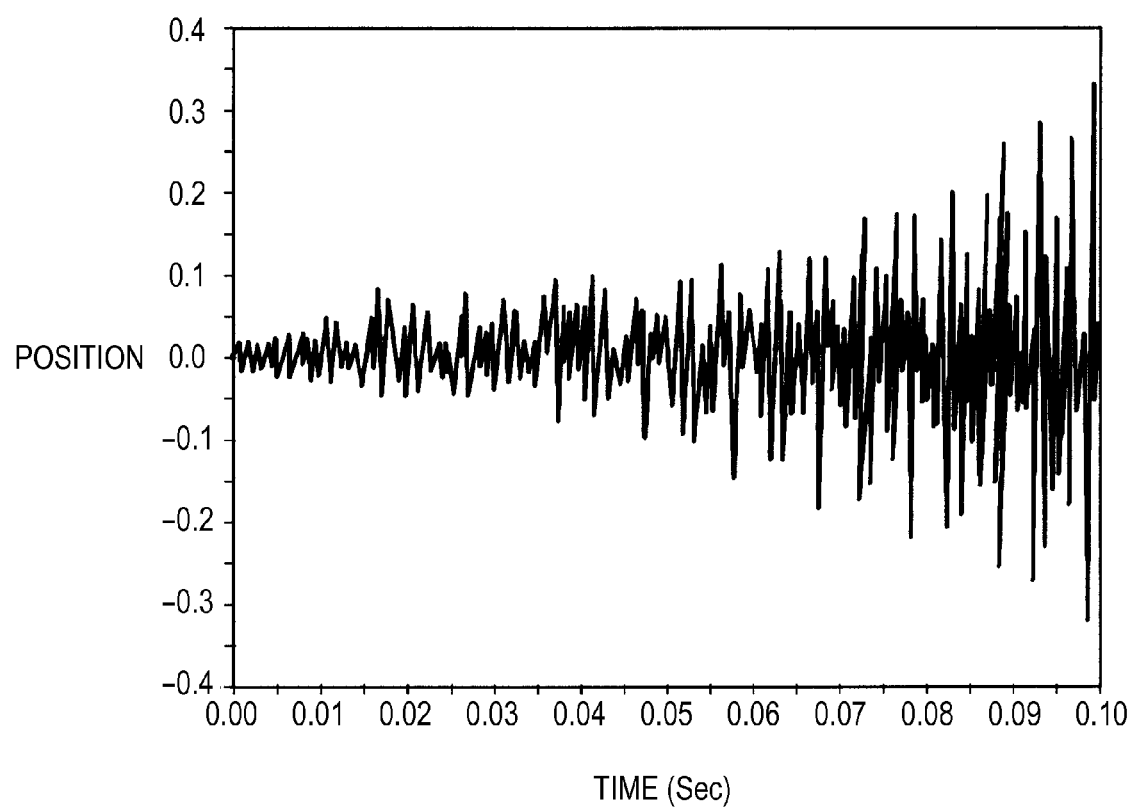
FIG. 7 is a diagram illustrating a problem that occurs when the ATS is configured.

However, this is applicable to when the ATS ideally functions. In an actual system, due to the generation of the remainder of the tracking error in the tracking servo system based on the spot Sats for the adjacent track servo, as illustrated in FIG. 7, a tracking error component increases over time (that is, whenever turning is repeated). As a result, it may become difficult to stably perform the tracking servo.

Therefore, in this embodiment, a method of ATS+ (ATS plus) is adopted as a position control method of the laser light for the recording.

Figure 8:
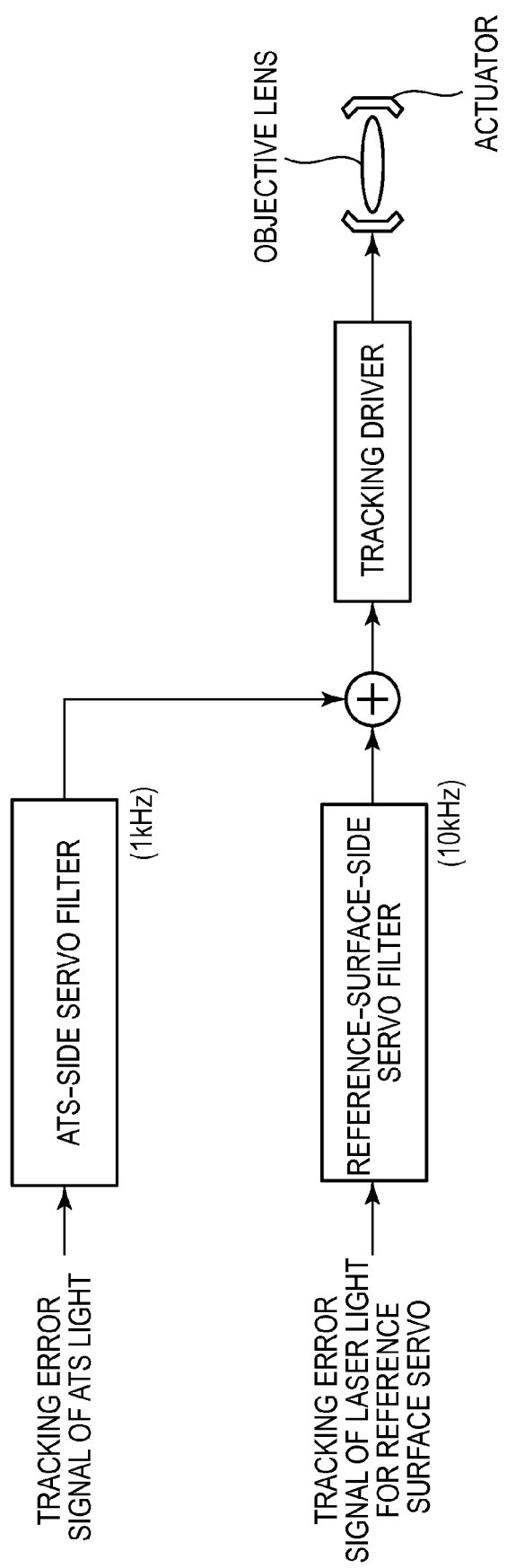
FIG. 8 is a diagram illustrating the concept of ATS+.

FIG. 8 is a diagram illustrating the concept of the ATS+.

As illustrated in FIG. 8, in the ATS+, first, a reference-surface-side servo filter to execute a filter process for controlling the tracking servo control with respect to the tracking error signal of the laser light for the reference surface (represented as laser light for reference surface servo in FIG. 8) and a tracking driver to drive an actuator holding the objective lens in a tracking direction such that displacement is enabled on the basis of an output of the reference-surface-side servo filter are provided.

That is, in the ATS+, a tracking servo loop (referred to as a reference-surface-side servo control system) that performs the tracking servo control of the objective lens on the basis of the tracking error signal of the laser light for the reference surface is formed.

In the ATS+, a servo control system based on the ATS is configured with the reference-surface-side servo control system. Specifically, an ATS-side servo filter that executes a filter process for the tracking servo control on the tracking error signal with respect to the laser light (represented as ATS light in FIG. 8) for the ATS/reproducing and an adding unit that provides the tracking servo signal generated by the ATS-side servo filter to the tracking servo loop of the reference surface side are provided.

This means that the tracking servo signal by the ATS-side servo filter is provided as a target value (control target value) of the reference-surface-side servo control system. Or, this can mean that the tracking servo loop functioning as the reference-surface-side servo control system is configured as a minor loop and the tracking servo signal by the ATS-side servo filter is input as a target value of the minor loop.

In this configuration, a tracking error of the ATS control system is generated due to the deviation of the spot position (refer to FIGS. 3A to 3C described above) caused by the lens shift of the objective lens or the tilt.

In addition, tracking error information of the ATS side is provided as a control target value of the reference-surface-side servo control system and the objective lens is driven such that the spot Sats of the laser light for the ATS/the reproducing follows the track on the recording layer 3.

As can be understood from the above description, similar to the ATS, in the ATS+, the track on the recording layer 3 can be prevented from crossing or being overlapped to the adjacent track.

As can be understood from the above description, the reference-surface-side servo control system including the reference-surface-side servo filter should have a function of mainly following a normal disturbance component (that is, disturbance component of a frequency higher than a disc eccentricity component becoming a factor of the deviation of the spot position caused by associated with the lens shift).

In this sense, a control band of the reference-surface-side servo control system is set to the same control band as that in the case of the normal servo control. Specifically, in the case of this example, the control band of the reference-surface-side servo control system is set to about 10 kHz.

Meanwhile, because the ATS control system including the ATS-side servo filter should not be made to follow the normal disturbance component, a control band thereof is set to a frequency band lower than control band of the reference-surface-side servo control system. Specifically, in the case of this example, the control band of the ATS control system (cutoff frequency of the ATS-side servo filter) is set to about 1 kHz.

As described above, according to the ATS+ in which a control signal of the ATS control system is provided to the tracking servo loop (minor loop) functioning as the reference-surface-side servo control system, a radiation state that is generated in the case in which the ATS according to the related art is configured and is illustrated in FIG. 7 can be prevented. That is, the tracking servo control that can prevent generation of the overlapping or crossing of the recording tracks can be stably realized as compared with the case in which the ATS according to the related art is configured.

(vi. Recording of PreSpiral)

Meanwhile, because of the deviation of the spot positions of the laser light for the recording layer and the laser light for the reference surface illustrated in FIGS. 3A to 3C, no information is recorded on the recording layer 3 at the reproducing start position, even though the seek is performed with respect to the reproducing start position on the basis of the reference surface address AD_ref, at the time of reproducing.

Specifically, as described in FIGS. 3A to 3C, the deviation of the spot position may be generated in both sides of the forward side/backward side (the outer circumferential side/inner circumferential side) of the recording advancement direction, depending on an influence of the disc eccentricity. Because the generation aspect of the disc eccentricity may be different before and after the disc is replaced, a direction of the deviation of the spot position generated at the time of recording may be opposite to a direction of the deviation of the spot position generated at the time of reproducing, when the disc is replaced between the recording operation and the reproducing operation. In this case, even though the seek is performed with respect to the reference surface address AD_ref corresponding to the recording layer address AD_wr targeted at the time of reproducing, no information may be recorded on the recording layer 3 at the corresponding position. Specifically, the reference surface seek is performed at the time of reproducing and the position in which the spot of the laser light for the recording layer is arranged may be significantly closer to the front side than the actual recording start position in the recording layer 3.

In view of these problems, the present applicants have suggested a method of starting recording of real data after dummy recording having considered a deviation of a spot position is performed with respect to the front side of at least a recording start position (refer to Japanese Patent Application Laid-Open No. 2010-248433).

Before the real data is recorded, the dummy recording having considered the deviation of the spot position is performed. For this reason, as described above, even when the direction of the deviation of the spot position at the time of recording is opposite to the direction of the deviation of the spot position at the time of reproducing, the reference surface seek is performed at the time of reproducing and existence of the recording track at the position in which the spot of the laser light for the recording layer is arranged can be ensured.

At this time, in the section of the dummy recording, the recording layer address AD_wr is given. Thereby, after the reference surface seek is performed, when the tracking servo is switched into the tracking servo based on the laser light for the recording layer, the seek can be quickly performed with respect to a head portion of the real data with reference to the address AD_wr for the recording layer recorded in the dummy recording portion.

Hereinafter, the recording portion that is formed by the dummy recording performed before the recording of the real data as described above is called "prespiral".

By performing recording of the prespiral as described above, access on the recording start portion of the real data can be ensured, even when the disc is replaced between the recording operation and the reproducing operation.

As described in Japanese Patent Application Laid-Open No. 2010-248433, a recording length (length of a radius direction) of the prespiral may be a length according to a maximum spot deviation amount D_max.

In this case, when the spot position deviation amount generated in a direction becoming a forward direction with respect to the recording advancement direction is set to +d and the spot position deviation amount generated in a direction becoming a backward direction with respect to the recording advancement direction is set to −d, a maximum value of the spot position deviation amount +d is set to a forward-direction-side maximum spot deviation amount +d_max and a maximum value of the spot position deviation amount −d is set to a backward-direction-side maximum spot deviation amount −d_max.

The maximum spot deviation amount D_max is represented as D_max=|+d_max|+|−d_max|.

[1-3. Any Pitch Spiral Movement Control]

Meanwhile, as described with reference to FIGS. 6A and 6B, in order to perform recording based on the ATS with respect to the recording layer 3 in which the position guider is not formed, it is necessary to perform recording of the track for the guide corresponding to the predetermined number of turns, while the tracking servo based on the laser light for the reference surface is applied to the reference surface Ref.

In order to prevent the generation of crossing of the tracks due to the deviation of the spot positions of the laser light for the reference surface and the laser light for the recording layer with respect to the track for the guide, as illustrated in FIG. 6A, the track pitch is increased (to be more than a range in which the deviation of the spot position can be generated). Then, the pulling over illustrated in FIG. 6B is performed and the tracking servo pull-in of the spot Sats for the adjacent track servo is performed with respect to an immediately previous track subjected to recording by the spot Swr for the recording.

In this case, because the track for the guide is formed while the tracking servo based on the laser light for the reference surface is applied, the track pitch control that increases the track pitch or performs the pulling over is realized by providing an offset to the servo loop of the tracking servo system based on the laser light for the reference surface and compulsorily moving the objective lens.

However, the pitch of the track for the guide to be set in consideration of the deviation of the spot position becomes significantly larger than the track pitch to be set to the reference surface Ref. Therefore, if the track pitch is changed with the large amplitude, the tracking servo may be deviated.

If this point is considered, when the track for the guide is formed, the servo pull-in of the laser light for the adjacent track reference surface is performed with respect to the track for the guide, and the ATS starts to be applied, it is preferable to move the laser light for the reference surface in a spiral shape based on any pitch while a tracking servo control state is maintained.

In this embodiment, in order to enable control (hereinafter, referred to as any pitch spiral movement control or variable track pitch control) for realizing the spiral movement based on any pitch while the tracking servo control state is maintained, structures disclosed in Japanese Patent Application Laid-Open Nos. 2010-225237 and 2011-198425 are applied to a structure of the reference surface Ref.

Hereinafter, a structure of the reference surface Ref to enable any pitch spiral movement control and a specific spiral movement control method based on the structure of the reference surface Ref will be described with reference to FIGS. 9 to 14.

Figure 9:
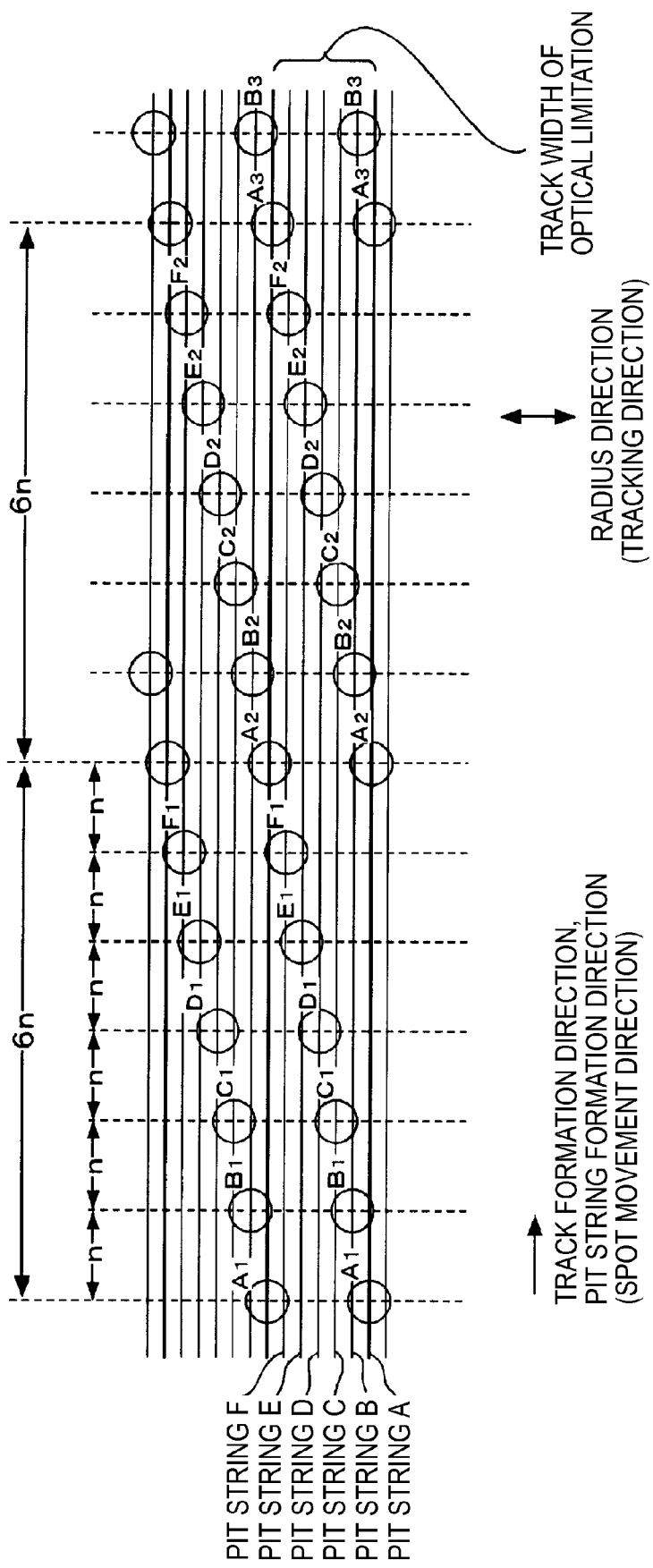
FIG. 9 is an enlarged view (plan view) of a part of a reference surface of a recording medium according to an embodiment.

FIG. 9 is an enlarged view (plan view) of a part of the reference surface Ref of the multi-layer recording medium 1 according to the embodiment.

First, in FIG. 9, a direction from a left side of a plane of paper to a right side thereof is defined as a pit string formation direction, that is, a track formation direction. A beam spot of the laser light for the reference surface moves from the left side of the plane of paper to the right side thereof, according to one rotation of the multi-layer recording medium 1.

A direction (longitudinal direction of the plane of paper) that is orthogonal to the pit string formation direction is a radius direction of the multi-layer recording medium 1.

In FIG. 9, reference numerals A to F that are shown by white circles indicate pit formation enabled positions. That is, in the reference surface Ref, the pits are formed at only the pit formation enabled positions and the pits are not formed at the positions other than the pit formation enabled positions.

In FIG. 9, discrimination of the reference numerals A to F indicates discrimination of the pit strings (discrimination of the pit strings arranged in the radius direction) and numbers added to the reference numerals A to F indicate discrimination of the pit formation enabled positions on the pit strings.

In this case, an interval (track width of an optical limitation) that is shown by a thick black line in FIG. 9 indicates a minimum track pitch (track pitch based on an optical limitation value) determined from an optical condition of the reference surface Ref. As can understood from the above description, in the reference surface Ref, a total of 6 pit strings shown by A to F are arranged at a pitch more than the optical limitation value, in the radial direction.

However, only when a plurality of pit strings are arranged at the pitch more than the optical limitation value, the pit formation positions may be overlapped in a pit string formation direction. Finally, the interval of the pits in the pit string formation direction may be more than the optical limitation.

As clear from the following description, it is necessary to individually obtain a tracking error signal with respect to each of the pit strings A to F to realize any pitch spiral movement control.

That is, in this respect, it is necessary to take a device in arrangement of the pit strings.

By considering this point, the following conditions are imposed to each of the pit strings A to F, in the reference surface Ref 1) In each of the pit strings A to F, an interval of the pit formation enabled positions is limited to a predetermined first interval.

2) The pit strings A to F in which the interval of the pit formation enabled positions is limited are arranged such that the pit formation enabled positions are deviated at a predetermined second interval in the pit string formation direction (that is, a phase of each pit string is shifted at the second interval).

In this case, the interval (the second interval) of the pit formation enabled positions in the pit strings A to F arranged in the radius direction is set to n. At this time, the pit strings A to F are arranged such that the second condition is satisfied, so that an interval between the pit formation enabled positions of the pit strings A-B, the pit strings B-C, the pit strings C-D, the pit strings D-E, the pit strings E-F, and the pit strings F-A becomes n as illustrated in FIG. 9.

The interval (first interval) of the pit formation enabled positions in the pit strings A to F becomes 6n, because a total of six pit string phases from A to F are realized.

As can be understood from the above description, in the reference surface Ref, the plurality of pit strings A to F having the different pit string phases have the basic period set to 6n and have the phase shifted by n.

Thereby, in a method of realizing the spiral movement based on any pitch to be described below, the tracking error signals with respect to the pit strings A to F can be individually obtained.

At the same time, as in the case of this example, when the pit strings A to F are arranged in a radius direction at the pitch more than the optical limitation value of the reference surface Ref, the interval of the pits in the pit string formation direction is prevented from being more than the optical limitation.

As described above, in the case of this example, the optical conditions in the reference surface Ref are the same as those of the case of the DVD, that is, the wavelength λ, is about 650 nm and NA is about 0.65. To correspond to the conditions, a section length of each pit formation enabled position is set to a section length corresponding to 3T equal to a shortest mark in the DVD and an interval between edges of each pit formation enabled position of A to F in the pit string formation direction is set to a length corresponding to 3T.

As a result, the conditions of 1) and 2) are satisfied.

Next, a specific pit string formation method will be described with reference to FIG. 10 to understand a pit formation aspect in the entire reference surface Ref.

Figure 10:
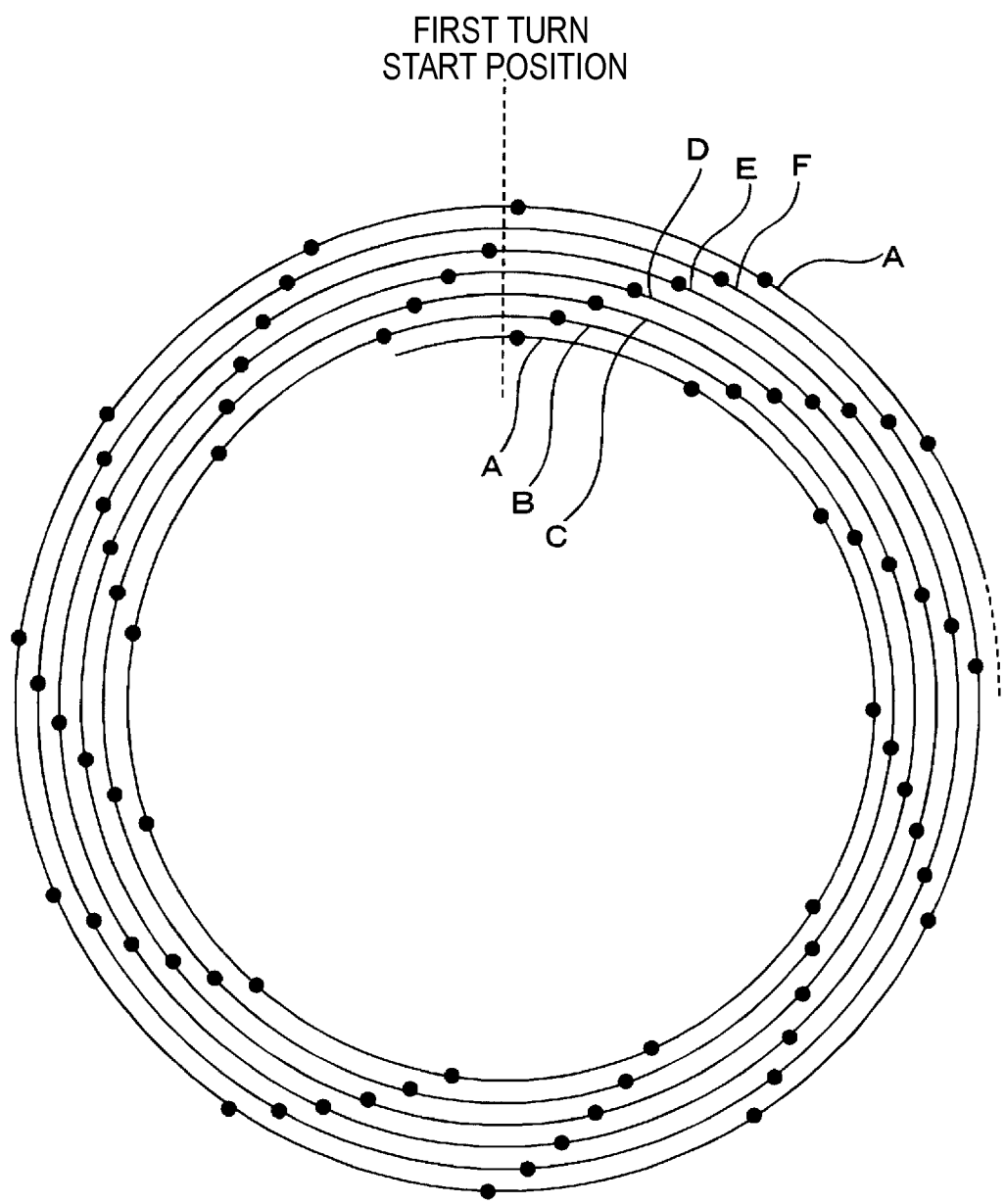
FIG. 10 is a diagram illustrating a specific formation method of a pit on an entire reference surface.

FIG. 10 schematically illustrates a part (corresponding to seven strings) of pit strings formed on the reference surface Ref. In FIG. 10, a black circle indicates a pit formation enabled position.

As can be seen from FIG. 10, in the reference surface Ref, the pit strings are formed in a spiral shape.

The pit string phase is shifted by the second interval ("n") for each turn of the pit string and the pit formation enabled position is determined, so that the conditions of 1) and 2) described above are satisfied, with respect to the pit strings arranged in the radius direction.

For example, in the example illustrated in FIG. 10, the pit formation enabled position is determined such that the pit string phase of the pit string A is obtained in a first turn of the pit string and the pit formation enabled position is determined such that the pit string phase of the pit string B is obtained in a second turn of the pit string based on the first turn start position (predetermined angle position). Hereinafter, in the same manner, the pit formation enabled position is determined such that the pit string phase of the pit string C is obtained in a third turn, the pit formation enabled position is determined such that the pit string phase of the pit string D is obtained in a fourth turn, the pit formation enabled position is determined such that the pit string phase of the pit string E is obtained in a fifth turn, the pit formation enabled position is determined such that the pit string phase of the pit string F is obtained in a sixth turn, and the pit formation enabled position is determined such that the pit string phase of the pit string A is obtained again in a seventh turn. That is, the pit formation enabled position in each turn of the pit string is determined such that the pit string phase is shifted by the second interval n for each turn of the pit string.

FIGS. 11A to 11C illustrate an example of recording of specific address information with respect to the reference surface Ref.

In the description of FIGS. 1 to 14, it is assumed that a signal based on a push/pull signal is generated as a tracking error signal (individual tracking error signal) for convenience of explanation.

Although described in detail below, in an actual configuration, a signal based on a SUM signal can be generated as the tracking error signal.

First, FIG. 11A schematically illustrates a relation of pit formation enabled positions of the pit strings (A to F) configured to have different pit string phases. In FIG. 11A, the pit formation enabled position is shown by a mark "*".

As will be described below, in this example, one pit string is selected from the pit strings A to F and the tracking servo is applied to one selected pit string.

However, at this time, there occurs a problem in that the pit strings A to F are arranged in the radius direction at the pitch more than the optical limitation. That is, in this case, because a tracking error signal (push-pull signal) obtained by moving (scanning) the beam spot of the laser light for the reference surface on the track may be a signal obtained by reflecting the pits of all of the pit strings A to F, one selected pit string may not be followed even though the tracking servo is applied on the basis of the tracking error signal.

For this reason, in this example, a basic concept is to sample the tracking error signal at timing of the pit formation enabled position in the selected pit string and apply the tracking servo on the basis of a value of the sampled tracking error signal (intermittently).

Similar to the above, even when the address information is read, a method of sampling a SUM signal at timing of the pit formation enabled position of the selected pit string and detecting address information on the basis of a value of the selected SUM signal, such that only information recorded in the selected pit string is selectively read, is adopted.

In order to correspond to the information detection method, in this example, a format that expresses "0" and "1" of a channel bit (recording numeral) according to whether the pit is formed at the pit formation enabled position is adopted. That is, one pit formation enabled position covers information corresponding to one channel bit.

In addition, one bit of a data bit is expressed by a data pattern of "0" and "1" by a plurality of channel bits.

Specifically, in this example, as illustrated in FIG. 11B, "0" or "1" of a data bit is expressed by four channel bits. For example, a pattern "1011" of four channel bits expresses the data bit "0" and a pattern "1101" of four channel bits expresses the data bit "1".

At this time, an important point is that the channel bit "0" is not continuous. That is, if the channel bit "0" may be continuous, this means that a period in which an error signal is not obtained may be continuous, when the servo is applied intermittently using the tracking error signal, basically, and it may become difficult to secure precision of the tracking servo.

For this reason, in this example, a condition that the channel bit "0" is not continuous is satisfied by the definition of the data bit described above. That is, precision deterioration of the tracking servo can be minimally suppressed by the definition of the data bit.

FIG. 11C illustrates an example of a synchronization pattern.

As illustrated in FIG. 11C, the synchronization pattern is expressed by 12 channel bits, 8 bits of the first half is defined as a channel bit pattern "11111111" not matched with the definition of the data bit, and discrimination (kind) of the synchronization is expressed by a pattern of the remaining four channel bits. Specifically, if the pattern of the four channel bits continuous to the eight channel bits is "1011", the pattern expresses Sync 1 and if the pattern is "1101", the pattern expresses Sync 2.

In the reference surface Ref, the address information is recorded continuously after the synchronization.

As described above, at least absolute position information (radius position information and rotation angle information) on the disc is recorded as the address information of the reference surface Ref.

In this example, the plurality of pit strings A to F are arranged in one track width of the limitation in the related art. The recording of the address information is performed by allocating individual information for each pit string, such that a radius position of each pit string is individually displayed (identification of each pit string is enabled). That is, the same address information is not recorded with respect to each of the pit strings A to F arranged in one track width of the limitation in the related art.

As can be understood from the description of FIGS. 11A to 11C, the pit is position recorded with respect to the reference surface Ref. The position recording indicates a recording method in which a pit (or mark) formation portion is defined as channel data "1" and the other portion is defined as channel data "0".

Meanwhile, as illustrated in FIG. 10, in the case of this example, the pit string in the reference surface Ref is formed in a spiral shape. The pit formation enabled position in each turn of the pit string is determined such that the phases of the pit strings are switched in order of A→B→C→D→E→F→A . . . for each turn of the pit string, that is, the phases of the pit strings are shifted by the second interval n for each turn of the pit string.

According to this configuration, if the tracking servo can be applied to any one of the pit strings A to F, spiral movement based on a pitch of ⅙ of an optical limitation value of the reference surface Ref is realized.

Alternatively, each pit string in the reference surface Ref may be formed in a sixfold spiral shape of A to F, not a spiral shape illustrated in FIG. 10, or may be formed in a concentric circle shape.

However, even when any structure is adopted, the spiral movement based on any pitch may not be realized by only applying the tracking servo to any pit string.

In this embodiment, the conditions of 1) and 2) described above are imposed as the pit string formation conditions of the reference surface Ref, so that the tracking servo can be applied to each of the pit strings arranged at the pitch more than the optical limitation value. In addition, an offset increasing over time is provided to the tracking error signal and the pit strings A to F are sequentially crossed, so that the spiral movement based on any pitch is realized.

In this case, in order to realize the spiral movement based on any pitch, it is necessary to sequentially switch the pit strings defined as the servo objects into the pit strings adjacent to the outer circumferential side like the pit string A→the pit string B→the pit string C . . . .

As such, in order to realize an operation for sequentially switching the pit strings defined as the servo objects, it is necessary to make the tracking error signals with respect to the pit strings based on the phases of the pit strings A to F individually obtained. This is because the pit strings defined as the servo objects may not be switched, if the tracking error signals with respect to the pit strings A to F may not be distinguished.

Figure 12:
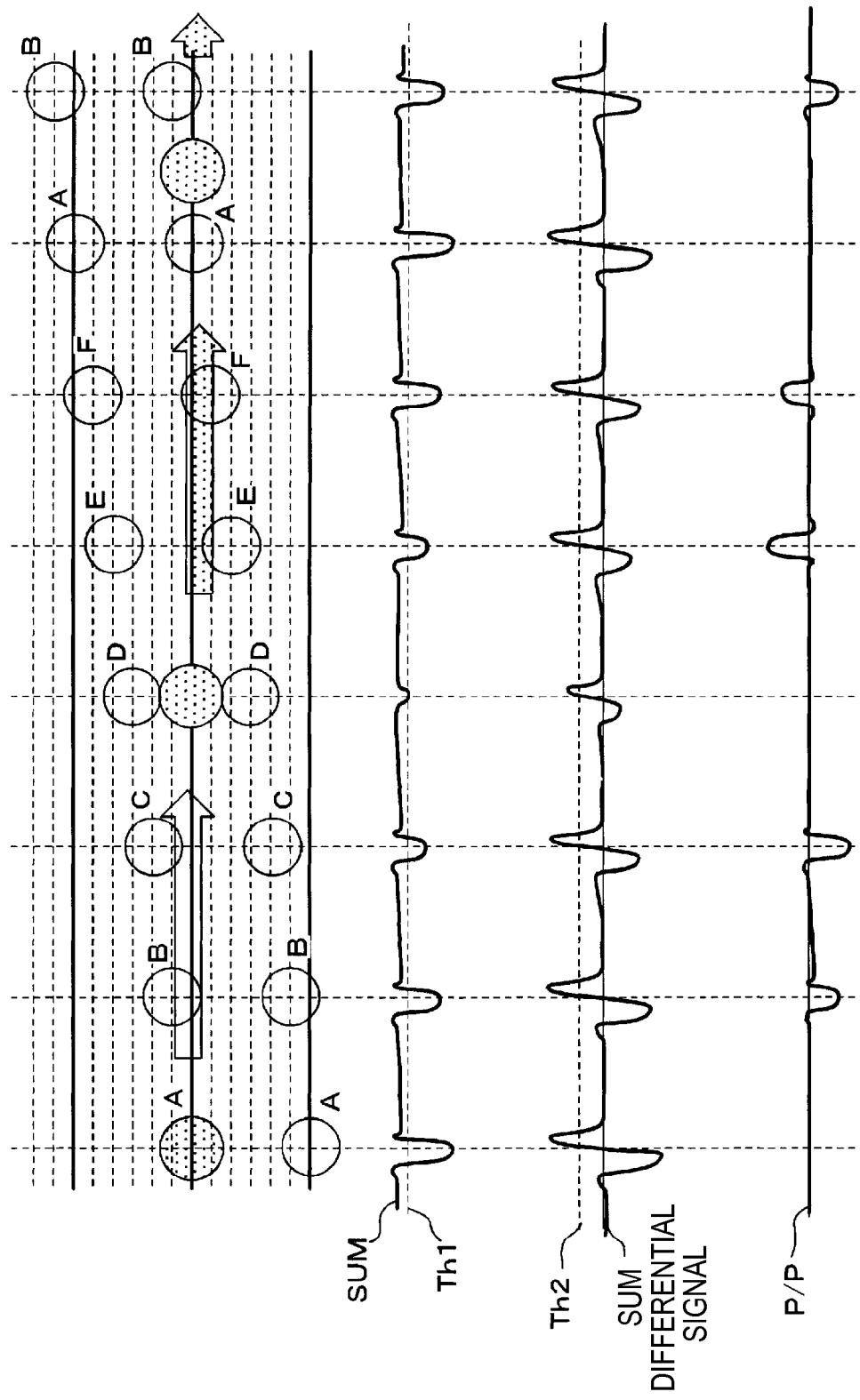
FIG. 12 is a schematic diagram illustrating a relation of a movement aspect of a spot of laser light for a reference surface on the reference surface according to rotation of a recording medium and waveforms of a SUM signal, a SUM differential signal, and a P/P signal obtained at that time.

FIG. 12 schematically illustrates a relation of a movement aspect of a spot of the laser light for the reference surface on the reference surface Ref according to rotation of the multi-layer recording medium 1 and waveforms of a SUM signal, a SUM differential signal, and a push/pull signal (P/P signal) obtained at that time.

The SUM differential signal is a signal that is obtained by differentiating a SUM signal obtained on the basis of reflection light of the laser light for the reference surface.

In FIG. 12, it is assumed that the pits are formed in all of the pit formation enabled positions, for convenience of explanation.

As illustrated in FIG. 12, as the beam spot of the laser light for the reference surface moves according to the rotation of the multi-layer recording medium 1, a signal level of the SUM signal reaches a peak with a cycle according to an arrangement interval of the pits of A to F in the pit string formation direction. That is, the SUM signal indicates an interval (formation period) of the pits of A to F in the pit string formation direction.

In this example, because the beam spot moves along the pit string A, a peak value of the SUM signal is maximized when the SUM signal passes through the formation position of the pit A in the pit string formation direction and decreases gradually over the formation positions of the pits B to D. Then, the peak value increases in order of the formation position of the pit E to the formation position of the pit F and the peak value is maximized at the formation position of the pit A. That is, at the formation positions of the pits E and F in the pit string formation direction, due to an influence of the pits in the pit strings E and F adjacent to the inner circumferential side, the peak value of the SUM signal increases sequentially at the formation positions of the pits E and F.

As the SUM differential signal and the P/P signal functioning as the tracking error signal, waveforms illustrated in FIG. 12 are obtained, respectively.

In this case, it should be note that the P/P signal functioning as the tracking error signal is obtained by making a relative position relation of the beam spot and the pit string represented for each of the pit formation enabled positions of A to F apart from each other at the predetermined interval n.

The SUM differential signal indicates an interval of the pit formation positions (in a precise sense, pit formation enabled positions) of the pit strings A to F in the pit string formation direction.

Therefore, a clock CLK that indicates the interval of the pit formation enabled positions of the pit strings A to F in the pit string formation direction can be obtained on the basis of the SUM differential signal.

Specifically, the clock CLK becomes a signal in which a position (timing) corresponding to a center position (peak position) of each pit is a rising position (timing)

Figure 13:
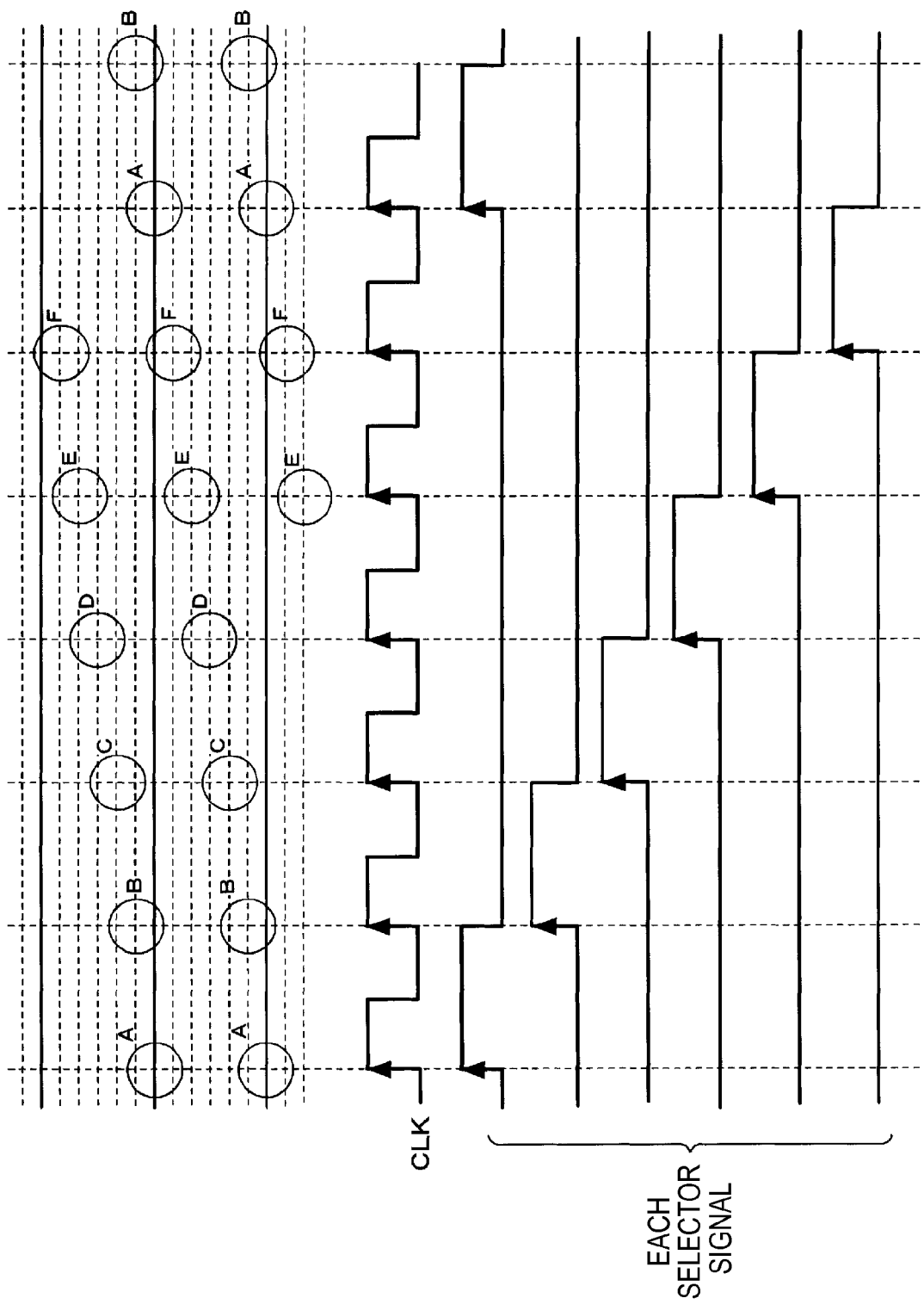
FIG. 13 is a schematic diagram illustrating a relation of a clock generated from a SUM differential signal, a waveform of each selector signal generated on the basis of the clock, and (a part of) each pit string formed on a reference surface.

FIG. 13 schematically illustrates a relation of the clock CLK, a waveform of each selector signal generated on the basis of the clock CLK, and (a part of) pit strings formed on the reference surface Ref.

As illustrated in FIG. 13, the clock CLK becomes a signal in which rising is generated at timing corresponding to a peak position of each pit (pit formation enabled position) and a center point between rising positions becomes falling position.

The clock CLK can be generated by phase locked loop (PLL) process using a timing signal (indicating zero-cross timing of the SUM differential signal) generated from the SUM differential signal as an input signal (reference signal).

In addition, six kinds of selector signals that indicate timings of the pit formation enabled positions of A to F are generated from the clock CLK having a cycle according to the formation interval of the pits A to F. Specifically, the selector signals are generated by dividing the clock CLK by 6 and phases thereof are shifted by the ⅙ cycle, respectively. In other words, the selector signals are generated by dividing the clock CLK by 6 at each timing, such that each rising timing is shifted by the ⅙ cycle.

The selector signals become signals that indicate timings of the pit formation enabled positions of the corresponding pit strings of A to F. In this example, the selector signals are generated, any selector signal is selected, and the tracking servo control is performed according to the P/P signal in a period shown by the selected selector signal, so that the beam spot of the laser light for the reference surface is traced on any pit string among the pit strings A to F. In this way, any pit string defined as the servo object can be selected from the pit strings A to F.

As such, the selector signals that indicate the timings of the pit formation enabled positions of the corresponding pit strings of A to F are generated, any selector signal is selected from the selector signals, and the tracking servo control is performed on the basis of the tracking error signal (P/P signal) in the period indicated by the selected selector signal, so that the tracking servo with respect to any pit string among the pit strings A to F can be realized. That is, switching of the tracking error signal with respect to the pit string defined as the servo object can be performed by selecting the selector signal. Thereby, switching of the pit string defined as the servo object is realized.

Figure 14:
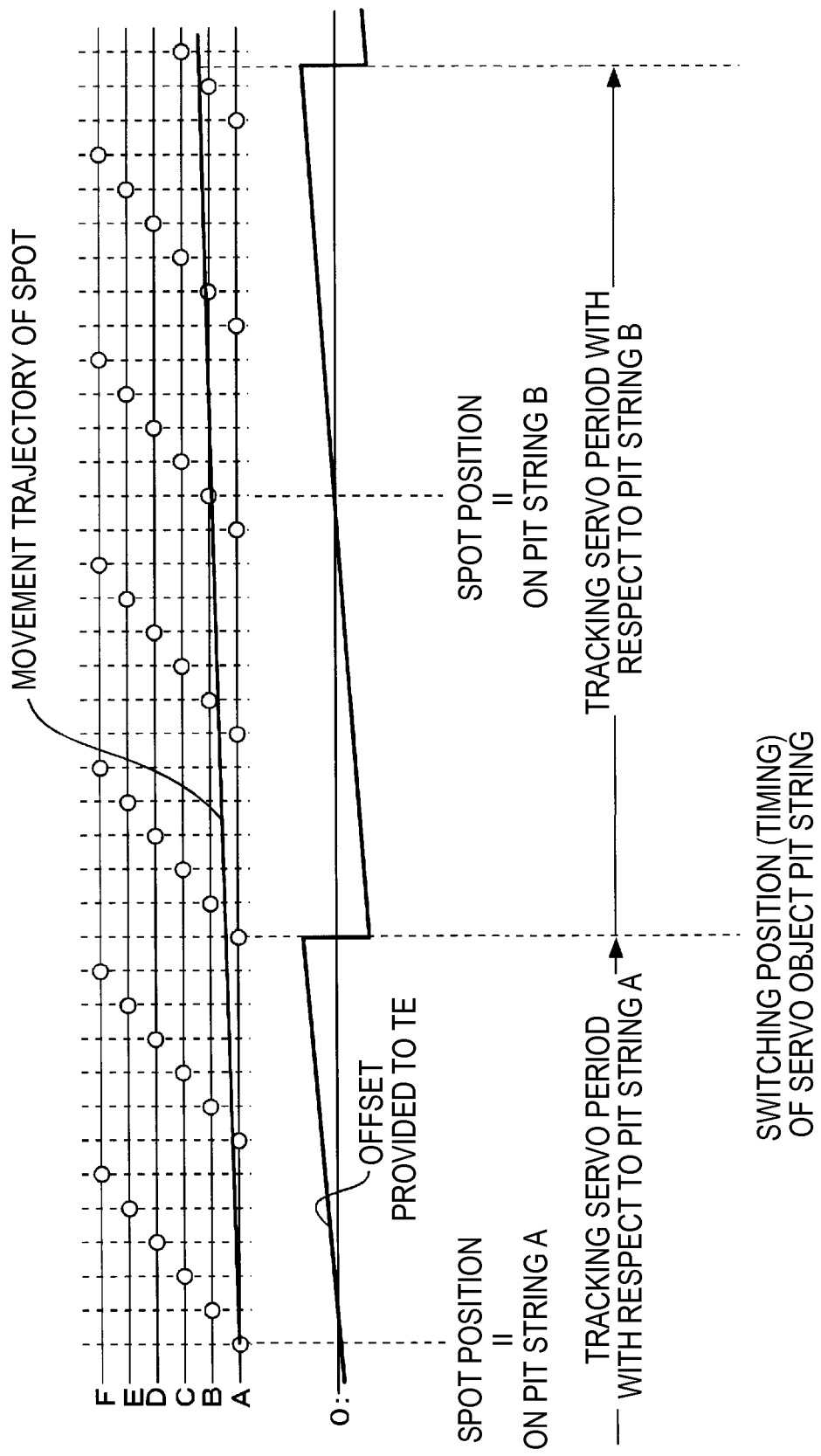
FIG. 14 is a diagram illustrating a specific method to realize spiral movement based on any pitch.

FIG. 14 is a diagram illustrating a specific method to realize spiral movement based on any pitch. FIG. 14 illustrates a relation of an offset provided to a tracking error signal TE_sv and a movement trajectory of a beam spot on the reference surface Ref.

In this case, the tracking error signal TE_sv means a signal that is obtained by sampling and holding the P/P signal on the basis of the selector signal described above. That is, the tracking error signal TE_sv indicates the P/P signal (tracking error signal) with respect to the pit string defined as the servo object.

FIG. 14 illustrates an example of an aspect where the beam spot crosses a pit string A→a pit string B by provision of the offset.

First, when a method of sequentially switching the pit strings defined as the servo objects in realizing the spiral movement based on any pitch is adopted, a switching position (timing) is previously determined. In the example of FIG. 14, the switching position of the servo object pit string is set to a position (in a radius direction) becoming an intermediate point between a pit string in an adjacent relation with the servo object pit string and the servo object pit string.

In this case, when a certain spiral pitch is realized, a position on the disc which the beam spot may pass through to realize the spiral pitch can be obtained by previous calculation from the format of the reference surface Ref. That is, as can be understood from the above description, the position where the beam spot reaches the intermediate point between the pit string and the adjacent pit string can be obtained by the previous calculation.

As such, when the beam spot reaches the position (a certain block of a certain address block) corresponding to the intermediate point obtained by the previous calculation, the pit string defined as the servo object is sequentially switched into the pit string adjacent to the outside of the past servo object pit string.

Meanwhile, in order to move the beam spot in the radius direction, an offset of a saw tooth wave is provided to the tracking error signal TE-sv. By setting the tilt of the offset, the spiral pitch can be set to any pitch.

The offset that is provided to realize any spiral pitch becomes a waveform in which the polarity changes for each intermediate point, from the relation of sequentially performing switching of the servo object pit string at the timing when the beam spot reaches the intermediate point between the pit string and the adjacent pit string, as described above. That is, an offset amount that is necessary to move the beam spot to the position becoming the intermediate point becomes "+α" at the time of applying the servo to the pit string A and becomes "−α" at the time of applying the servo to the adjacent pit string B. For this reason, at switching timing of the servo object pit string as the timing when the beam spot reaches the intermediate point, it is necessary to invert the polarity of the offset. From this point, the waveform of the offset to be provided becomes the waveform of the saw tooth wave as described above.

In this case, the waveform of the offset can be obtained by performing the previous calculation on the basis of information of the spiral pith to be realized and information of the format of the reference surface Ref.

As such, the pit string defined as the tracking servo object is switched into the pit string adjacent to the outside of the past servo object pit string at each timing when the beam spot reaches the predetermined position between the previously determined adjacent pit string and the pit string as the intermediate point, while the offset of the previously determined saw tooth wave is provided to the tracking error signal TE_sv.

By this configuration, the spiral movement based on any pitch can be realized.

In the above description, the tracking error signal TE-sv with respect to the pit string defined as the tracking servo object is generated on the basis of the P/P signal. However, as disclosed in Japanese Patent Application Laid-Open No. 2011-198425, the tracking error signal TE-sv can be obtained by calculating a difference of SUM signals with respect to each of two pit strings having the same phase difference with respect to the pit string defined as the tracking error detection object.

The phases of the pit strings are not limited to six phases.

[1-4. Correspondence Relation of Reference Surface Address and Recording Layer Address]

As described above, in the multi-layer recording medium 1, different addresses that are a reference surface address AD_ref and a recording layer address AD_wr are given to the reference surface Ref and the recording layer 3, respectively.

If performance of the reference surface seek described above with respect to the reference surface address AD_ref and the recording layer address AD_wr is considered, it is necessary to previously define a correspondence relation (position relation). If the definition is not given, it may not be possible to know which address on the reference surface Ref is subjected to seek, when a designation address on the recording layer 3 is accessed. As a result, the access may not be performed.

As described above, if the section length corresponding to one address and the track pitch are known, the correspondence relation can be known in advance.

Specifically, if the section length corresponding to one address of the recording layer address AD_wr and the track pit are known, the radius position corresponding to the address can be specified from a value of the recording layer address AD_wr. As described above, the radius position information is included as the reference surface address AD_ref. For this reason, if the radius position is known, the reference surface address AD_ref corresponding to the radius position can be specified.

In this case, a physical address that is recorded actually with respect to the recording layer 3 is a physical sector number (PSN).

When recording or reproducing is performed, a recording start address or a reproducing start address (target address) is instructed by a logical sector number (LSN) from the side of the host apparatus. As such, when the target address is designated by the LSN functioning as the logical address from the side of the host apparatus, the target address based on the PSN to be the physical address is obtained on the basis of the corresponding information.

In this case, a value of the PSN functioning as the target address is set to "Psn".

A relation of the target address Psn and the radius position (set to r) can be represented by the following expression 1.

[Expression 1]

$$r = \sqrt{\frac{\pi Ro^2 - LTp\left(\frac{Psn}{32}\right)}{\pi}} \quad \text{Expression 1}$$

In the expression 1, L indicates the length of 1 RUB. RUB indicates a recording unit (minimum recording unit) and 1 RUB becomes 32 sectors (that is, "32" in the expression 1 mean the number of sectors forming 1 RUB).

In addition, Ro indicates a radius position of an original point (address addition start position) of the reference surface address AD_ref and Tp indicates a track pitch of the recording layer 3 determined by the standard.

In this case, the expression 1 shows a relation when the recording direction is outer circumference→inner circumference. However, even when the recording direction is inner circumference→outer circumference, a relation of the Psn and the radius position r can be represented by a relation expression based on the same principle.

If the radius position r is calculated by the expression 1, the reference surface address AD_ref corresponding to the target address Psn can be calculated.

In the case of this example, the reference surface address AD_ref is recorded by the pit strings A to F to realize any pitch spiral movement illustrated in FIGS. 9 and 10. In this case, as the reference surface address AD_ref to be targeted, a targeted turn track number (LPN Track number) and an intra-track phase number (LPM Phase number) may be calculated. The term LPM indicates a reference surface pit pattern to realize any pitch spiral movement.

The access targeted turn track number (LPM Track number) and the intra-track phase number (LPM Phase number) are calculated by the following expression 2, on the basis of the radius position r calculated by the expression 1.

[Expression 2]

$$LPM \text{ Track number} = div(Ro - r, T1) \quad \text{Expression 2}$$
$$LPM \text{ Phase number} = mod\left(6\frac{Ro - r}{T1}, 6\right)$$

In the expression 2, T1 indicates a track pitch of tracks that are formed on the reference surface Ref. That is, T1 corresponds to a track width (at least a track width more than the track width of the optical limitation) shown by the thick line of FIG. 9. The intra-track phase number (LPM Phase number) indicates any one of the six phases when the pit strings A to F are provided, as illustrated in FIG. 9. In the expression 2, "6" is the number of phases of A to F.

In addition, div(a, b) indicates an integer portion of a÷b and mod(a, b) indicates the remainder of a÷b.

From the expressions 1 and 2, a correspondence relation (ideal correspondence relation) of the recording layer address AD_wr and the reference surface address AD_ref can be previously assumed.

[1-5. Configuration of Recording/Reproducing Apparatus According to Embodiment]

On the assumption of the above description, a configuration of a recording/reproducing apparatus 10 that is an embodiment of a recording apparatus and a reproducing apparatus according to the embodiment of the present disclosure will be described with reference to FIGS. 15 and 16.

Figure 15:
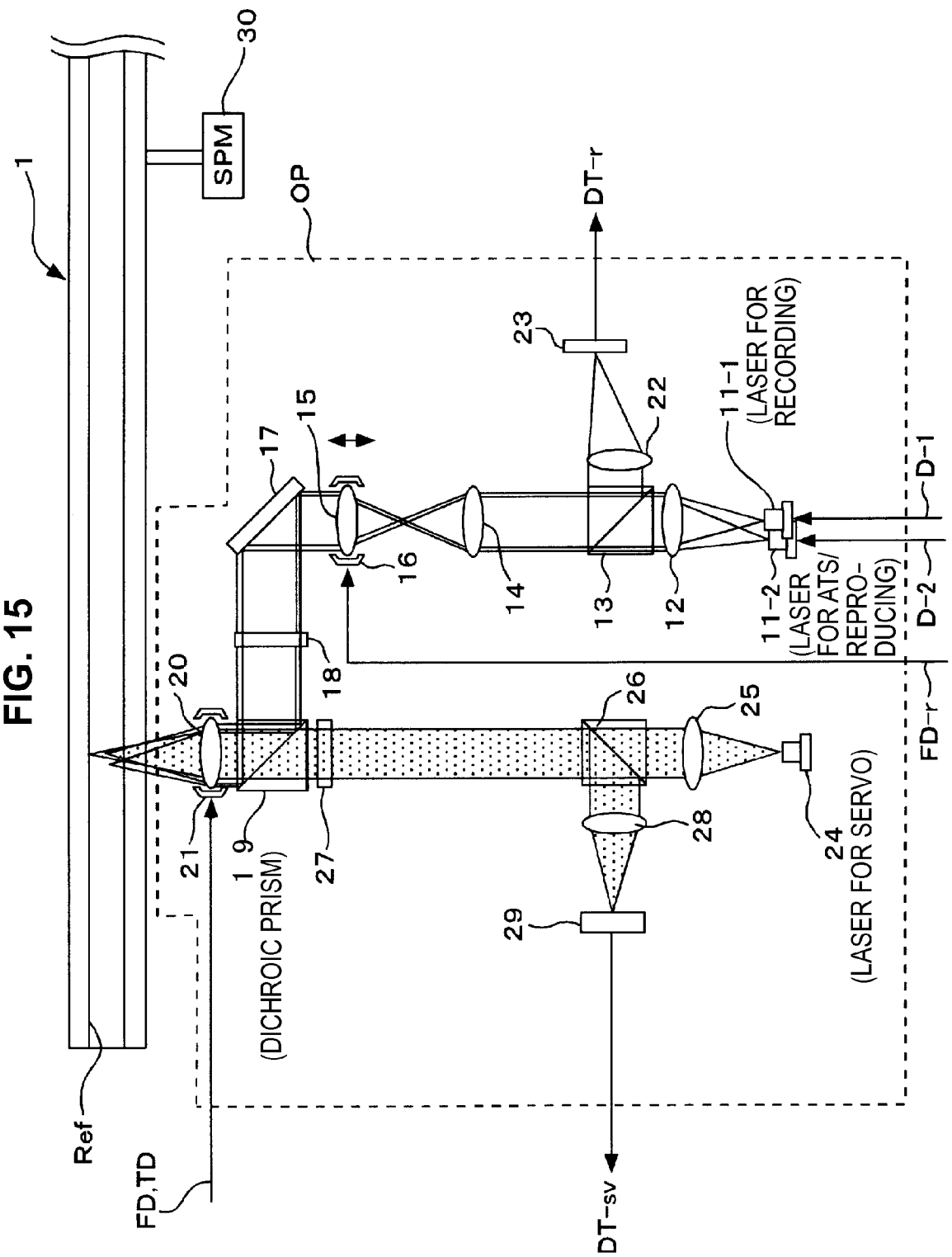
FIG. 15 is a diagram mainly illustrating a configuration of an optical system included in a recording apparatus according to an embodiment.

FIG. 15 is a diagram mainly illustrating a configuration of an optical system included in a recording/reproducing apparatus 10. Specifically, FIG. 15 mainly illustrates an internal configuration of an optical pickup OP included in the recording/reproducing apparatus 10.

First, a multi-layer recording medium 1 that is loaded on the recording/reproducing apparatus 10 is set in a state in which a center hole is clamped at a predetermined position in the recording/reproducing apparatus 10 and rotation driving by a spindle motor 30 is enabled.

In the recording/reproducing apparatus 10, the optical pickup OP is provided as a configuration to radiate laser light for recording and reproducing with respect to the multi-layer recording medium 1 driven to rotate by the spindle motor 30.

In the optical pickup OP, a laser 11-1 for recording to be a light source of the laser light for the recording described above and a laser 11-2 for ATS/reproducing to be a light source of the laser light for the ATS/reproducing are provided.

As a light source of the laser light for the reference surface to be the light to perform the position control using the position guider formed in the reference surface Ref, a laser 24 for servo is provided.

In the optical pickup OP, an objective lens 20 that becomes an output end of the laser light for the recording, the laser light for the ATS/reproducing, and the laser light for the reference surface with respect to the multi-layer recording medium 1 is provided. In the optical pickup OP, a light receiving unit 23 for a recording layer to receive reflection light of the laser light for the ATS/reproducing from the multi-layer recording medium 1 and a light receiving unit 29 for servo light to receive reflection light of the laser light for the reference surface from the multi-layer recording medium 1 are further provided.

In the optical pickup OP, an optical system that guides the laser light for the recording and the laser light for the ATS/reproducing to the objective lens 20 and guides reflection light from the multi-layer recording medium 1 incident on the objective lens 20 to the light receiving unit 23 for the recording layer is formed.

Specifically, the laser light for the recording emitted from the laser 11-1 for the recording and the laser light for the ATS/reproducing emitted from the laser 11-2 for the ATS/reproducing are converted to become parallel light through a collimate lens 12 and are incident on a polarization beam splitter 13. The polarization beam splitter 13 is configured to transmit the laser light for the recording and the laser light for the ATS/reproducing incident from the side of the light source.

The laser light for the recording and the laser light for the ATS/reproducing that have been transmitted through the polarization beam splitter 13 are incident on a focus mechanism including a fixed lens 14, a movable lens 15, and a lens driving unit 16. The focus mechanism is provided to adjust focusing positions with respect to the laser light for the recording functioning as the laser light for the recording layer and the laser light for the ATS/reproducing. The fixed lens 14 is disposed on the side closer to the light source of the laser light, the movable lens 15 is disposed on the side distant from the light source, and the movable lens 15 is driven by the lens driving unit 16, in a direction parallel to an axis of the laser light.

The laser light for the recording and the laser light for the ATS/reproducing that have been transmitted through the fixed lens 14 and the movable lens 15 forming the focus mechanism are reflected by a mirror 17 and are incident on a dichroic prism 19 through a ¼ wavelength plate 18.

The dichroic prism 19 is configured such that a selection reflection surface thereof reflects light having the same wavelength band as the laser light for the recording and the laser light for the ATS/reproducing and transmits light having the other wavelengths. Therefore, the laser light for the recording and the laser light for the ATS/reproducing that are incident as described above are reflected by the dichroic prism 19.

The laser light for the recording and the laser light for the ATS/reproducing that are reflected by the dichroic prism 19 are radiated (focused) with respect to the multi-layer recording medium 1 (necessary recording layer 3) through the objective lens 20, as illustrated in FIG. 15.

With respect to the objective lens 20, a biaxial actuator 21 that holds the objective lens 20 in a focus direction (direction adjacent to the multi-layer recording medium 1) and a tracking direction (direction orthogonal to the focus direction: disc radius direction) such that displacement is enabled is provided.

The biaxial actuator 21 includes a focus coil and a tracking coil. The biaxial actuator 21 displaces the objective lens 20 in the focus direction and the tracking direction, by applying drive signals (drive signals FD and TD to be described below) to the focus coil and the tracking coil, respectively.

In this case, when the laser light for the ATS/reproducing is radiated to the multi-layer recording medium 1 as described above, reflection light of the laser light for the ATS/reproducing is obtained from the multi-layer recording medium 1 (recording layer 3 defined as the reproducing object).

The reflection light of the laser light for the ATS/reproducing that is obtained as described above is guided to the dichroic prism 19 through the objective lens 20 and is reflected by the dichroic prism 19.

The reflection light of the laser light for the ATS/reproducing that is reflected by the dichroic prism 19 passes through the ¼ wavelength plate 18→the mirror 17→the focus mechanism (the movable lens 15→the fixed lens 14) and is incident on the polarization beam splitter 13.

As such, the reflection light of the laser light for the ATS/reproducing that is incident on the polarization beam splitter 13 passes through the ¼ wavelength plate two times on a forward path and a backward path and a polarization direction of the reflection light is rotated by 90 degrees as compared with forward path light. As a result, the reflection light of the laser light for the ATS/reproducing that is incident as described above is reflected by the polarization beam splitter 13.

The reflection light of the laser light for the ATS/reproducing that is reflected by the polarization beam splitter 13 is focused on a light reception surface of the light receiving unit 23 for the recording layer through a condensing lens 22.

In this case, a light reception signal that is obtained by receiving the reflection light of the laser light for the ATS/reproducing by the light receiving unit 23 for the recording layer is hereinafter represented as a light reception signal DT-r.

In the optical pickup OP, an optical system that guides the laser light for the reference surface emitted from the laser 24 for the servo to the objective lens 20 and guides the reflection light of the laser light for the reference surface from the multi-layer recording medium 1 incident on the objective lens 20 to the light receiving unit 29 for the servo is formed.

As illustrated in FIG. 15, the laser light for the reference surface that is emitted from the laser 24 for the servo is converted to become parallel light through the collimate lens 25 and is incident on the polarization beam splitter 26. The polarization beam splitter 26 is configured to transmit the laser light (forward path light) for the reference surface incident from the side of the laser 24 for the servo.

The laser light for the reference surface that has been transmitted through the polarization beam splitter 26 is incident on the dichroic prism 19 through the ¼ wavelength plate 27.

As described above, the dichroic prism 19 is configured to reflect light having the same wavelength band as the laser light for the recording and the laser light for the ATS/reproducing and transmit light having the other wavelengths. Therefore, the laser light for the reference surface transmits the dichroic prism 19 and is radiated to the multi-layer recording medium 1 (reference surface Ref) through the objective lens 20.

The reflection light (reflection light from the reference surface Ref) of the laser light for the reference surface that is obtained when the laser light for the reference surface is radiated to the multi-layer recording medium 1 passes through the objective lens 20, transmits the dichroic prism 18, and is incident on the polarization beam splitter 26 through the ¼ wavelength plate 27.

Similar to the case of the laser light for the ATS/reproducing described above, because the reflection light of the laser light for the reference surface that is incident from the side of the multi-layer recording medium 1 is incident on the polarization beam splitter 13 passes through the ¼ wavelength plate two times on a forward path and a backward path, a polarization direction of the reflection light is rotated by 90 degrees as compared with forward path light. Therefore, the reflection light of the laser light for the reference surface is reflected by the polarization beam splitter 26.

The reflection light of the laser light for the reference surface that is reflected by the polarization beam splitter 26 is focused on a light reception surface of the light receiving unit 29 for the servo light through the condensing lens 28.

In this case, a light reception signal that is obtained by receiving the reflection light of the laser light for the reference surface by the light receiving unit 29 for the servo light is hereinafter represented as a light reception signal DT-sv.

Meanwhile, as illustrated in FIG. 1, in the multi-layer recording medium 1, the reference surface Ref is provided with respect to the lower layer side of the recording layer formation region 5. For this reason, when recording is performed, the focus servo control of the objective lens 20 is performed such that the laser light for the reference surface is focused on the reference surface Ref provided on the lower layer side of the recording layer formation area. In addition, with respect to the laser light for the recording and the laser light for the ATS/reproducing, by driving the focus mechanism (lens driving unit 16) by the focus servo control based on the reflection light of the laser light for the ATS/reproducing, the collimation state of the laser light for the recording and the laser light for the ATS/reproducing incident on the objective lens 20 is adjusted such that the laser light for the recording and the laser light for the ATS/reproducing is focused on the recording layer 3 formed on the upper layer side of the reference surface Ref.

The tracking servo control of the laser light for the ATS/reproducing at the time of reproducing is performed by making the spot of the laser light for the ATS/reproducing follow the mark string formed in the recording layer 3 defined as the reproducing object. That is, the tracking servo control with respect to the laser light for the ATS/reproducing at the time of reproducing can be realized by controlling the position of the objective lens 20 on the basis of the reflection light of the laser light for the ATS/reproducing.

The focus servo control at the time of reproducing may be the same as that at the time of recording.

Figure 16:
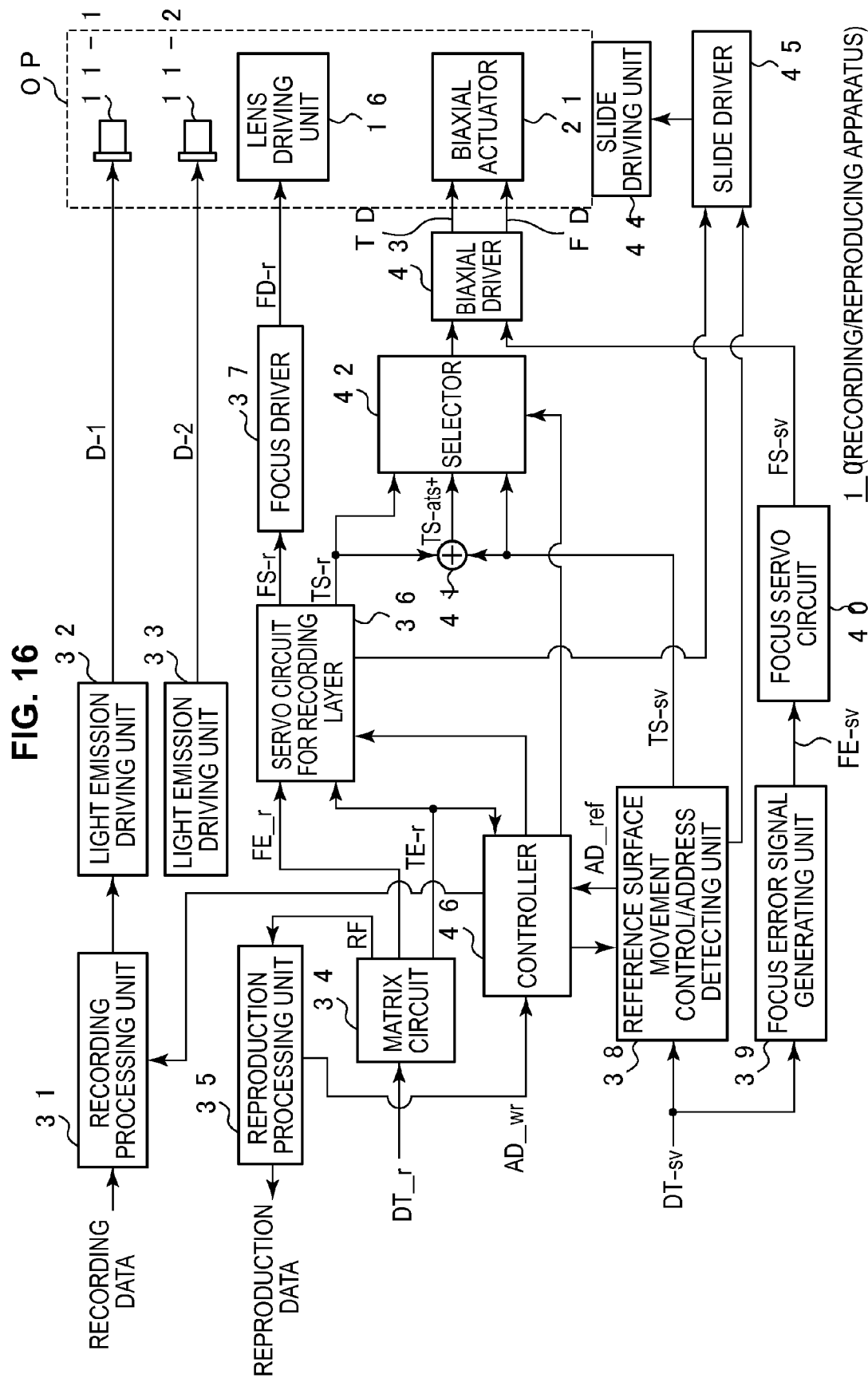
FIG. 16 is a diagram illustrating an entire internal configuration of a recording apparatus according to an embodiment.

FIG. 16 illustrates an entire internal configuration of the recording/reproducing apparatus 10 according to the embodiment.

In FIG. 16, with respect to the internal configuration of the optical pickup OP, only the laser 11-1 for the recording, the laser 11-2 for the ATS/reproducing, the lens driving unit 16, and the biaxial actuator 21 are extracted from the configuration illustrated in FIG. 15 and are illustrated.

In FIG. 16, the illustration of the spindle motor 30 illustrated in FIG. 15 is omitted.

In FIG. 16, outside the optical pickup OP in the recording/reproducing apparatus 10, a recording processing unit 31, a light emission driving unit 32, a light emission driving unit 33, a matrix circuit 34, a reproduction processing unit 35, a servo circuit 36 for a recording layer, a focus driver 37, and a biaxial driver 43 are provided as a configuration to perform recording/reproducing with respect to the recording layer 3 in the multi-layer recording medium 1 or position control of focusing/tracking based on reflection light from the recording layer 3.

The recording processing unit 31 generates a recording modulation code according to input recording data. Specifically, the recording processing unit 31 executes a process for adding an error correction code or a predetermined recording modulation coding process with respect to the input recording data and obtains a recording modulation code string to be a binary data string of "0" and "1" to be actually recorded with respect to the recording layer 3.

At this time, the recording processing unit 31 also executes an addition process of address information (recording layer address AD_wr: PSN) with respect to the recording data, according to an instruction from a controller 46 to be described below.

The recording processing unit 31 provides a recording signal based on the generated recording modulation code string to the light emission driving unit 32.

The light emission driving unit 32 generates a laser drive signal D-1 based on the recording signal input from the recording processing unit 31 at the time of recording and drives light emission of the laser 11-1 for the recording on the basis of the drive signal D-1. Thereby, a mark string according to the recording data can be recorded with respect to the recording layer 3.

The light emission driving unit 33 drives light emission of the laser 11-2 for the ATS/reproducing by reproducing power, according to a laser drive signal D-2 in FIG. 16.

The matrix circuit 34 generates an RF signal (reproduction signal), a focus error signal FE-r, and a tracking error signal TE-r, on the basis of a light reception signal DT-r (output current) from a plurality of light receiving elements functioning as the light receiving unit 23 for the recording layer illustrated in FIG. 15.

The focus error signal FE-r becomes a signal that indicates a focus error of the laser light for the ATS/reproducing with respect to the recording layer 3 defined as a recording/reproducing object. The tracking error signal TE-r becomes a signal that indicates a position error of the spot position of the laser light for the ATS/reproducing with respect to the track formed in the recording layer 3 in a radius direction.

As can be understood from the above description, in this example, because the focus servo control with respect to the laser light for the recording layer is performed on the basis of the reflection light of the laser light for the ATS/reproducing at the time of recording/reproducing, the focus error signal FE-r is used at the time of recording/reproducing.

The tracking error signal TE-r is used in the tracking servo control as the ATS+ at the time of recording and is used in the tracking servo control to make the laser light for the ATS/reproducing follow the reproducing object mark string on the recording layer 3 at the time of reproducing.

The RF signal that is obtained by the matrix circuit 34 is supplied to the reproduction processing unit 35 and the focus error signal FE-r and the tracking error signal TE-r are supplied to the servo circuit 36 for the recording layer.

In the case of this embodiment, the tracking error signal TE-r is supplied to the controller 46.

The reproduction processing unit 35 executes a binarization process with respect to the RF signal and a predetermined demodulation process such as recording modulation code decoding or an error correction process and obtains reproduction data obtained by restoring the recording data.

The reproduction processing unit 35 also executes a reproducing (detection) process with respect to the recording layer address AD_wr inserted into the recording data. The recording layer address AD_wr that is detected by the reproduction processing unit 35 is supplied to the controller 46.

The servo circuit 36 for the recording layer executes a servo operation process with respect to the focus error signal FE-r and the tracking error signal TE-r and generates a focus servo signal FS-r and a tracking servo signal TS-R.

As described above, in this embodiment, the servo control based on the ATS+ is performed as the tracking servo control at the time of recording with respect to the recording layer 3.

As described in FIG. 8, in the ATS+, a control band of an ATS control system including an ATS-side servo filter (that is, a cutoff frequency of a tracking servo filter included in the servo circuit 36 for the recording layer) is set to a frequency lower than a frequency when normal servo control is performed. As described above, in this example, the control band is set to about 1 kHz.

Meanwhile, with respect to the tracking servo control to be performed at the time of reproducing and to make the laser light for the ATS/reproducing follow the track of the recording layer 3, the same control band (for example, about 10 kHz) as the case in which the normal servo control is performed should be set to enable following with respect to the disturbance component.

The servo circuit 36 for the recording layer is configured to switch a cutoff frequency of the tracking servo filter to execute the servo operation process with respect to the tracking error signal TE-r.

The switching of the cutoff frequency is performed according to an instruction from the controller 46.

The tracking servo signal TS-r is supplied to an adding unit 41 and a selector 42 to be described below.

The focus servo signal FS-r is supplied to the focus driver 37 as illustrated in FIG. 16. The focus driver 37 generates a focus drive signal FD-r based on the focus servo signal FS-r and drives the lens driving unit 16 on the basis of the focus drive signal FD-r.

Thereby, the focus servo control with respect to the laser light for the recording and the laser light for the ATS/reproducing (focus servo control to focus the laser light for the recording and the laser light for the ATS/reproducing on the recording layer 3) is realized.

The servo circuit 36 for the recording layer is configured to perform the control with respect to the slide movement of the optical pickup OP by the slide driving unit 44.

The slide driving unit 44 holds the entire optical pickup OP to be slid in a tracking direction.

At the time of reproducing, the servo circuit 36 for the recording layer extracts a low frequency component of the tracking error signal TE-r, generates a slide error signal, and generates a slide servo signal based on the slide error signal. By providing the slide servo signal to the slide driver 45 and driving the slide driving unit 44, the slide servo control of the optical pickup OP is realized.

The servo circuit 36 for the recording layer provides a control signal according to an instruction from the controller 46 to the slide driver 45 and realizes necessary slide movement of the optical pickup OP by the slide driving unit 44.

The servo circuit 36 for the recording layer also performs execution control of a track jump operation for turning off the tracking servo and jumping the spot of the laser light for the ATS/reproducing to another track, according to an instruction from the controller 46.

In the recording/reproducing apparatus 10, a reference surface movement control/address detecting unit 38, a focus error signal generating unit 39, and a focus servo circuit 40 are provided as a signal processing system with respect to the reflection light of the laser light for the reference surface.

The focus error signal generating unit 39 generates a focus error signal FE-sv indicating a focus error of the laser light for the reference surface with respect to the reference surface Ref (reflection surface of the reflection film 7), on the basis of the light reception signal DT-sv from the plurality of light receiving elements in the light receiving unit 29 for the servo light illustrated in FIG. 11.

The focus servo circuit 40 executes a servo operation process with respect to the focus error signal FE-sv generated by the focus error signal generating unit 39 and generates the focus servo signal FS-sv.

The focus servo signal FS-sv that is generated by the focus servo circuit 40 is supplied to the biaxial driver 43.

The biaxial driver 43 generates a focus drive signal FD based on the focus servo signal FS-sv and drives the focus coil of the biaxial actuator 21 on the basis of the focus drive signal FD.

Thereby, the focus servo control with respect to the laser light for the reference surface (focus servo control to focus the laser light for the reference surface on the reference surface Ref) is realized.

The reference surface movement control/address detecting unit 38 performs reference surface movement control (movement control with respect to the spot position of the laser light for the reference surface on the reference surface Ref) and detection of the reference surface address AD_ref recorded on the reference surface Ref, on the basis of the light reception signal DF-sv obtained by the light receiving unit 29 for the servo light.

Specifically, the control to realize the reference surface seek (seek based on the reference surface address AD_ref) described above or any pitch spiral movement control described above is performed as the reference surface movement control.

As can be understood from the above description, in any pitch spiral movement control, generation of the /P/P signal based on the light reception signal DT_sv, the selector signal, and the clock CLK or generation of the tracking error signal TE-sv based on the signals is performed. In addition, an offset of a saw tooth wave is provided with respect to the tracking error signal TE-sv.

As the specific configuration to realize any pitch spiral movement control, the same configuration as the configuration disclosed in Japanese Patent Application Laid-Open No. 2010-225237 or 2011-198425 may be adopted and explanation thereof is omitted herein.

As the seek operation control of the reference surface Ref, control to provide the control signal to the slide driver 45 to execute the slide movement of the optical pickup OP according to an instruction from the controller 46 or realize the jump operation for turning off the tracking servo and jumping the spot of the laser light for the reference surface to another track (becoming a pit string in this case) is performed.

The reference surface movement control/address detecting unit 38 executes a servo operation process with respect to the tracking error signal TE-sv and generates a tracking servo signal TS-sv to make the beam spot of the laser light for the reference surface follow the predetermined pit string (any one of A to F) on the reference surface Ref.

As can be understood from the description of FIG. 8, a cutoff frequency of a tracking servo filter of the reference surface movement control/address detecting unit 38 is set to a frequency (about 10 kHz in this case) equal to a frequency when the normal servo control is performed to enable following disturbance.

The detection of the reference surface address AD_ref may be performed by the method described in FIG. 11.

As a configuration to detect the reference surface address AD_ref, the same configuration as the configuration disclosed in Japanese Patent Application Laid-Open No. 2010-225237 or 2011-198425 may be adopted and explanation thereof is omitted herein.

The reference surface address AD_ref that is detected by the reference surface movement control/address detecting unit 38 is supplied to the controller 46.

The tracking servo signal TS-sv that is generated by the reference surface movement control/address detecting unit 38 is supplied to the adding unit 41 and the selector 42 described above.

In this case, an output signal from the servo circuit 36 for the recording layer and an output signal from the reference surface movement control/address detecting unit 38 are input to the selector 42. A tracking servo signal TS-ats+ that is obtained by adding the tracking servo signal TS-r from the servo circuit 36 for the recording layer and the tracking servo signal TS-sv from the reference surface movement control/address detecting unit 38 by the adding unit 41 and is used to realize the ATS+ is also input to the selector 42.

The selector 42 selects one of three systems of input signals and outputs the signal, according to an instruction from the controller 46.

An output signal from the selector 42 is supplied to the biaxial driver 43.

The biaxial driver 43 generates a tracking drive signal TD based on the output signal from the selector 42 and drives the tracking coil of the biaxial actuator 21, on the basis of the tracking drive signal TD.

As can be understood from the above description, aspects of the position control that is performed when recording/reproducing is performed with respect to the multi-layer recording medium 1 can be classified into the following four aspects.

·When reference surface seek is performed
→slide movement control or track jump (pit string jump) control on the reference surface Ref
·When recording is performed (recording other than recording of a track for ATS guide)
→ATS+ (in this example, accompanied with any pitch spiral movement control)
·When recording layer seek (seek performed using laser light for a recording layer after the reference surface seek: correction seek) is performed
→track jump control on at least the recording layer 3
·When reproducing is performed (during reproducing)
→tracking servo control using the tracking servo signal TS-r (servo control to make the laser light for the ATS/reproducing follow the track on the recording layer 3)

The selector 42 is provided to switch an output signal with respect to the biaxial driver 43, according to each of the four aspects.

Specifically, the selector 42 selects an input signal (tracking servo signal TS-ats+) from the adding unit 41 such that the ATS+ is executed, according to an instruction from the controller 46, when recording is performed.

The selector 42 selects an input signal (tracking servo signal TS-r) from the servo circuit 36 for the recording layer, according to an instruction from the controller 46, when reproducing is performed.

The selector 42 selects an input signal (becoming a track jump signal) from the reference surface movement control/address detecting unit 38, according to an instruction from the controller 46, when reference surface seek is performed.

The selector 42 selects an input signal (becoming a track jump signal) from the servo circuit 36 for the recording layer, according to an instruction from the controller 46, when recording layer seek is performed.

By performing the switching control, the position control according to the aspect corresponding to each of when the reference surface seek is performed, when the recording is performed, when the recording layer seek is performed, and when the reproducing is performed is realized.

The controller 46 is composed of a microcomputer including a central processing unit (CPU) and a memory such as a read only memory (ROM) and a random access memory (RAM). The controller 46 executes control/a process according to a program stored in the ROM and wholly controls the recording/reproducing apparatus 10.

For example, the controller 46 outputs an instruction with respect to the reference surface movement control/address detecting unit 38 on the basis of the reference surface address AD_ref input from the reference surface movement control/address detecting unit 38 and performs seek operation control (reference surface seek operation control) to move a spot position of the laser light for the reference surface to the predetermined reference surface address AD_ref.

The controller 46 outputs an instruction with respect to the servo circuit 36 for the recording layer on the basis of the recording layer address AD_wr input from the reproduction processing unit 35 and performs seek operation control (recording layer seek operation control) to move a spot position of the laser light for the ATS/reproducing to the predetermined recording layer address AD_wr.

As can be understood from the above description, the controller 46 causes the selector 42 to select the input signal from the reference surface movement control/address detecting unit 38, when the reference surface seek control is performed, and causes the selector 42 to select the input signal from the servo circuit 36 for the recording layer, when the recording layer seek operation control is performed.

The controller 46 causes the selector 42 to select the tracking servo signal TS-ats+ from the adding unit 41, such that the tracking servo control based on the ATS+ is performed, when the recording is performed.

The controller 46 causes the selector 42 to select the input signal from the servo circuit 36 for the recording layer, such that the tracking servo control based on the tracking servo signal TS-r is performed, when the reproducing is performed.

At this time, the controller 46 outputs a switching instruction with respect to the servo circuit 36 for the recording layer, such that switching of the servo control band by the servo circuit 36 for the recording layer is performed, when the recording is performed and when the reproducing is performed.

When recording with respect to the recording layer 3 starts, if it is necessary to form the track for the guide illustrated in FIG. 5, the ATS+ is applied after the reference surface seek is performed and the track for the guide is formed.

As such, when it is necessary to form the track for the guide after the reference surface seek, the controller 46 outputs instructions with respect to the reference surface movement control/address detecting unit 38 and the recording processing unit 31, according to completion of the reference surface seek, and starts recording of spirals based on the predetermined pitch.

Then, according to advancement of recording of spirals corresponding to the predetermined number of turns, the controller 46 outputs an instruction with respect to the reference surface movement control/address detecting unit 38, narrows the spiral pitch, and starts monitoring amplitude of the tracking error signal TE-r.

As the monitoring result, when it is determined that the amplitude of the tracking error signal TE-r is obtained with a predetermined aspect (for example, zero-cross) in which it can be assumed that pull-in of the tracking servo is enabled, the controller 46 outputs an instruction to the selector 42, such that switching is performed from a selection aspect of the past tracking servo signal TS-sv to a selection aspect of the tracking error signal TS-ats+.

Thereby, recording based on the ATS+ starts.

When it is not necessary to form the track for the guide at the time of starting the recording (that is, when a continuation portion of the existing spiral is recorded), in order to switch the servo control into the servo control based on the ATS+, according to the completion of the reference surface seek, the controller 46 outputs an instruction to the selector 42, such that switching is performed from the selection aspect of the past tracking servo signal TS-sv to the selection aspect of the tracking error signal TS-r. After the pull-in of the tracking servo is performed according to the switching, according to necessity, the controller 46 outputs an instruction to the servo circuit 36 for the recording layer to execute the recording layer seek operation, such that recording from the predetermined recording start position starts.

When the reproducing starts, in order to switch the servo control into the servo control based on the tracking servo signal TS-r, according to the completion of the reference surface seek, the controller 46 outputs an instruction to the selector 42, such that switching is performed from the selection aspect of the past tracking servo signal TS-sv to the selection aspect of the tracking servo signal TS-r. After the pull-in of the tracking servo is performed according to the switching, according to necessity, the controller 46 outputs an instruction to the servo circuit 36 for the recording layer to execute the recording layer seek operation, such that reproducing from the predetermined reproducing start position starts.

The controller 46 executes a process illustrated in FIGS. 26 to 30 to be described below and realizes the recording/reproducing operation according to the embodiment. This will be described in detail below.

[1-6. Recording Method According to Embodiment]

Hereinafter, a recording method according to the embodiment will be described.

Figure 17:
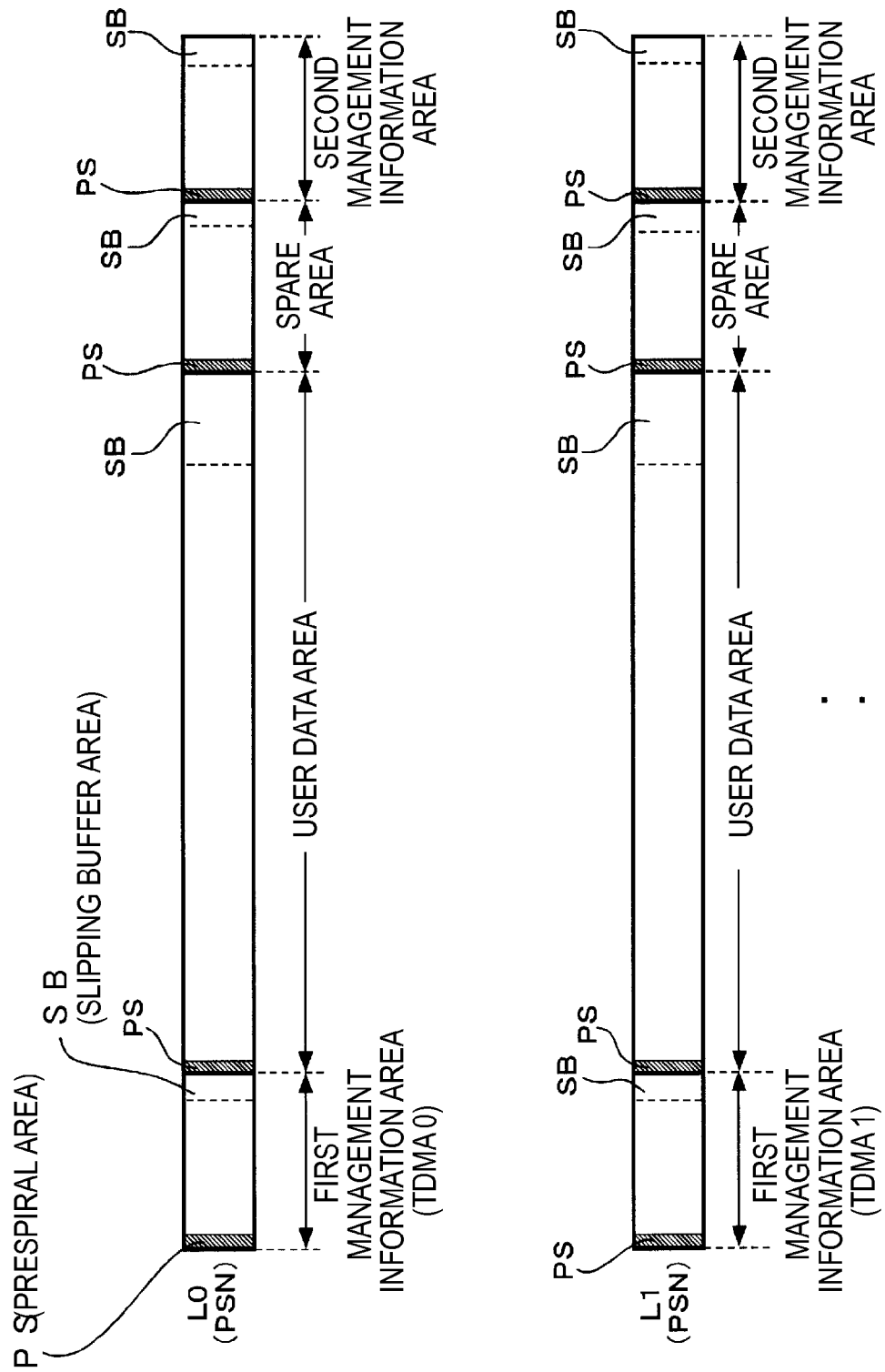
FIG. 17 is a diagram illustrating an area structure of a recording layer of a recording medium according to an embodiment.

FIG. 17 illustrates an area structure of a recording layer of the multi-layer recording medium 1.

In this case, the area structure is realized by data management based on the PSN functioning as a physical address. In this sense, the area structure illustrated in FIG. 17 can called a structure of a physical address space.

In order to simplify the description, FIG. 17 illustrates only area structures of a recording layer L0 and a recording layer L1. However, area structures of the other recording layers 3 (L2 to L4) are the same as the area structures of the recording layers L0 and L1.

As illustrated in FIG. 17, in each recording layer 3, a user data area, a first management information area, a second management information area, and a spare area are provided.

In this case, the first management information area becomes an area provided at a most front side, when viewed from a recording advancement direction. After the first management information area, the user data area, the spare area, and the second management information area are sequentially arranged.

The first and second management information areas become areas to record management information to manage data recorded on the user data area.

In the case of this example, a temporary disc management area (TDMA) is allocated to the first management information area. As illustrated in FIG. 17, a TDMA in the recording layer L0 is TDMA0 and TDMA in the recording layer L1 is TDMA 1. Although illustration is omitted, TDMAs in the first management information areas of the recording layers L2 to L4 become TDMA2, TDMA3, and TDMA4, respectively.

The spare area is an area that is provided as a preliminary recording area and is used in a replacement process to be described below.

In this embodiment, one prespiral area PS to form the prespiral is previously secured in each of the user data area, the first management information area, the second management information area, and the spare area. As can be understood from the above description, the recording length of the prespiral is set to the predetermined length based on the maximum spot deviation amount D_max.

In this embodiment, a slipping buffer area SB to enable slipping replacement to be described below is secured in each of the user data area, the first management information area, the second management information area, and the spare area.

In this case, the area structure illustrated in FIG. 17 is formed when the multi-layer recording medium 1 is formatted.

Specifically, the area structure illustrated in FIG. 17 is formed by determining at least a head PSN (head physical address) with respect to each area, when the multi-layer recording medium 1 is formatted.

As described above, when a defect occurs on the recording layer, a recording area of data to be recorded in an occurrence section of the defect is replaced with the spare area.

However, when a method of replacing a recording area with the spare area for each defect occurrence is adopted, a recording/reproducing rate may be decreased because seek of a relatively long distance is performed.

Therefore, in this embodiment, after the slipping buffer area illustrated in FIG. 17 is secured on the physical address space, so-called slipping replacement is performed.

FIGS. 18A and 18B are diagrams illustrating a slipping replacement process according to this embodiment.

FIG. 18A illustrates a state in which only the user data area of the area structure of the certain recording layer 3 illustrated in FIG. 17 is extracted.

Figure 18:
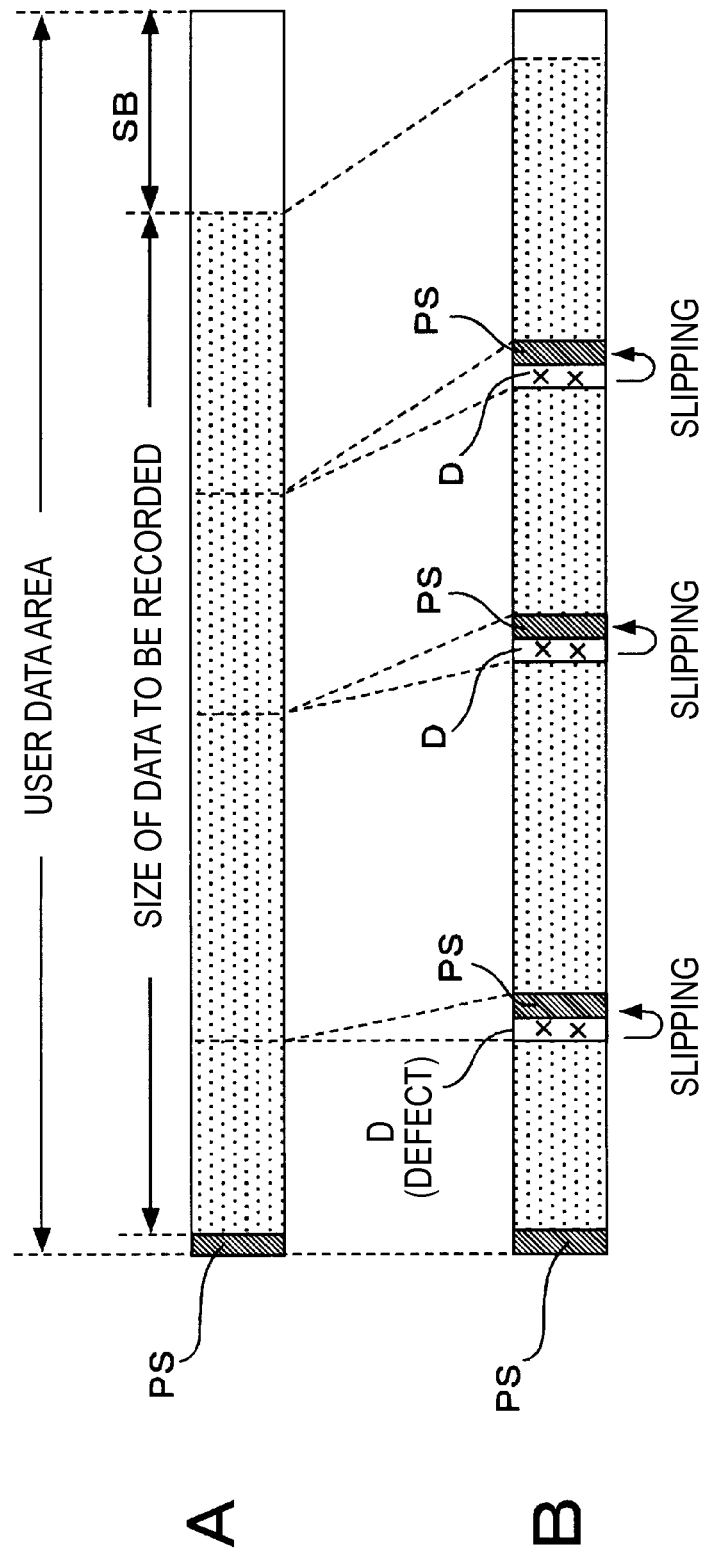
FIGS. 18A and 18B are diagrams illustrating a slipping replacement process according to this embodiment.

In this case, it is assumed that a size of data to be recorded is "a size of a user data area"—"a size of a sleeping buffer area SB"—"a size of a prespiral area PS", as illustrated by a screen portion in FIG. 18.

When the data having the size described above is recorded with respect to the user data area, a plurality of defects D occur in the user data area, as illustrated in FIG. 18B.

The slipping replacement becomes a replacement method of recording the remaining data on the rear side (in an area defined as a recording object) having skipped an occurrence section of the defect D, according to occurrence of the defect D.

Specifically, in an example of FIG. 18B, the number of occurrence places of the defects D is three and data to be recorded is distributed to four places and is recorded, with the occurrence sections of the defects D as boundaries.

In this embodiment, before real data is recorded, a prespiral is recorded (dummy data is recorded). Therefore, as the slipping replacement process according to this embodiment, recording of the prespiral is performed from a position having skipped the occurrence section of the defect D, according to the occurrence of the defect D and recording of the user data corresponding to the real data then starts.

In other words, this means that a total area of the occurrence section of the defect and the recording section of the prespiral is consumed (irrespective of recording of the real data) whenever the detect D occurs, according to performance of the slipping replacement according to this embodiment.

FIG. 18B illustrates the case in which a total capacity of "the defect occurrence section and the recording section of the prespiral" to be consumed whenever the defect D occurs is settled within the preset capacity of the slipping buffer area SB, which results in completely recording data to be recorded in the user data area.

Meanwhile, each area that is divided for each occurrence section of the defect D as described above is an independent spiral, as can be understood from the prespiral recorded in the head thereof.

In this embodiment, sequential spiral information (SSI) is defined as information (spiral management information) to manage each independent spiral.

FIGS. 19A and 19B are diagrams illustrating the SSI.

FIG. 19A illustrates a data structure example of an SSI entry (entry information of the SSI).

The entry of the SSI is performed when the format is performed as described in FIG. 17 or when new spiral (area) is registered according to the slipping replacement described above.

As illustrated in FIG. 19A, information of at least "Start PSN of Pre Sprial", "Start PSN of Spiral", "size of Spiral", "status1", and "status 2", and "size of Slipping Buffer" is described in the SSI entry.

FIG. 19A illustrates an example of the case in which "Start PSN of Pre Spiral" is allocated to bit6-0 of Byte0 and Byte1-3 in the SSI entry, "Start PSN of Sprial" is allocated to bit6-0 of Byte4 and Byte5-7, "size of Spiral" is allocated to bit0 of Byte8 and Byte9-11, "status1" and "status2" are allocated to bit7-4 of Byte12 and bit3-0 of Byte12, respectively, and "size of Slipping Buffer" is allocated to Byte13-15 and each of bit7 of Byte0, bit7 of Byte4, and bit7-1 of Byte8 is "reserved".

The "Start PSN of Pre Spiral" means a head (start) PSN of the prespiral area PS.

The "Start PSN of Spiral" means a head (start) PSN of a recording section of real data to be an area continuous to the prespiral area PS.

The "size of Spiral" means a size of the recording section of the real data (a writing schedule size is described in a step in which the spiral is newly set such as when the format is performed).

The "size of Slipping Buffer" means a size of the slipping buffer area SB.

The "status1" is an identifier that indicates a state of the spiral. Specifically, as illustrated in FIG. 19B, the "status1" is an identifier that indicates discrimination of "unused", "prespiral writing", "in use", and "used" of the spiral.

The "unused" of the spiral corresponds to the case in which the area division illustrated in FIG. 17 is performed when the format is performed, that is, only the entry of the SSI with respect to each area illustrated in FIG. 17 is performed and each area (spiral) is in a non-writing state.

The "during the prespiral write" means that writing of the prespiral is being performed (recording of dummy data with respect to the prespiral area PS is being performed). When new SSI is entered and recording of the prespiral starts, the "status1' is changed from "unused" to "during the prespiral write".

The "in use" means a state after writing of the prespiral and before completion of recording of the real data.

The "used" means a state in which additional recording is disabled with respect to the spiral managed by the entry information of the SSI. For example, when the real data to be recorded in the spiral is completely recorded or the slipping replacement is executed according to the occurrence of the defect D (that is, the spiral in which recording is performed is closed), the "status1" is changed from "in use" to "used".

FIG. 19B illustrates an example of the case in which 0000b indicates "unused, 0001b indicates "prespiral writing", 0010b indicates "in use", and 0011b indicates "used" (the other is Reserve).

In FIG. 19A, the "status2" is an identifier that indicates spiral use. Specifically, the "status2" indicates discrimination of "TDMA", "user data area", and "spare area".

The SSI is generated by the controller 46 and is recorded in the TDMA in the multi-layer recording medium 1 at predetermined timing.

FIGS. 20A to 20E illustrate an aspect where new SSI is entered according to the slipping replacement.

Figure 20:
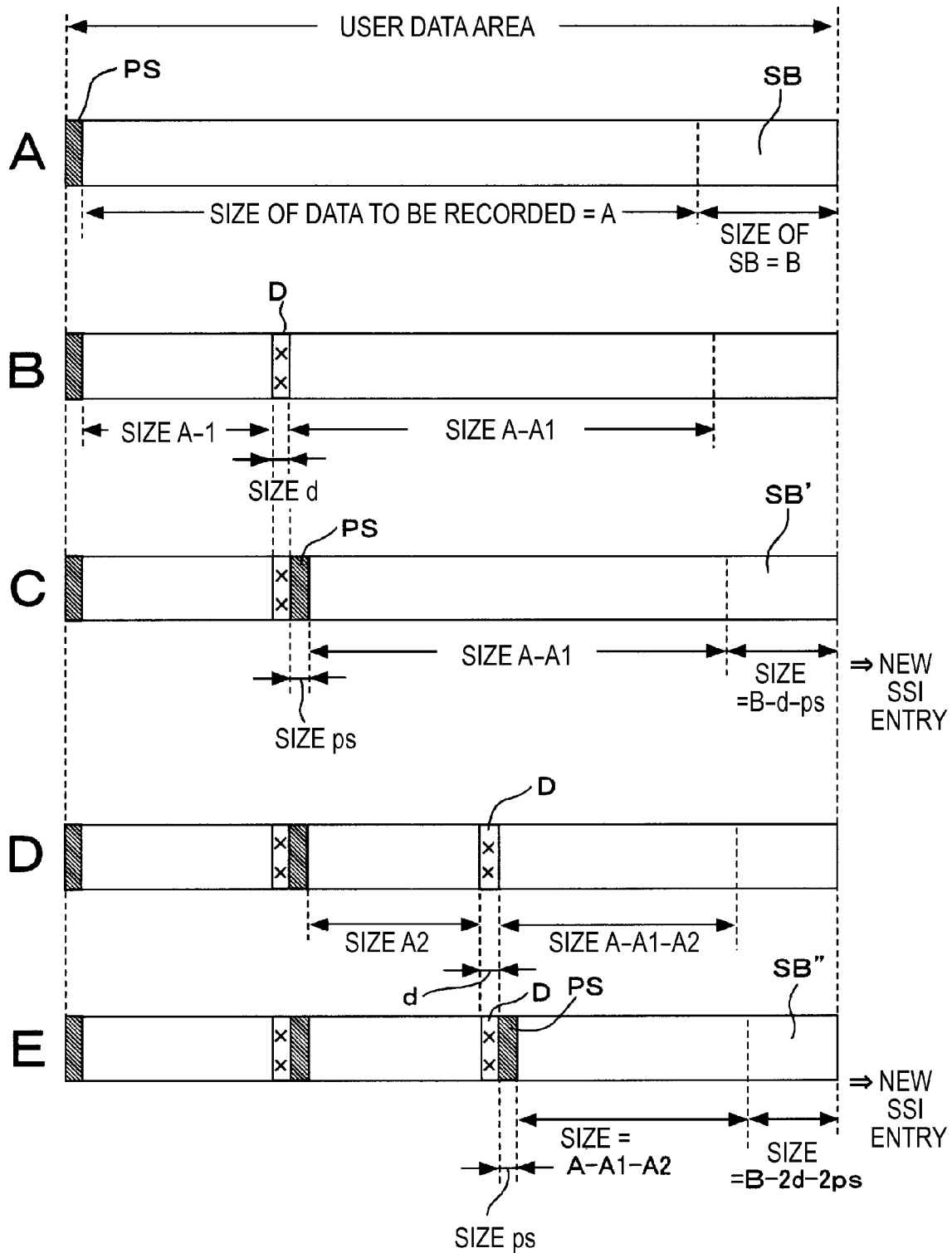
FIGS. 20A to 20E are diagrams illustrating an aspect where new spiral management information is entered according to slipping replacement.

First, as illustrated in FIG. 20A, in a state in which data is not recorded in the user data area, data (user data) having a size of "an entire capacity of the user data area"—"a capacity of the prespiral area PS"—"a capacity of the slipping buffer area SB" shown by "A" should be recorded.

At this time, the capacity of the slipping buffer area SB that is set to the user data area is "B" as illustrated in FIG. 20A.

In this case, because the user data area is in a non-recording state, recording of the prespiral is first executed before recording of the user data. After the recording of the prespiral is performed, recording of the user data starts.

After the recording of the user data starts, when recording of the user data corresponding to the size A1 is performed as illustrated in FIG. 20B, the defect D occurs and slipping replacement should be performed.

As such, when the slipping replacement should be performed, first, the spiral in which recording is performed is closed. In this case, the spiral which recording is performed in and is managed by the SSI becomes a spiral illustrated in FIG. 20A. Specifically, the spiral is a spiral that is managed by the SSI entry in which the "Start PSN of Pre Spiral" is a head PSN of the user data area, the "Start PSN of Spiral" is a PSN of a position of the rear side shifted from the PSN corresponding to the "Start PSN of Pre Spiral" by the prespiral area PS, the "size of Spiral" is the size A described above, and the "size of Slipping Buffer" is the size B described above.

The "size of Spiral" and the "status1" of the corresponding SSI are updated to close the spiral. Specifically, in this case, because the defect D occurs when the user data corresponding to the size A1 is recorded, the "size of Spiral" in the corresponding SSI is updated with the size A1 and the "status1" is updated from the "in use" to the "used" to indicate that additional recording with respect to the spiral is disabled.

Thereby, the spiral in which recording is performed until the occurrence of the defect D is closed.

As such, the spiral in which recording is performed is closed and replacement in which the occurrence section of the defect D has been skipped is performed as the slipping replacement.

Specifically, first, a new spiral (area) to perform recording of the remaining data to be recorded is set to a rear position apart from the head position of the defect D by the predetermined interval.

In this case, the size of the remaining data is "A-A1" as illustrated in FIG. 20B.

In this example, when the defect D occurs, an interval corresponding to the predetermined size d is set (that is, slipping is performed by the size d) as the predetermined interval.

From this point, as illustrated in FIG. 20C, a spiral in which the "Start PSN of Pre Spiral" is set to a PSN of a rear position shifted from the head PSN of the defect D by the predetermined interval d, the "Start PSN of Spiral" is set to a PSN of the rear position further shifted by the size ps, and the "size of Spiral" is set to a size "A-A1" is registered as a new spiral. In other words, information in which the "Start PSN of Pre Spiral", the "Start PSN of Spiral", and the "size of Spiral" are described is newly entered in the SSI.

As such, when the SSI entry is newly registered, the "status1" in the SSI entry is the "unused".

In this case, when the new SSI entry is performed according to the first defect D, the slipping buffer having the set size B is consumed by the size d+ the size ps. As a result, with respect to the "size of Slipping Buffer" in the new SSI entry, a size of "B-d-ps" is described, as illustrated in FIG. 20C (represented as a slipping buffer area SB').

As such, after the new SSI entry is performed, the prespiral is recorded with respect to an area shown by the new SSI entry and recording of the remaining data starts. Thereby, the slipping replacement according to the occurrence of the defect D is performed.

After restarting recording of the remaining data by the slipping replacement according to the occurrence of the first defect D, as illustrated in FIG. 20D, the second defect D occurs when recording corresponding to the size A2 is advanced.

Even in this case, the spiral in which recording is performed is closed according to the occurrence of the defect D. That is, the "size of Spiral" in the SSI entry information that is newly registered according to the occurrence of the first defect D is updated with the size A2 and the "status1" is updated from the "during the use" to the "used".

For the slipping replacement, a new spiral illustrated in FIG. 20E is newly set to the rear position of the occurrence section of the second defect D.

Specifically, SSI entry information in which the "Start PSN of Pre Spiral" is a PSN of a rear position shifted from a head PSN of the second defect D by the predetermined interval d, the "Start PSN of Spiral" is a PSN of a rear position further shifted by the size ps, the "size of Spiral" is the size "A-A1-A2", and the "size of Slipping Buffer" is the size "B-2d-2 ps" (represented as a slipping buffer area SB" in FIG. 20E) is registered.

As such, after the new SSI entry is performed, the prespiral is recorded with respect to an area shown by the new SSI entry and recording of the remaining data starts. Thereby, the slipping replacement according to the occurrence of the second defect D is realized.

As can be known from FIGS. 20A to 20E, in this example, the size of the slipping buffer area SB is newly reset to the size according to the recording advancement degree of the real data, for every new entry of the SSI according to the occurrence of the defect D. In other words, the size of the slipping buffer area SB newly set whenever the defect D occurs is set to the size according to the size of the remaining recording data.

Meanwhile, if the slipping replacement is performed, the seek distance for the replacement can be decreased as compared with the case in which the recording area is replaced with the spare area. As a result, a recording rate and a reproducing rate can be effectively suppressed from decreasing.

However, if the limitation of the data recordable capacity of the multi-layer recording medium 1 is considered, it may be difficult to sufficiently greatly set the capacity of the slipping buffer. In this case, if the case in which an occurrence rate of the defect D is high as in the multi-layer recording medium 1 corresponding to an inferior product is assumed, the replacement process may not be executed by using only the slipping buffer area SB.

Therefore, execution of a combination of the slipping replacement and the replacement of the recording area with the spare area is considered.

Specifically, when the slipping buffer is consumed and the entire data to be recorded may not be recorded, the recording area of the remaining data is replaced with the spare area.

However, when the replacement process in which the slipping replacement and the replacement of the recording area with the spare area are combined (hereinafter, simply referred to as combination replacement process) is realized, the following problems occur.

Figure 21:
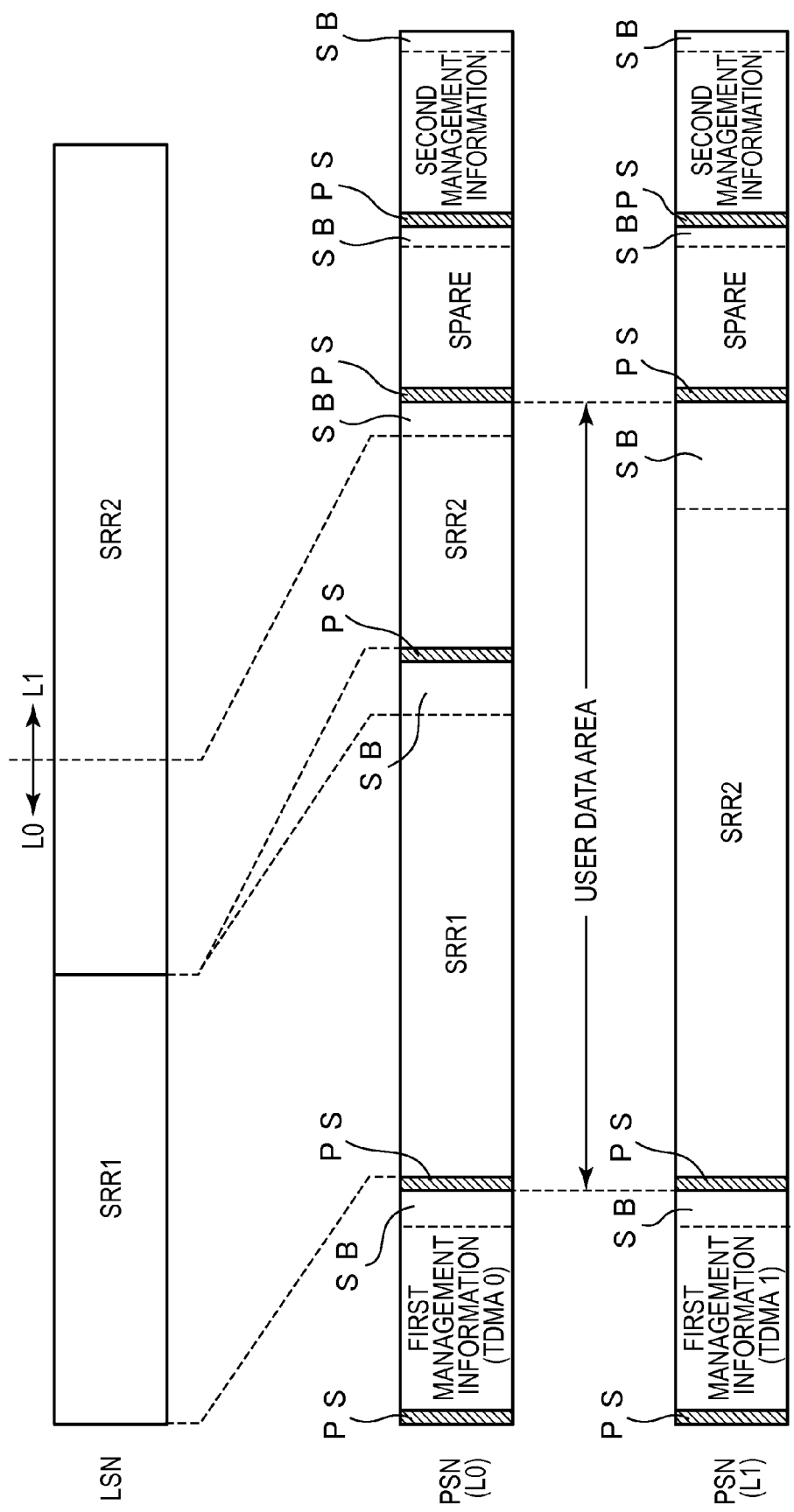
FIG. 21 is a diagram illustrating an example of a relation of a logical address space and a physical address space when area reserve from the side of a host apparatus is performed in actuality, in an embodiment.

FIG. 21 illustrates an example of a relation of a logical address space (based on an LSN) and a physical address space (based on a PSN) when area reserve from the side of a host apparatus is performed in actuality, in an embodiment.

Specifically, FIG. 21 illustrates an example of the case in which two continuous recording areas of SRR1 and SRR2 (SRR: Sequential Recording Range) are set from the side of the host apparatus.

FIG. 21 illustrates an example of the case in which the two continuous recording areas of the SRR1 and the SRR2 are divided and set with respect to two recording areas of a recording layer L0 and a recording layer L1. Specifically, in this case, a boundary of the recording layer L0 and the recording layer L1 exists in the SRR2. In other words, in this case, the size of the SRR1 is smaller than the size of the SRR2.

According to setting of the two continuous recording areas of the SRR1 and the SRR2, a user data area on the recording layer L0 is divided into a data area for the SRR1 and a data area for the SRR2, as illustrated in FIG. 21.

Specifically, the data area for the SSR1 has a prespiral area PS, a recording area of real data for the SRR1, and a slipping buffer area SB.

Likewise, the data area for the SSR2 has a prespiral area PS, a recording area of real data for the SRR2, and a slipping buffer area SB.

As described above, a size of the slipping buffer area SB is set to a size according to a size of a recording area of the real data. As illustrated in FIG. 21, in this case, the size of the slipping buffer area SB in the SRR1 becomes larger than that in the SRR2.

Meanwhile, the entire user data area on the recording layer L1 is allocated to the data area for the SRR2.

In both the recording layers L0 and L1, the area structure other than the user data area is the same as that described above with reference to FIG. 7. Therefore, explanation thereof is omitted.

In actuality, it should be noted that the area division is performed before recording with respect to the multi-layer recording medium 1 and the spare area is not necessarily arranged at the position adjacent to the continuous recording area defined as the recording object, in actuality.

Figure 22:
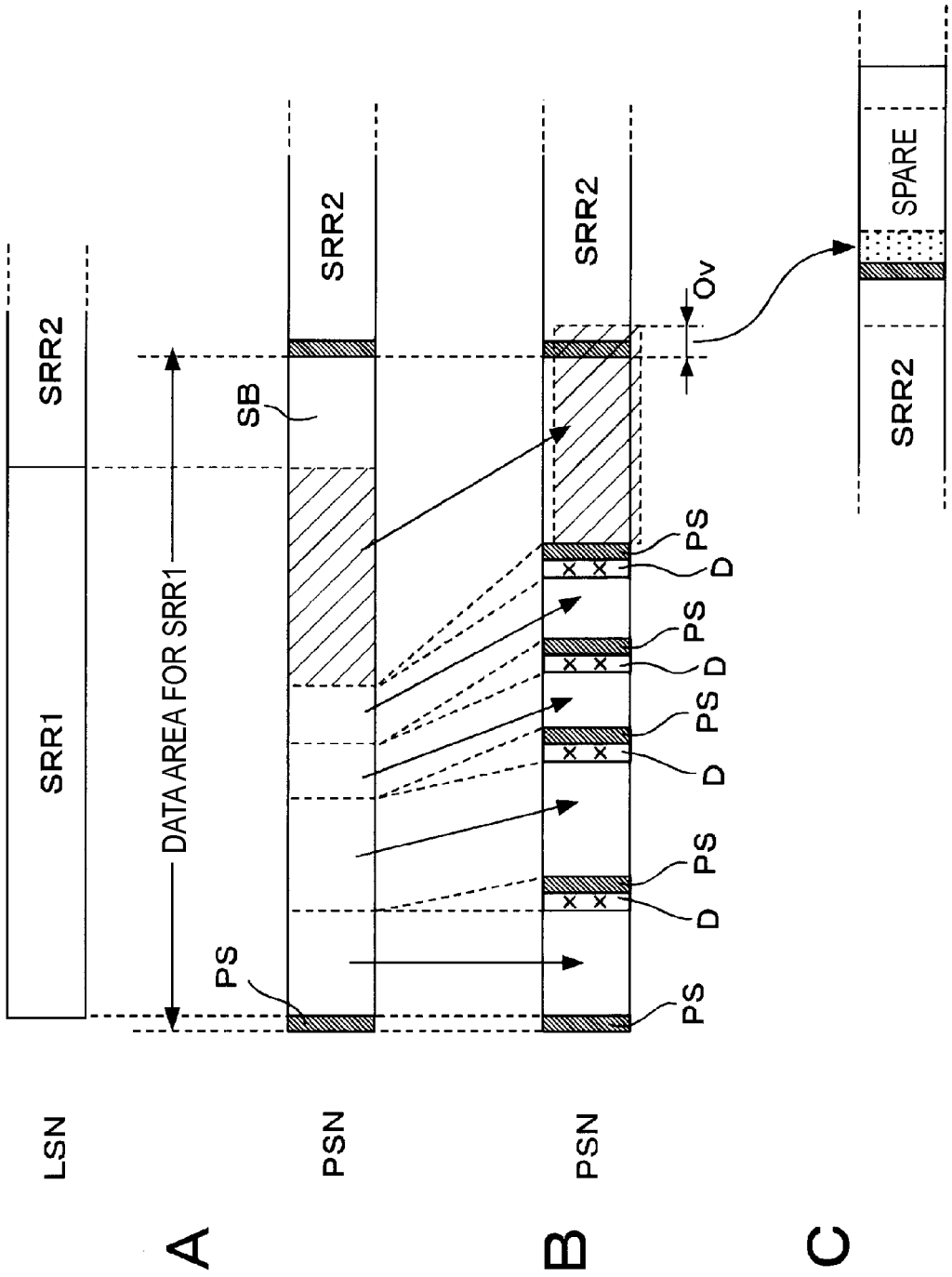
FIGS. 22A to 22C are diagrams illustrating a problem that occurs when combination replacement of slipping replacement and spare area replacement is realized, in an embodiment.

FIGS. 22A to 22C are diagrams illustrating a problem that occurs when the combination replacement described above is realized, in the embodiment.

FIG. 22A illustrates a relation (mainly with respect to the SRR1) of a logical address space and a physical address space when the area division illustrated in FIG. 21 is performed.

FIG. 22B illustrates an aspect where a plurality of defects D occur on the recording layer L0 and the slipping replacement is performed according to the occurrence of the defects, when the real data of the SRR1 is continuously recorded. FIG. 22C illustrates replacement of a recording area with a spare area.

In FIG. 22B, the slipping replacement is performed according to the occurrence of the fourth defect D and a sum of the total section length of the defect D (total section length of the slipping) and the total section length of the prespiral PS in which recording is necessary according to the slipping replacement (the total section length of the prespiral PS recorded for every new entry of the SSI according to the slipping replacement) is more than the capacity of the slipping buffer.

In this case, the capacity of the remaining data (shaded portion in FIG. 22B) to be recorded is more than the capacity of the remaining area in the data area for the SRR1 and a portion shown by "Ov" is not recorded, even if recording of the remaining data is executed.

As such, with respect to the non-recorded data, the replacement of the recording area with the spare area should be performed, as illustrated in FIG. 22C.

However, it should be noted that the replacement of the recording area with the spare area in the BD in the related art is performed using a defect list (DFL) (or TDFL) in which a replacement source PSN and a replacement destination PSN are associated with each other. That is, the replacement of the recording area with the spare area is performed using the PSN functioning as the physical address.

In this case, in a surplus portion (portion more than the residual capacity in the data area) of the remaining data to be recorded, which is shown by "Ov" in FIG. 22B, there is no PSN to be given to the surplus portion (because the corresponding PSN corresponds to a head portion of the SRR2).

With respect to the data portion to which the PSN may not be given, information as the "replacement source PSN" may not be stored in the defect list. As a result, with respect to the data portion becoming the capacity excess, the replacement of the recording area with the spare area may not be performed.

As such, similar to the BD according to the related art, when the method of performing the replacement of the recording area with the spare area using the defect list is simply followed, the combination replacement of the slipping replacement and the spare area replacement may not be realized.

Therefore, in this embodiment, in order to enable the recording area to be replaced with the spare area even when there is no physical address to be given to the recording data due to repetition of the slipping replacement, a virtual address space based on a virtual sector number (VSN) is newly defined and the replacement of the recording area with the spare area is executed using the VSN.

Figure 23:
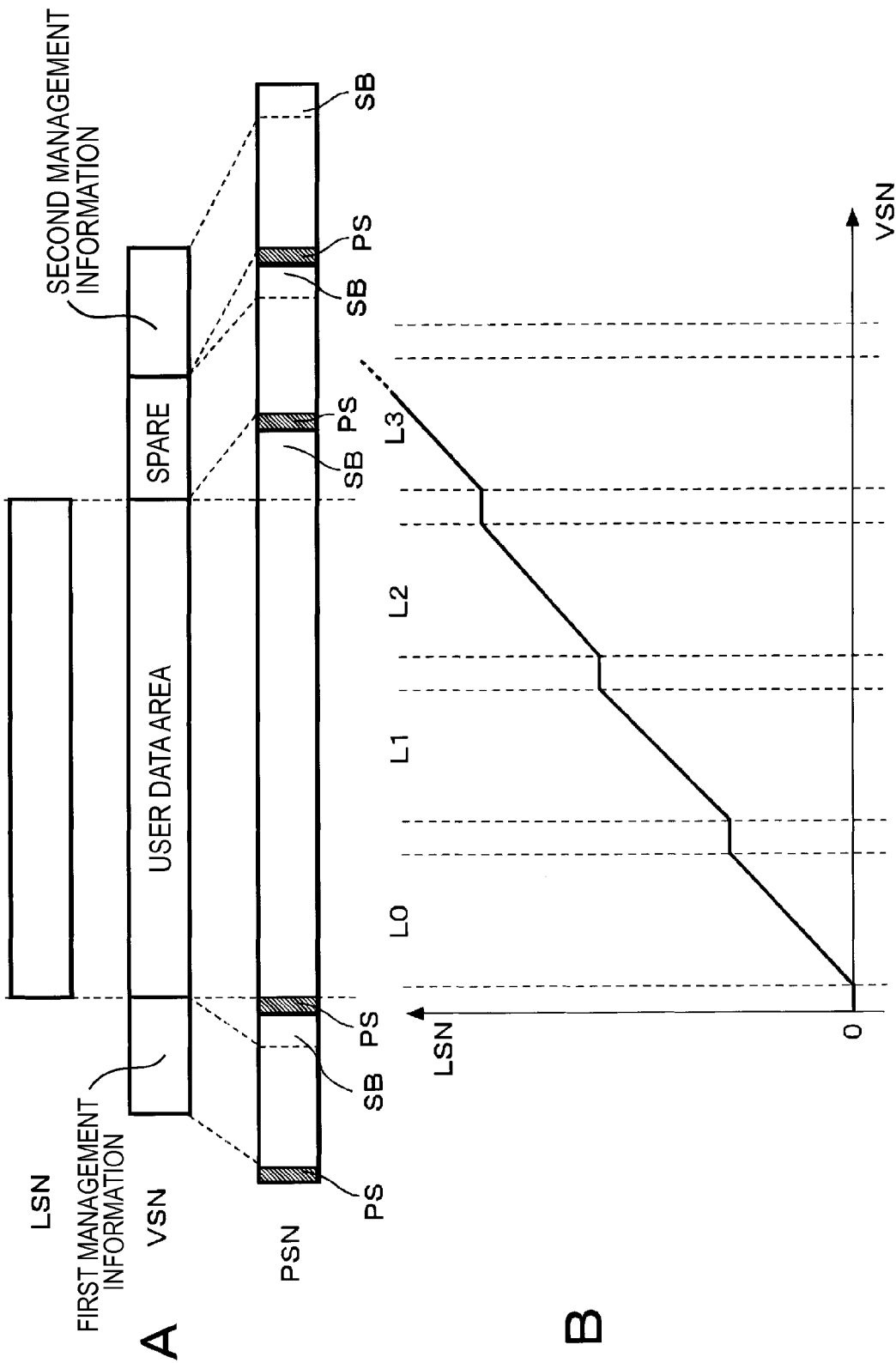
FIGS. 23A and 23B are diagrams illustrating a virtual address.

FIGS. 23A and 23B are diagrams illustrating a virtual address (VSN) that is defined in this embodiment.

FIG. 23A illustrates a relation of a logical address space based on the LSN, a physical address space based on the PSN, and a vertical address space based on the VSN. FIG. 23A illustrates a relation of logical/virtual/physical address spaces with respect to one recording layer 3 among a plurality of recording layers 3.

As illustrated in FIG. 23A, the virtual address space based on the VSN is obtained by adding a spare area, a first management information area, and a second management information area to the logical address space based on the LSN.

As illustrated in FIG. 23A, a size of the user data area on the virtual address space is equal to a size of the logical address space and is equal to a size of a recording section of real data in the user data area on the physical address space (size an area other than the prespiral area PS and the slipping buffer area SB).

If each area of the first management information area, the second management information area, and the spare area on the virtual address space is compared with each area on the physical address space, the prespiral area PS and the slipping buffer area SB are excluded.

FIG. 23B illustrates a correspondence relation of the LSN and the VSN.

As can be understood from the above description, the VSN functioning as the virtual address should be consumed only when the real data is recorded, in each area of the first management information area, the user data area, the spare area, and the second management information area on the physical address space. Meanwhile, the LSN is address information corresponding to only the user data and does not correspond to data other than the user data.

As can be understood from the above description, a value of the LSN increases/decreases in only a recording section of the user data and the value thereof does not increase/decrease in the areas (the spare area and the first and second management information areas: that is, vicinity of a boundary of the recording layers 3) other than the recording section of the user data.

Meanwhile, a value of the VSN increases/decreases to correspond to the recording portion of the real data, in the spare area and the first and second management information areas other than the user data area.

In this embodiment, after the virtual address space based on the VSN is defined, the replacement of the recording area with the spare area is performed using the VSN.

Figure 24:
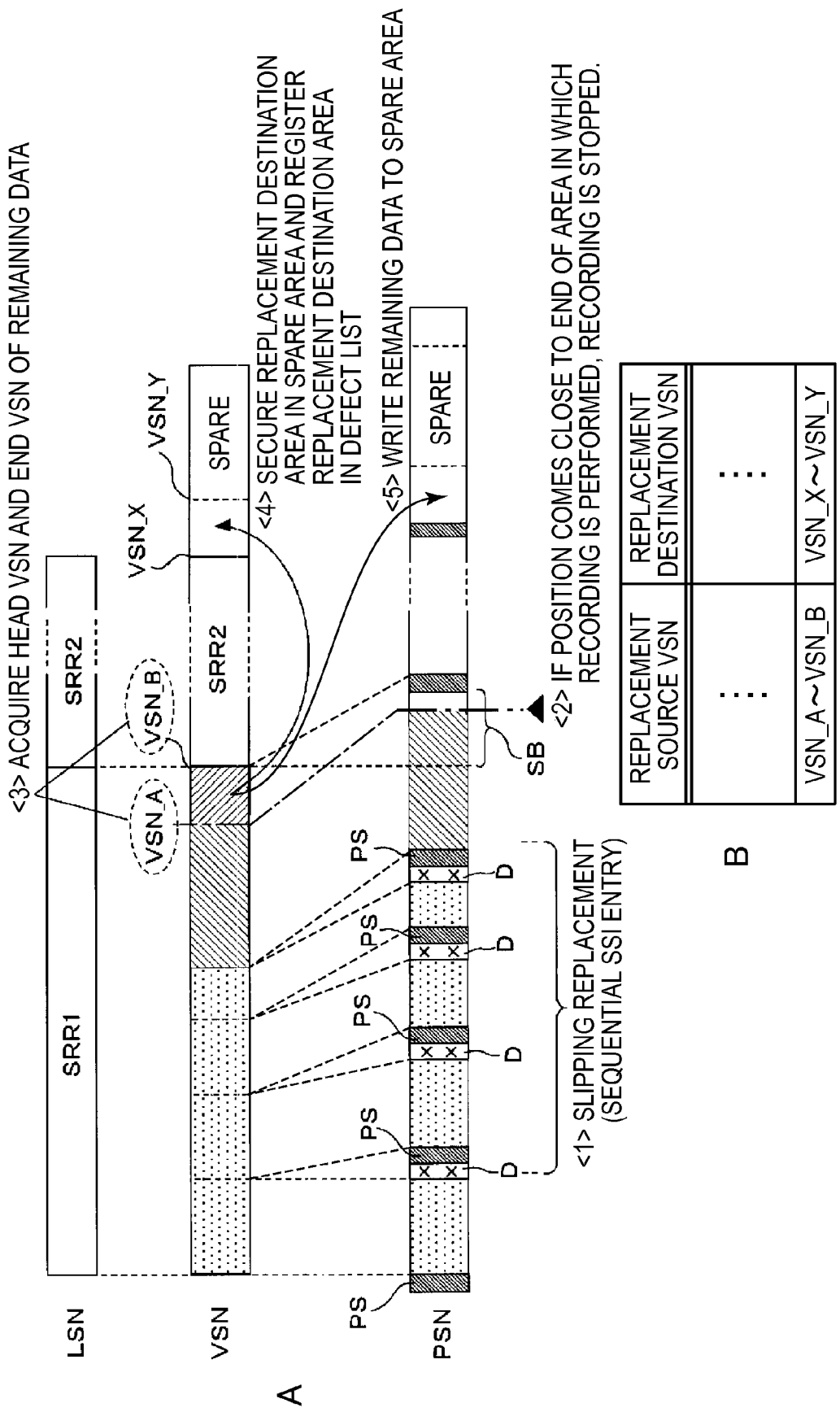
FIGS. 24A and 24B are diagrams illustrating a replacement process according to an embodiment performed using a virtual address.

FIGS. 24A and 24B are diagrams illustrating a replacement process according to an embodiment performed using the VSN.

FIG. 24A illustrates an example of a relation of the logical address space, the virtual address space, and the physical address space mainly with respect to the SRR1 when the area division of the SRR1 and the SRR2 illustrated in FIG. 21 is performed. FIG. 24A also illustrates a relation of spare areas in the virtual address space and the physical address space.

Similar to FIG. 22B, in FIG. 24A, four defects D occur during recording of data of the SRR1. As shown by <1> in FIG. 24A, the slipping replacement is performed whenever the defect D occurs and an entry of new SSI (and a process of closing the spiral in which recording is performed) is sequentially performed.

Because a specific operation that is performed according to the slipping replacement is described in FIGS. 22A to 22C, explanation thereof is omitted.

In this case, according to the execution of the slipping replacement process according to the occurrence of the fourth defect D, a sum of the total section length of the slipping and the total section length of the prespiral PS (total section length of the prespiral PS recorded for every new entry of the SSI according to the slipping replacement) is more than the capacity of the slipping buffer.

In this case, because the size of the remaining data to be recorded is more than the remaining capacity of the data area for the SRR1, the remaining data may not be completely recorded in the data area for the SRR1.

At this time, the remaining data may be recorded until the data area for the SRR1 defined as the recording object is completely consumed.

Specifically, when the reference surface address AD_ref detected during the recording is referred to and the current reference surface address AD_ref is matched with the reference surface address AD_ref corresponding to the end position of the data area for the SRR1, recording of the remaining data is stopped.

In this case, when the new SSI entry with respect to the data area for the SRR1 is performed, a value of the PSN that corresponds to the end position of the data area for the SRR1 is determined. By performing PSN→LPM conversion (recording layer address AD_wr→reference surface address AD_ref conversion) from the value of the PSN using the expressions 1 and 2 described above, the reference surface address AD_ref corresponding to the end position of the data area for the SRR1 is calculated. When the reference surface address AD_ref calculated as described above is detected, recording is stopped.

In this embodiment, because the ATS+ is adopted, the laser light for the reference surface is under the tracking servo control state during recording. For this reason, the reference surface address AD_ref is detected during recording and it can be determined whether or not to reach the predetermined position on the reference surface Ref.

However, if generation of the deviation of the spot positions of the laser light for the reference surface and the laser light for the recording layer illustrated in FIGS. 3A to 3C is considered, it is not preferable to continuously perform recording until the current reference surface address reaches the reference surface address AD_ref corresponding to the end position of the data area for the SRR1 as described above. This is because cross write with a head portion of a next area may be generated, depending on the aspect of the deviation of the spot positions.

Therefore, in this embodiment, when the current reference surface address reaches the reference surface address AD_ref becoming the slight front side of the reference surface address AD_ref corresponding to the end position of the area in which recording is performed, recording of the remaining data is stopped (<2> in FIG. 24A: recording is stopped if the position comes close to the end position of the area in which recording is performed).

In other words, recording is stopped if the position comes close to the next area (which becomes a data area for the SRR2 in this case) to some degree.

At this time, how far is a recording stop position (reference surface address AD_ref) from the reference surface address AD_ref corresponding to the end position of the area in which recording is performed may be determined on the basis of the maximum spot deviation amount D_max described above. In other words, as the reference surface address AD_ref to stop recording, the reference surface address AD_ref that becomes the front side of the reference surface address AD_ref corresponding to the end position of the area in which recording is performed by a section according to the maximum spot deviation amount D_max may be set.

When the position comes close to the end position of the area in which recording is performed, and recording of the remaining data is stopped as shown by <2>, for a process of closing the spiral in which recording is performed is executed. In addition, a process for replacing the recording area with the spare area to be described below is executed.

As can be understood from the above description, the VSN is consumed only when the real data is recorded. For this reason, as in the case illustrated in FIG. 24A, even when the slipping buffer area SB is completely consumed and the remaining data is not completely recorded in the recording object area, addresses to be given to a non-recorded data portion (corresponding to "Ov" described above) of the remaining data do not disappear.

In this embodiment, after the VSN (virtual address space) having the characteristic described above is newly defined, the replacement of the recording area with the spare area using the VSN is performed. Specifically, instead of generating the defect list based on the PSN functioning as the physical address and replacing the recording area with the spare area in the related art, the defect list based on the VSN illustrated in FIG. 24B is generated and the recording area is replaced with the spare area.

As illustrated in FIG. 24B, the defect list used in this embodiment becomes information in which a replacement source VSN and a replacement destination VSN are associated with each other.

The defect list is generated by the controller 46 and is recorded in the TDMA in the multi-layer recording medium 1 at predetermined timing.

In <2> described above, after recording of the remaining data is stopped when the position comes close to the end position of the area under the recording, first, a head VSN and an end VSN of the remaining data are acquired, as shown by <3> in FIG. 24A.

As described above, the VSN is an address that is consumed by only a recording portion of the real data and the controller 46 recognizes a current VSN during recording of the real data. For example, after recording of the real data starts, the controller 46 increases a value of the VSN according to advancement of the recording and can recognize a VSN with respect to currently recorded real data.

Therefore, when recording is stopped in <2>, the controller 46 can acquire a next VSN of the VSN at which recording has been finally performed as the head VSN of the remaining data.

The end VSN of the remaining data is an end address of the data area for the SRR1 on the virtual address space. As the end VSN, a value that is previously determined when an area reserve from the host apparatus is performed may be acquired. Alternatively, the end VSN may be calculated from the size of the remaining data (the head VSN+ the remaining data size).

As such, after the head VSN and the end VSN of the remaining data are acquired, as shown by <4> in FIG. 24A, a replacement destination area in the spare area is secured and is registered in the defect list.

Specifically, in the spare area on the virtual address space, the replacement destination area having the capacity according to the capacity of the remaining data is secured and the head VSN and the end VSN with respect to the replacement destination area are acquired. Then, the head VSN and the end VSN with respect to the replacement destination area acquired as described above are set as the information of the replacement destination VSN, the head VSN and the end VSN of the remaining data acquired by <3> are set as the information of the replacement source VSN, and these information are registered (entered) in the defect list.

As such, the information is registered in the defect list and as shown by <5>, the remaining data is written to the spare area.

Thereby, the replacement of the recording area of the remaining data with the spare area is realized.

When the replacement of the recording area with the spare area corresponds to first write with respect to the spare area, the "status1" in the SSI entry with respect to the spare area is changed from "unused" to "during recording of the prespiral" and recording of the prespiral is first executed. When recording of the prespiral is completed, the "status1" is changed to "in use" and recording of the remaining data starts.

Meanwhile, when the spare area is already used and a replacement destination area is secured in a continuation portion of the existing spiral, the remaining data is recorded with respect to the continuation portion of the existing spiral.

In this way, in this embodiment, on the assumption that the slipping buffer is provided for each recording area of the user data or the real data such as the management information and the slipping replacement is performed, the method of replacing the recording area of the remaining data with the spare area when the slipping buffer is consumed and the entire data to be recorded is not completely recorded is adopted.

Because the slipping replacement is performed, a seek time can be effectively decreased and a recording rate or a reproducing rate can be suppressed from decreasing, as compared with the case in which only the replacement of the recording area with the spare area is performed.

As described above, when the slipping buffer is consumed and the entire data to be recorded is not completely recorded, the recording area of the remaining data is replaced with the spare area. As a result, write/read continuity (continuity in the meaning that the long distance seek is not performed) can be secured with respect to the remaining data. Therefore, in this respect, an effect of suppressing the recording/reproducing rate from decreasing is obtained.

In this embodiment, the virtual address is newly defined in addition to the physical address and the replacement of the recording area with the spare area is performed using the virtual address. Therefore, even when there is no physical address to be given to the recording data due to repetition of the slipping replacement, the replacement of the recording area with the spare area can be performed using the virtual address.

[1-7. Reproducing Method According to Embodiment]

As described above, in this embodiment, it is assumed that the data management is performed by the three address spaces based on the LSN, the VSN, and the PSN.

Under the management, when reproducing is performed, according to an instruction of the LSN from the side of the host apparatus, the LSN is converted into the VSN and the VSN is converted into the PSN. Thereby, the PSN at which the data instructed by the LSN is recorded is specified.

The LSN→VSN conversion is performed on the basis of the correspondence relation information of the LSN and the VSN (hereinafter, referred to as LSN/VSN correspondence relation information) illustrated in FIG. 23B. That is, the LSN/VSN correspondence relation information showing the correspondence relation of the LSN and the VSN illustrated in FIG. 23B is stored in the recording/reproducing apparatus 10 and the VSN corresponding to the LSN is calculated on the basis of the LSN/VSN correspondence relation information.

Meanwhile, a conversion method of VSN/PSN is to be performed based on description information of SSI as follows.

FIGS. 25A and 25B are diagrams illustrating a conversion method of VSN→PSN.

FIG. 25A illustrates an example of SSI. In FIG. 25A, "status1", "status2", and "size of Slipping Buffer" are omitted.

In FIG. 25A, it can be known that three spirals (areas) are managed according to the SSI. Specifically, the three spirals in which "Start PSN of Pre Spiral" are "0x10000", "0x18000", and "0x30000" are managed. In this case, the spiral in which a numerical value of "Start PSN of Pre Spiral" is "0x10000" is defined as the first spiral, the spiral in which a numerical value of "Start PSN of Pre Spiral" is "0x18000" is defined as the second spiral, and the spiral in which a numerical value of "Start PSN of Pre Spiral" is "0x30000" is defined as the third spiral.

The "Start PSN of Spiral" and the "size of Spiral" of the first spiral are "0x10220" and "0x7000", respectively. The "Start PSN of Spiral" and the "size of Spiral" of the second spiral are "0x18200" and "0x17000", respectively. The "Start PSN of Spiral" of the third spiral is not determined ("0x0").

Hereinafter, an example of the case in which PSN (referred to as PSN_TG) corresponding to a VSN (referred to as VSN_TG) specified as a target is calculated from the VSN, when described content of the SSI is as illustrated in FIG. 25A, will be described.

Specifically, the target VSN_TG is defined as "0x110000".

When the conversion of VSN→PSN is performed, a VSN/PSN conversion table illustrated in FIG. 25B is generated on the basis of information content of the SSI.

In this case, the SSI is recorded on the multi-layer recording medium 1 and the SSI is previously read from the multi-layer recording medium 1, when the VSN/PSN conversion table is generated.

As illustrated in FIG. 25B, in the VSN/PSN conversion table, with respect to information of the "Start VSN of Spiral", information of at least "Start PSN of Pre Spiral", "Start PSN of Spiral", and "size of spiral" described in the SSI are associated for each spiral.

In this case, a value of the head VSN on the virtual address space is known. A value of the head VSN is "0x100000".

Because the PSN corresponding to the head VSN is a head PSN of a real data recording section in the first spiral managed by the SSI, the head VSN "0x100000" becomes "Start VSN of Spiral" with respect to the first spiral, in the VSN/PSN conversion table. Therefore, as information to manage the first spiral, the VSN "0x100000" and the "Start PSN of Pre Spiral", the "Start PSN of Spiral", and the "size of Spiral" of the first spiral managed by the SSI are associated.

If it is considered that the VSN is consumed by only the recording portion of the real data, the "Start VSN of Spiral" with respect to the second spiral is obtained by adding "size of Spiral" (0x7000) of the first spiral to the "Start VSN of Spiral" (0x100000) of the first spiral.

Therefore, as information to manage the second spiral in the VSN/PSN conversion table, "Start VSN of Spiral"="0x107000" and the "Start PSN of Pre Spiral", the "Start PSN of Spiral", and the "size of Spiral" managed by the SSI of the second spiral managed by the SSI are associated.

Likewise, the "Start VSN of Spiral" corresponding to the third spiral is obtained by adding "size of Spiral" (0x17000) of the second spiral to the "Start VSN of Spiral" (0x107000) of the second spiral.

Therefore, as information to manage the third spiral in the VSN/PSN conversion table, "Start VSN of Spiral"="0x107000" and the "Start PSN of Pre Spiral", the "Start PSN of Spiral", and the "size of Spiral" of the third spiral managed by the SSI are associated.

In this way, the VSN/PSN conversion table in which the "Start VSN of Spiral" and the "Start PSN of Pre Spiral", the "Start PSN of Spiral", and the "size of Spiral" on the SSI are associated for each spiral is generated.

Here, it is assumed that the target VSN_TG is "0x110000" as described above. In this case, if the VSN/PSN conversion table is referred to, it can be determined that the spiral where "0x110000" exists is the second spiral (string of "Start VSN of Spiral"="0x107000").

As such, if the spiral where the target PSN_TG exists can be specified, the PSN that is obtained by shifting "Start PSN of Spiral" meaning the head PSN of the real data recording section on the spiral by the difference of "Start VSN of Spiral" of the spiral and the target VSN_TG becomes the target PSN_TG.

Specifically, in this case, the difference of "Start VSN of Spiral" of the second spiral and the target VSN_TG is "0x110000"−"0x107000"="0x9000" and the "Start PSN of Spiral" of the second spiral is "0x18200". Therefore, the target PSN_TG is calculated as "0x18200"+"0x9000"="0x21200".

As such, when the target PSN_TG is calculated, reference surface seek is performed. That is, the targeted reference surface address AD_ref is calculated by the expressions 1 and 2 on the basis of the target PSN_TG. The reference surface seek in which the reference surface AD_ref calculated as described above is targeted is performed.

As described above, in the reproducing method according to this embodiment, reproducing is performed on the basis of the LSN/VSN correspondence relation information (first correspondence relation information) showing the correspondence relation of the LSN and the VSN. By this configuration, the instructed data can be appropriately reproduced with respect to the multi-layer recording medium 1 in which recording is performed under the management based on the VSN functioning as the virtual address.

Specifically, in this embodiment, when the SSI is recorded on the multi-layer recording medium 1, the VSN/PSN conversion table (second correspondence relation information) is generated from the SSI, the target PSN_TG corresponding to the target VSN_TG specified from the LSN/VSN correspondence relation information is specified on the basis of the VSN/PSN conversion table, and the target PSN_TG is accessed. Thereby, the instructed data can be appropriately reproduced.

[1-8. Process Sequence]

Next, a specific process sequence to be executed to realize the recording/reproducing method according to the embodiment described above will be described with reference to flowcharts illustrated in FIGS. 26 to 30.

The process illustrated in FIGS. 26 to 30 is executed according to a program stored in a ROM embedded in the controller 46 illustrated in FIG. 16.

As a premise matter about the process with respect to the process illustrated in FIGS. 26 to 30, it is assumed that reading of the SSI or the defect list from the multi-layer recording medium 1 or generation of the VSN/PSN conversion table based on the SSI is already performed, according to loading of the multi-layer recording medium 1. The generation of the VSN/PSN conversion table is performed by the controller 46.

Figure 26:
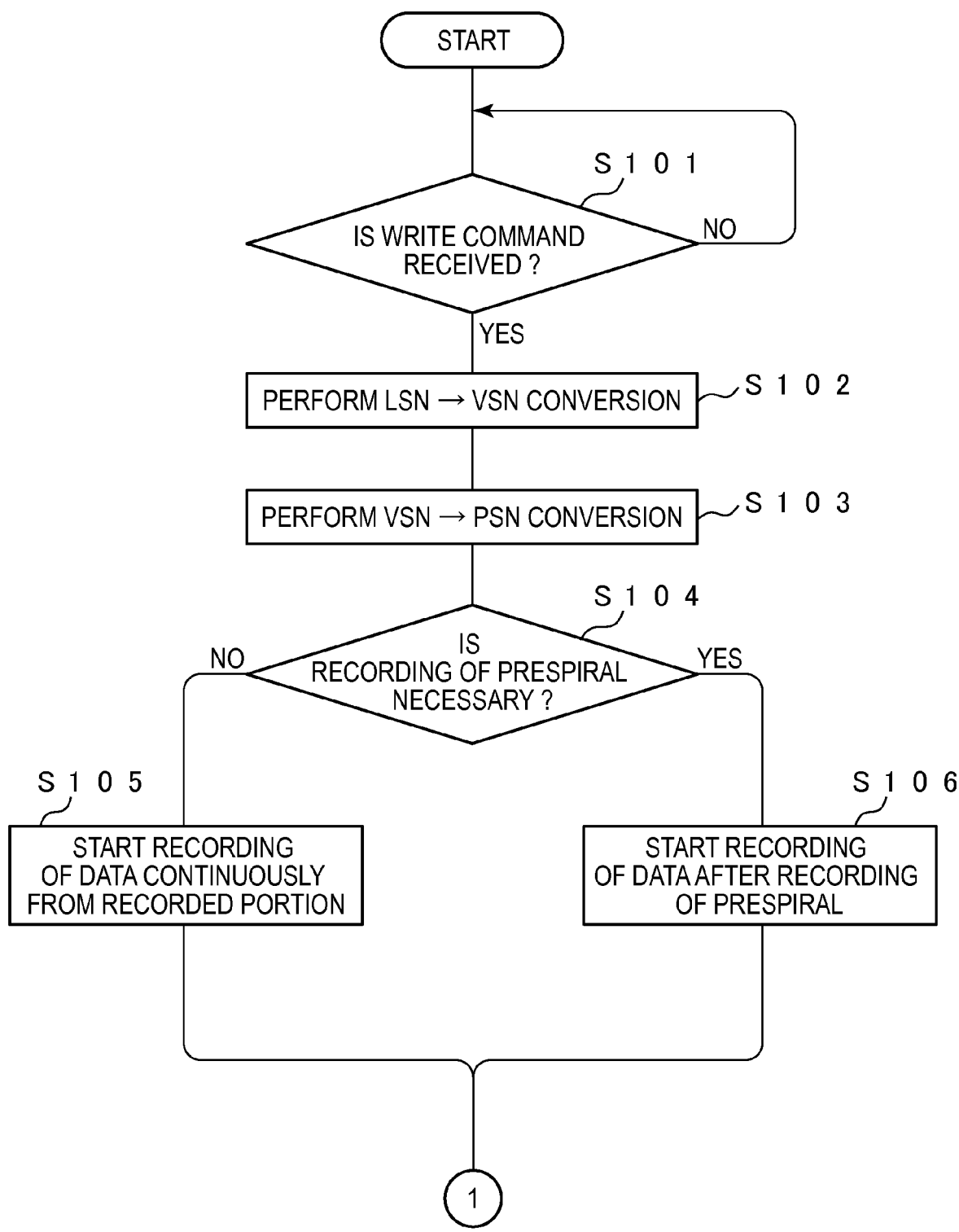
FIG. 26 is a flowchart illustrating a sequence of specific processes to be executed to realize a recording method (replacement method) according to an embodiment.
Figure 27:
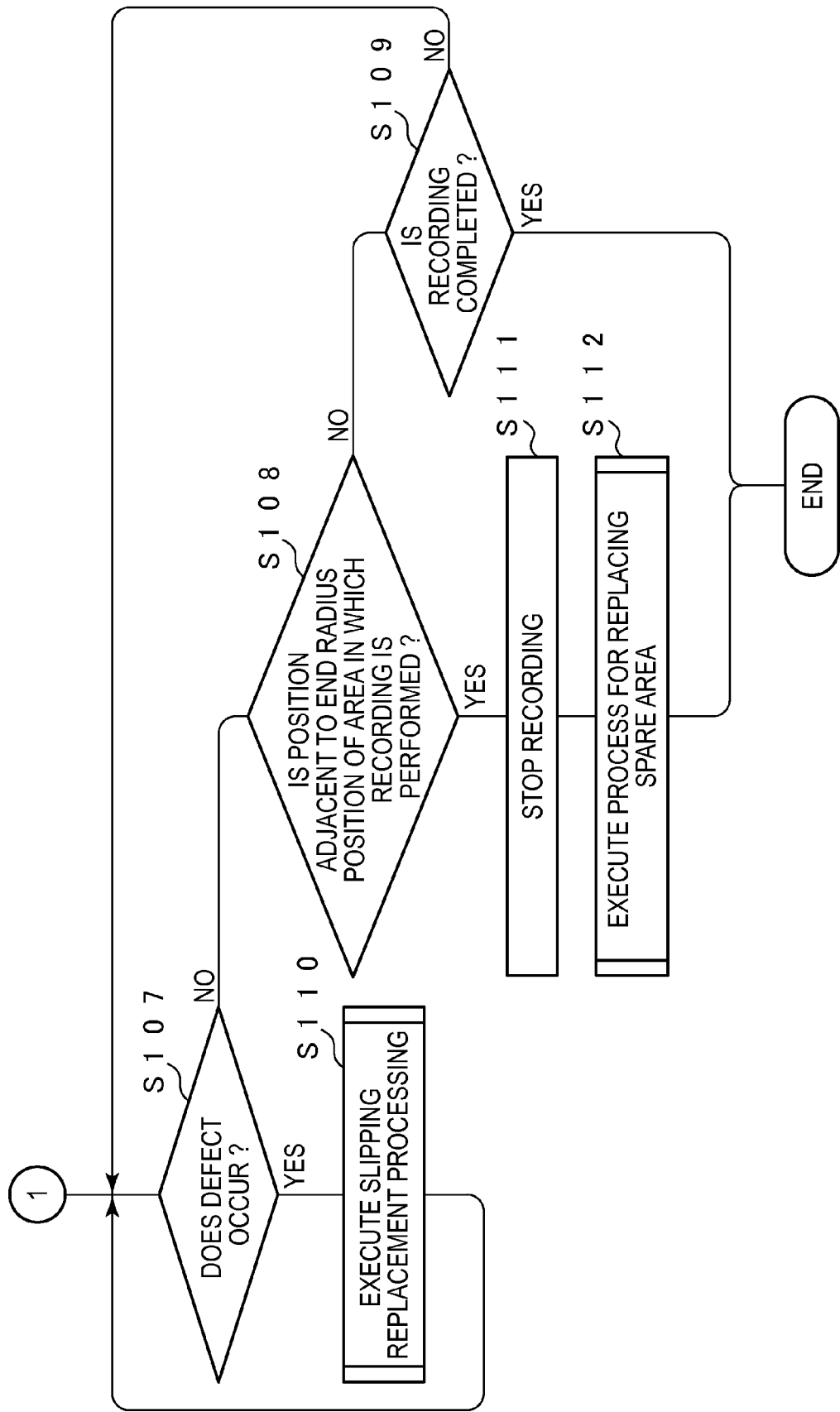
FIG. 27 is a flowchart illustrating a sequence of specific processes to be executed to realize a recording method (replacement method) according to an embodiment.
Figure 28:
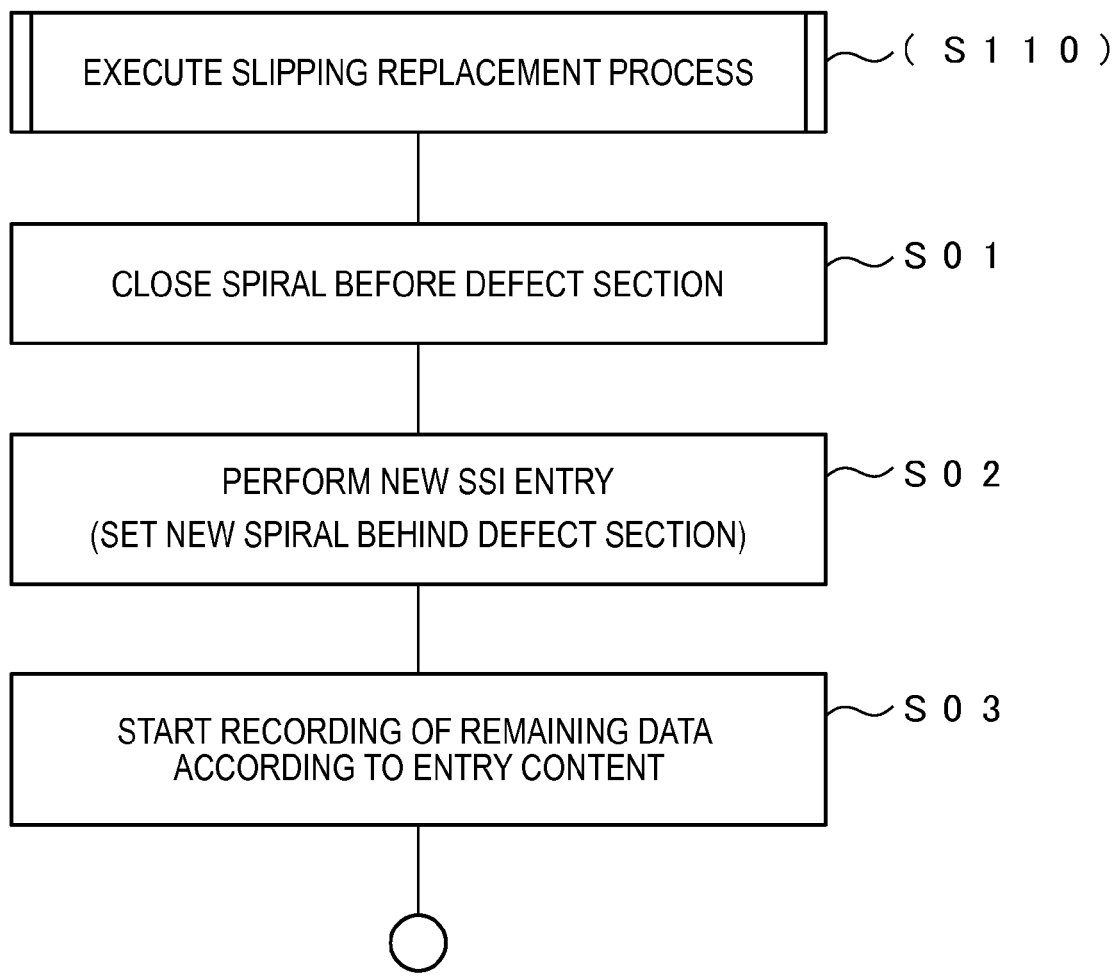
FIG. 28 is a flowchart illustrating specific content of a slipping replacement process.

FIGS. 26 to 28 illustrate a sequence of specific processes to be executed to realize the recording method (replacement method) according to the embodiment.

First, as illustrated in FIG. 26, in step S101, a waiting state is maintained until a write command is received. That is, reception of the write command from the side of the host apparatus is awaited.

According to the write command, the LSN functioning as the recording start address and information of the recording size are instructed.

When the write command is received, in step S102, LSN→VSN conversion is performed. That is, the target VSN_TG corresponding to the LSN instructed by the write command is calculated on the basis of the LSN/VSN correspondence relation information previously stored in the predetermined memory readable by the controller 46.

After the LSN→VSN conversion is performed by step S102, in step S103, VSN→PSN conversion is performed.

That is, the target PSN_TG corresponding to the target VSN_TG calculated by step S102 is calculated on the basis of the VSN/PSN conversion table previously generated according to the loading of the multi-layer recording medium 1 as described above. Because the generation method of the VSN/PSN conversion table and the derivation method of the target PSN_TG based on the VSN/PSN conversion table are already described in FIGS. 25A and 25B, explanation thereof is omitted.

After the target PSN_TG is calculated by the conversion process of step S103, in step S104, it is determined whether recording of the prespiral is necessary.

The determination is performed on the basis of the SSI.

Specifically, when the target PSN_TG and the "Start PSN of Spiral" are matched with each other and the "status1" is "unused", data should be recorded a continuation portion of the prespiral after recording of the prespiral. Therefore, a determination result showing that recording of the prespiral is necessary is derived.

Meanwhile, when the target PSN_TG and the "Start PSN of Spiral" are not matched with each other and the "status1" is "in use", data should be recorded following the existing spiral. Therefore, a determination result showing that recording of the prespiral is not necessary is derived.

In step S104, when a negation result showing that recording of the prespiral is not necessary is obtained, the process proceeds to step S105 and recording of data starts continuously from the recorded portion. That is, after the targeted reference surface address AD_ref is calculated by the expressions 1 and 2 on the basis of the target PSN_TG, the reference surface seek in which the reference surface address AD_ref is targeted is performed, the correction seek based on the target PSN_TG is performed according to necessity, and recording of data starts continuously from the recorded portion.

Meanwhile, in step S104, when an affirmation result showing that recording of the prespiral is necessary is obtained, the process proceeds to step S106 and the data recording starts after recording of the prespiral.

That is, in this case, the targeted reference surface address AD_ref is calculated by the expressions 1 and 2 on the basis of the "Start PSN of Pre Spiral of the spiral to which the target PSN_TG belongs and the reference surface seek in which the reference surface address AD_ref is targeted is performed. At the position where the seek is completed, recording of the track for the guide and pulling over illustrated in FIGS. 6A and 6B are performed, the tracking servo control state based on the AST+ is obtained, and recording (recording of dummy data) of the prespiral of the predetermined length is executed. If recording of dummy data corresponding to the predetermined length is completed, control is performed such that recording is switched into recording of real data. Thereby, the data recording starts after recording of the prespiral.

As can be understood from the above description, when the prespiral is recorded, the "status1" in the SSI is changed from "unused" to "prespiral writing". When the data recording starts after recording of the prespiral, the "status1" is changed from "prespiral writing" to "in use".

After the process of step S105 or S106 is executed, the process proceeds to a process illustrated in FIG. 27.

In FIG. 27, a waiting state is maintained until any condition of occurrence of the defect, coming close to the end radius position of the area in which recording is performed, and the recording completion is realized, according to a loop process of steps S107, S108, and S109.

Specifically, in step S107, it is determined whether the defect occurs.

In step S108, it is determined where the position comes close to the end radius position of the area in which recording is performed (specifically, whether the position reaches the radius position becoming the front side of the end radius position of the area in which recording is performed by the maximum spot deviation amount D_max), on the basis of the value of the reference address AD_ref detected by the reference surface movement control/address detecting unit 38 illustrated in FIG. 16.

In step S109, it is determined whether recording of all data designated by the write command is completed.

In step S107, when the affirmation result showing that the defect occurs is obtained, the process proceeds to step S110 and the slipping replacement process (described in detail in FIG. 28) is executed. Then, the process returns to step S107.

In step S108, when the affirmation result showing that the position comes close to the end radius position of the area in which recording is performed is obtained, the process proceeds to step S111 and recording is stopped. Then, in step S112, the spare area replacement process (described in detail in FIG. 29) is executed.

After the spare area replacement process is executed by step S 112, the recording process according to the write command ends.

In step S109, when the affirmation result showing that the recording is completed is obtained, the recording process according to the write command ends.

FIG. 28 illustrates specific content of the slipping replacement process executed by step S110.

As the slipping replacement process, first, in step S01, process for closing the spiral before the defect section is executed. That is, with respect to the SSI entry information of the spiral in which recording is performed, "size of Spiral" and "status1" thereof are updated. Specifically, the "size of Spiral" is updated with a size of real data recorded during a period from "Start PSN of Spiral" in the SSI entry information to the occurrence of the defect and the "status1" is updated from "in use" to "used".

Next, in step S02, the new SSI entry is performed. That is, a new spiral is set to the rear side of the defect section.

Specifically, information in which "Start PSN of Pre Spiral" is set as a PSN of a position offset from the head PSN of the defect D by the predetermined interval d, the "Start PSN of Spiral" is set as a PSN of a position further offset by the size ps of the prespiral, the "size of Spiral" is set as a size of the remaining data to be recorded, and "size of Slipping Buffer" is set as a size according to "size of Spiral" is registered as the SSI entry information.

As described above, when the SSI entry is newly registered, the "status1" in the SSI entry is "unused". In this case, because the user data is recorded, the "status2" is the "user data area".

After the new SSI entry process is executed by step S02, in step S03, recording of the remaining data starts according to entry content.

Specifically, because the "status1" is "unused" in the new SSI entry, recording of the prespiral corresponding to the predetermined length is executed from "Start PSN of Pre Spiral", after "status1" is changed to "prespiral writing". Then, recording is switched into recording of the remaining data (real data). At this time, according to the start of recording of the remaining data, "status1" is changed to "in use".

Because a specific sequence to record the prespiral from "Start PSN of Pre Spiral" and start recording of the real data is equal to the sequence described in step S 106, explanation thereof is omitted.

In FIG. 28, the example of the case in which the close process with respect to the spiral in which recording is performed is executed earlier than the new SSI entry process has been described. However, the process order may be changed.

Figure 29:
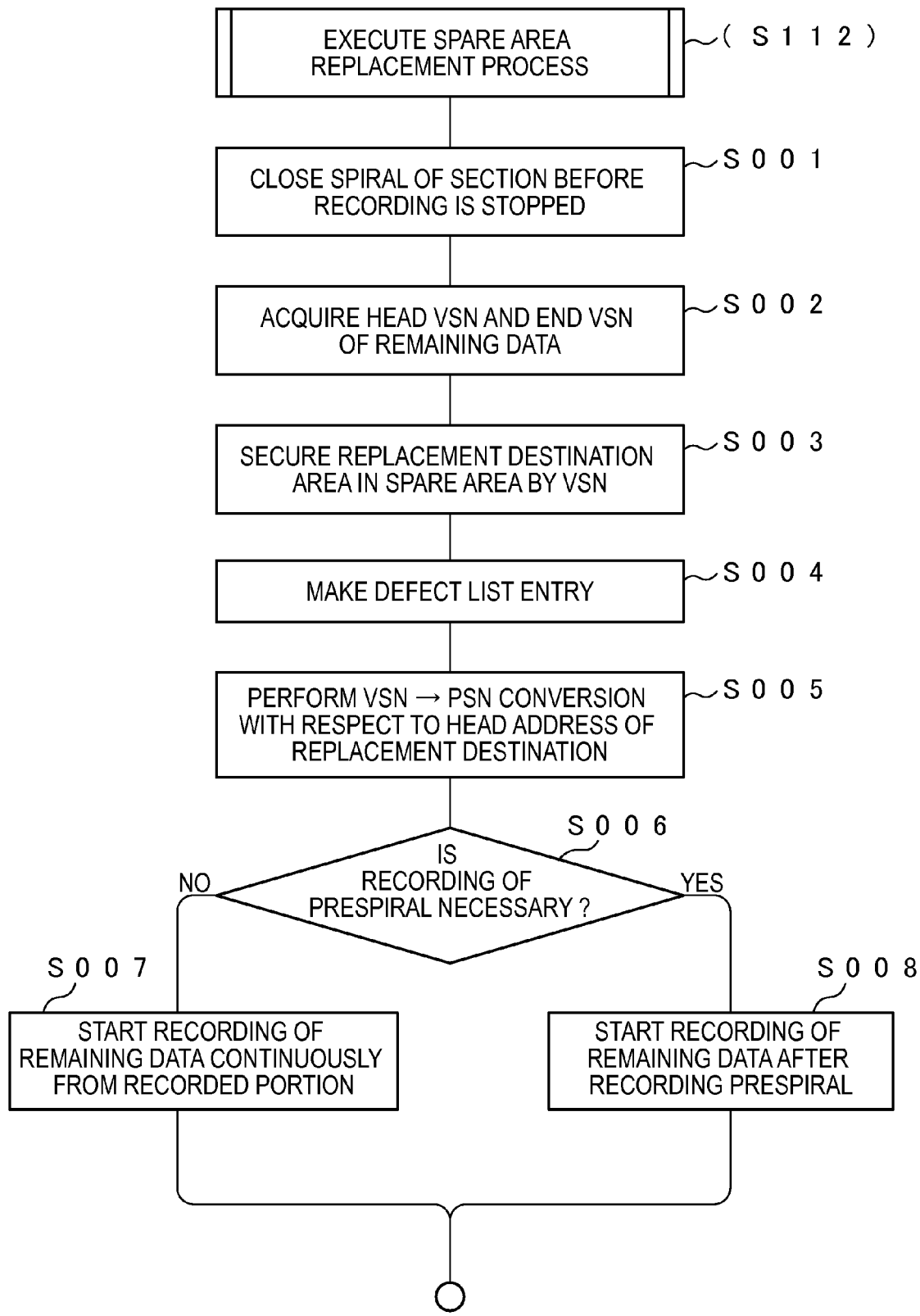
FIG. 29 is a flowchart illustrating specific content of a spare area replacement process.

FIG. 29 illustrates specific content of the spare area replacement process executed by step S 112.

As the spare area replacement process, first, in step S001, process for closing the spiral of the section before the recording stop is executed.

Next, in step S002, the head VSN and the end VSN of the remaining data are acquired. That is, the head VSN and the end VSN of the remaining data that are not recorded are acquired.

After each VSN is acquired by step S002, in step S003, the replacement destination area in the spare area is secured by the VSN.

That is, in the spare area on the virtual address space, the replacement destination area corresponding to the capacity according to the capacity of the remaining data is secured and the head VSN and the end VSN with respect to the replacement destination area are acquired.

The spare area (the head VSN and the end VSN thereof) on the virtual address space can be specified on the basis of the information content of the VSN/PSN conversion table illustrated in FIG. 25B described above.

After the replacement destination area is secured by step S003, in step S004, the entry with respect to the defect list is performed. That is, the head VSN and the end VSN of the remaining data acquired by step S002 are set as the information of the replacement source VSN, the head VSN and the end VSN with respect to the replacement destination area acquired by step S003 are set as the information of the replacement destination VSN, and these information are registered (entered) in the defect list.

As such, after the entry with respect to the defect list is performed, in step S005, VSN→PSN conversion is performed with respect to the head address of the replacement destination. That is, the PSN corresponding to the head VSN of the replacement destination area is calculated as the target PSN_TG, on the basis of the VSN/PSN conversion table previously generated as described above.

After VSN→PSN conversion is performed and the target PSN_TG is calculated, in step S006, it is determined whether recording of the prespiral is necessary. Because the determination process of step S006 is the same as determination process of step S103 described above, explanation thereof is omitted.

In step S006, when a negation result showing that recording of the prespiral is not necessary is obtained, the process proceeds to step S007 and recording of the remaining data starts continuously from the recorded portion.

The specific processing content of step S007 is the same as step S105 described above, except that a recording object of the remaining data is the spare area, not the user data area. Therefore, explanation thereof is omitted.

In step S006, when an affirmation result showing that recording of the prespiral is necessary is obtained, the process proceeds to step S008 and recording of the remaining data starts after recording of the prespiral.

The specific processing content of step S008 is the same as step S106 described above, except that a recording object of the remaining data is the spare area, not the user data area. Therefore, explanation thereof is omitted.

In this case, although explanation based on illustration is omitted, the SSI and the defect list are recorded in the TDMA of the multi-layer recording medium 1 at predetermined timing.

Figure 30:
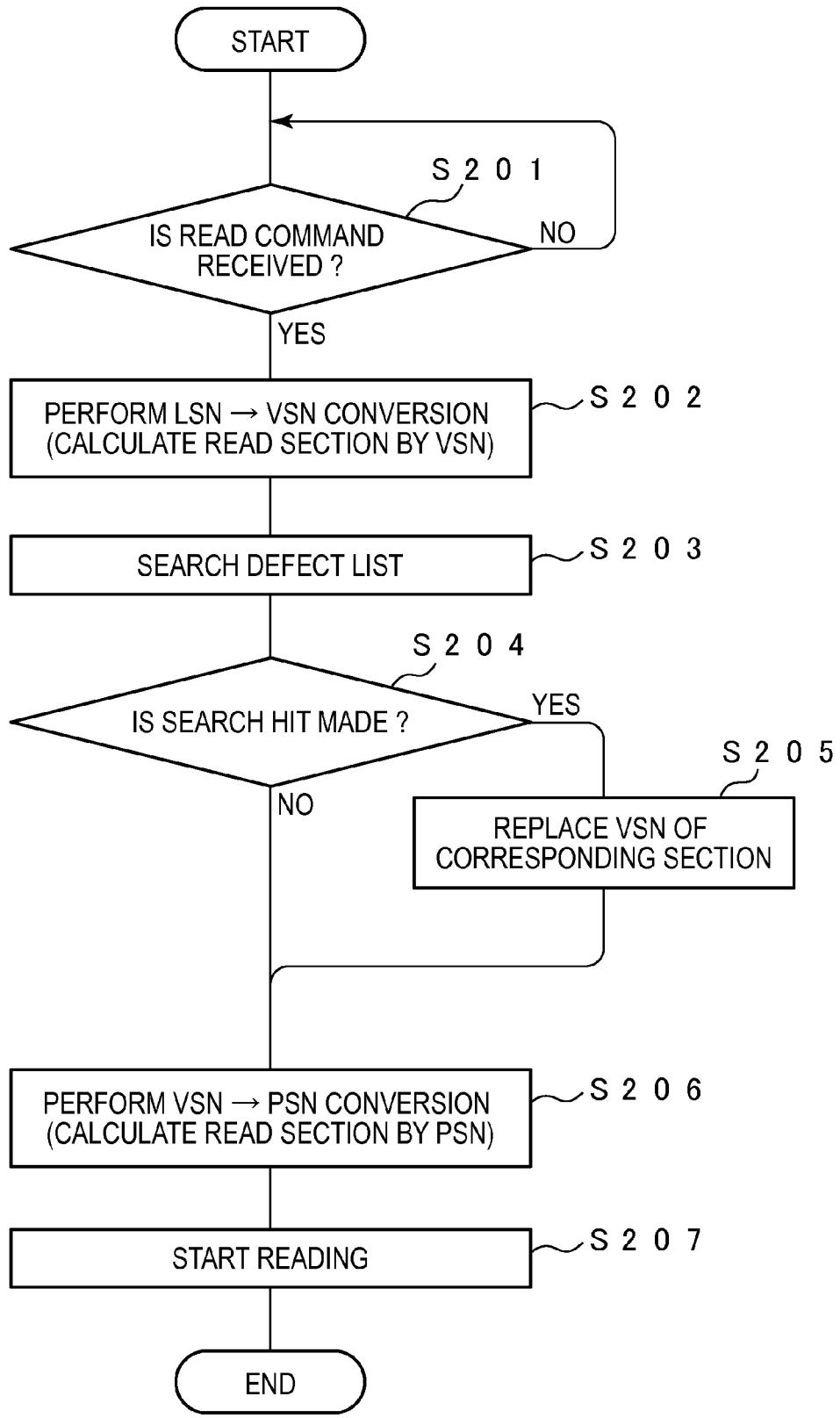
FIG. 30 is a flowchart illustrating a sequence of specific processes to realize a reproducing method according to an embodiment.
Figure 31:
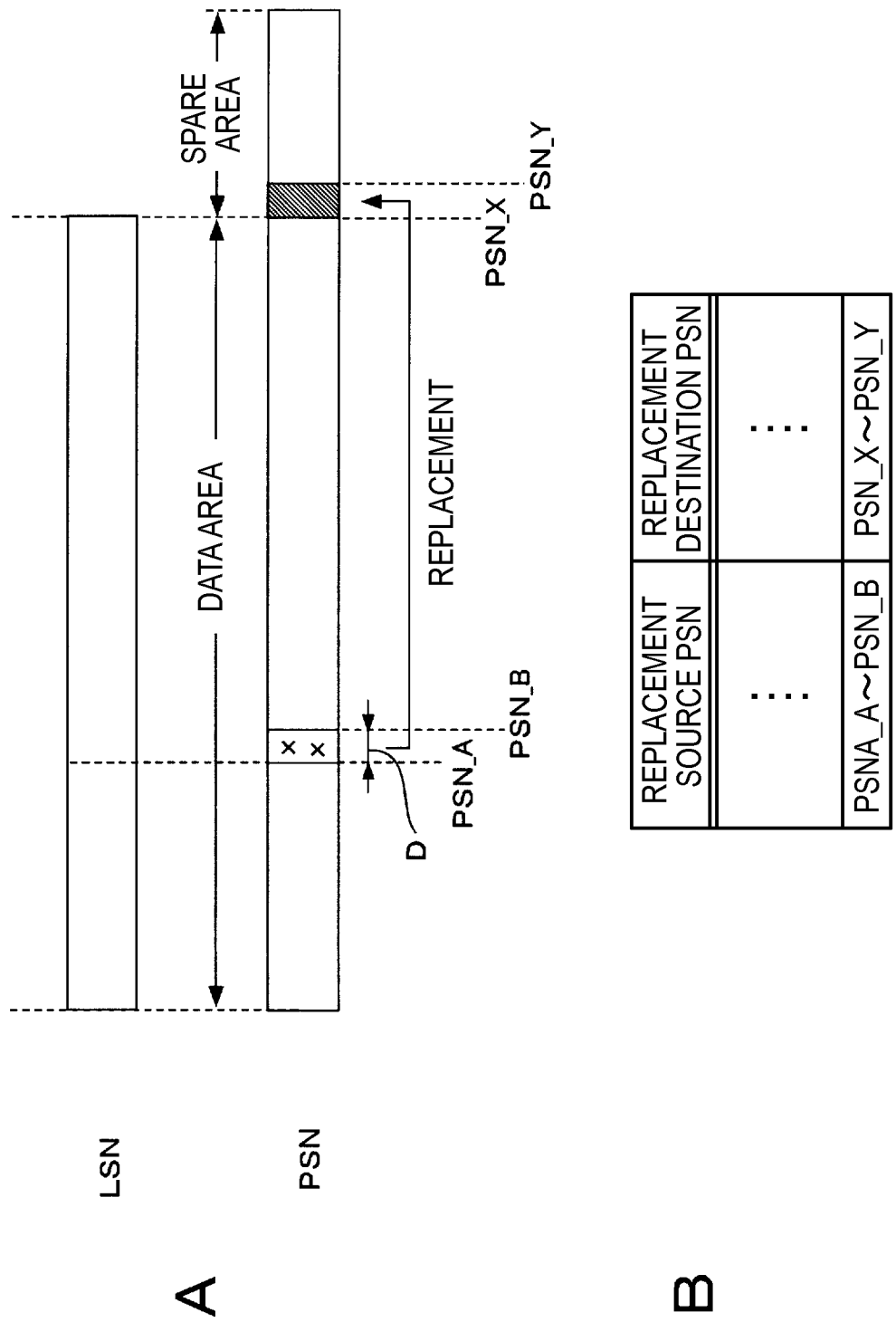
FIGS. 31A and 31B are diagrams illustrating an example of a replacement process executed in an optical disc according to the related art.
Figure 32:
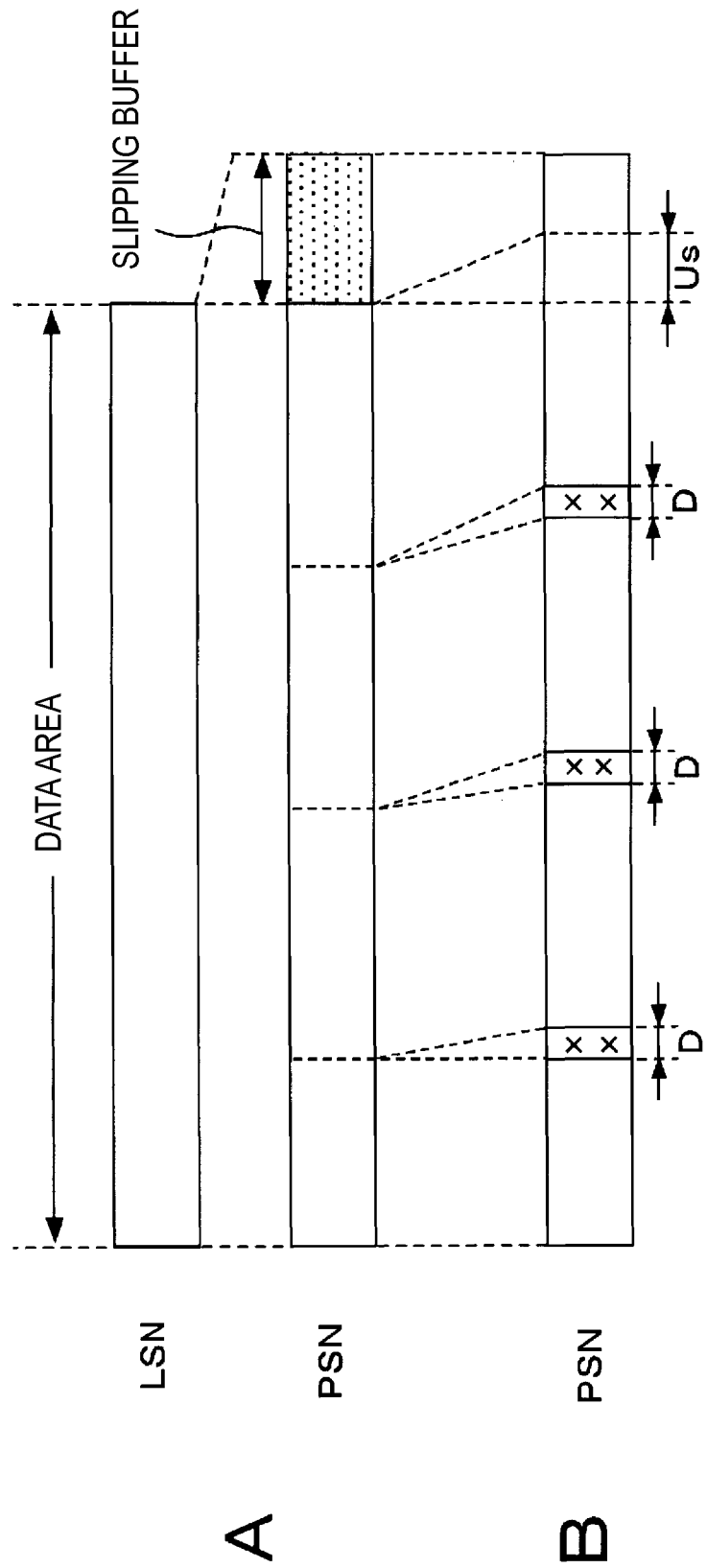
FIGS. 32A and 32B are diagrams illustrating slipping replacement.
Figure 33:
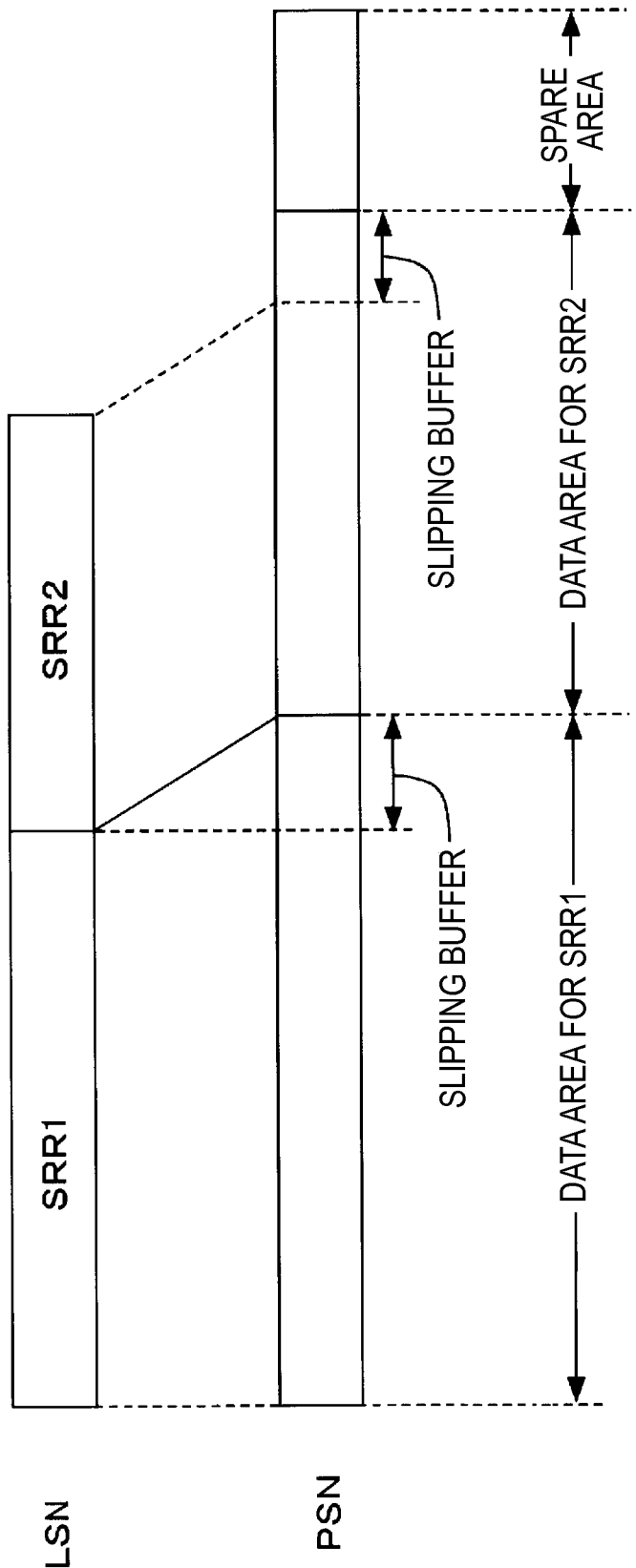
FIG. 33 is a diagram illustrating an example of a relation of a logical address space and a physical address space when area reserve from the side of a host apparatus is performed.
Figure 34:
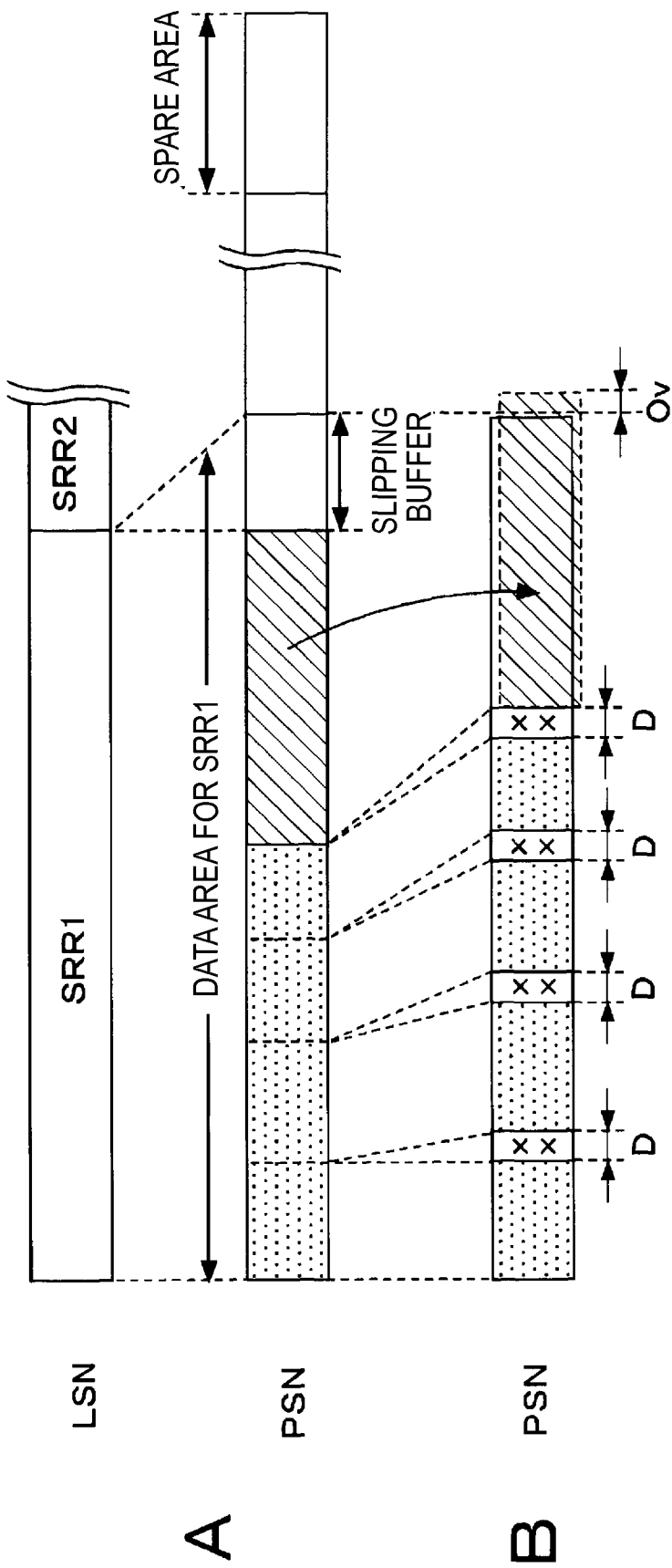
FIGS. 34A and 34B are diagrams illustrating a problem that occurs when combination replacement of slipping replacement and spare area replacement is realized.

FIG. 30 illustrates a sequence of specific processes to realize the reproducing method according to the embodiment.

In FIG. 30, in step S201, a waiting state is maintained until a read command is received.

In this case, the LSN functioning as the reproducing start address and the size information of the reproduction data are instructed, according to the read command from the side of the host apparatus.

When the read command is received from the side of the host apparatus, in step S202, LSN→VSN conversion is performed and a read section based on the VSN is calculated.

That is, the VSN corresponding to the reproducing start LSN instructed by the read command is calculated as the target VSN_TG, on the basis of the LSN/VSN correspondence relation information. The read section information (target VSN_TG to the read end VSN) based on the VSN is obtained on the basis of the target VSN_TG and the information of the reproduction data size designated by the read command.

After the read section based on the VSN is calculated by step S202, in step S203, the defect list is searched. That is, the defect list read from the multi-layer recording medium 1 is searched to confirm whether there is a section replaced with the spare area in the read section calculated by step S202.

Next, in step S204, it is determined whether search hit is made. That is, it is determined whether there is a section managed as the replacement destination VSN in the defect list in the read section calculated by step S202, as the search result of the defect list.

In step S204, when an affirmation result showing that the search hit is made is obtained, the process proceeds to step S205 and the VSN of the corresponding section is replaced. That is, the VSN of the search hit section of the calculated read section is replaced with the VSN managed as the replacement destination VSN on the defect list.

After the replacement process is executed by step S205, the process proceeds to step S206.

In step S204, when a negation result showing that the search hit is not made is obtained, the process proceeds to step S206.

In step S206, VSN→PSN conversion is performed and the read period based on the PSN is calculated. That is, the read section based on the PSN corresponding to the read section calculated by step S203 or the read section subjected to the replacement process by step S205 is calculated, on the basis of the previously generated VSN/PSN conversion table.

After the read section based on the PSN is calculated by step S206, in step S207, the read starts.

A method of accessing the target PSN_TG corresponding to the head PSN of the read period is the same as that described in step S105. Specifically, in this case, after the targeted reference surface address AD_ref is calculated by the expressions 1 and 2 on the basis of the target PSNTG, the reference surface seek in which the reference surface address AD_ref is targeted is performed, the correction seek based on the target PSN_TG is performed according to necessity, and data read from the target PSN_TG starts.

When the replacement is performed by step S205, seek with respect to the spare area is performed in the middle of the read.

<2. Second Embodiment>

Next, a second embodiment will be described.

According to the description of the first embodiment, when reproducing is performed, the correspondence relation of the VSN and the PSN can be specified on the basis of the information content of the SSI recorded on the multi-layer recording medium 1.

However, if the SSI recorded on the multi-layer recording medium 1 is corrupted due to a certain factor and may not be read, the corresponding PSN may not be specified from the VSN and the recording data may be not reproduced.

Therefore, in the second embodiment, the VSN is embedded for each predetermined section of the recording data. Specifically, in this example, the VSN is written to the entire RUB (RUB of real data other than the RUB of the prespiral portion).

As such, if the VSN is written to the entire RUB, the correspondence relation of the VSN/PSN for each RUB can be specified. For this reason, even when the SSI may not be read and the VSN/PSN conversion table may not be generated, the VSN/PSN conversion table may be generated (recovered) from the correspondence relation of the VSN/PSN for each RUB.

A specific position of the VSN written to the RUB is not particularly limited. However, the VSN may be written to Flag Bits in the RUB.

In addition, because a storage space of data other than the real data such as a portion to store control data is normally secured in the RUB, the VSN may be written to the portion.

As described above, the controller 46 can recognize information of the VSN corresponding to a sector (PSN) in which recording is performed.

When writing of the VSN for each RUB is realized, the controller 46 may instruct the recording processing unit 31 to sequentially record information of the VSN according to the RUB to be recorded. According to the instruction, the recording processing unit 31 generates data for recording in which the instructed VSN is stored at the predetermined position in the RUB and generates a recording modulation code string according to the data for the recording. The light emission driving unit 32 drives light emission of the laser 11-1 for the recording according to the recording modulation code string, so that writing of the VSN for each RUB is realized.

<3. Modification>

The embodiments of the present disclosure have been described. However, the present disclosure is not limited to the specific examples described above.

For example, the example of the case in which the present disclosure is applied to the multi-layer recording medium 1 having the recording layer 3 formed in a planar shape without forming the position guider has been described. The present disclosure can be applied to a recording medium having the recording layer 3 in which the position guider such as the groove is formed.

In this case, radiation of separate laser light for position control such as the laser light for the reference surface or recording of the prespiral with respect to the area head portion is not necessary.

In the above description, it has been assumed that the single spiral recording is performed using one laser light for recording. The present disclosure can be applied to the case in which recording using a plurality of laser light for recording is performed at the same time and double or more spirals are recorded at the same time.

Although not mentioned particularly in the above description, a recording advancement direction may be inner circumference→outer circumference or outer circumference→inner circumference.

The present disclosure can be applied to the case in which recording media having other shapes such as a card type are used, in addition to the disc-shaped recording medium.

Additionally, the present application may also be configured as below.

(1) A recording apparatus including:
 a light radiating unit that radiates light to an optical recording medium;
 a recording unit that performs light emission control of the light radiating unit, and performs recording on the optical recording medium; and a control unit that performs control in a manner that, in a state in which a logical address space, a virtual address space obtained by adding at least a spare area to the logical address space, and a physical address space obtained by adding a buffer area to the virtual address space are defined, a process for replacing a recording area of the optical recording medium with the spare area is executed using a virtual address.

(2) The recording apparatus according to (1),
wherein the control unit registers, in a defect list, information of a head virtual address and an end virtual address of replacement source data and information of a head virtual address and an end virtual address of a replacement area secured in the spare area, and causes the recording unit to record the replacement source data in the replacement area.

(3) The recording apparatus according to (2),
wherein the control unit controls, according to occurrence of a defect, the recording unit in a manner that recording of remaining data starts from a position over a defect occurrence area.

(4) The recording apparatus according to (3),
wherein the control unit generates spiral management information including at least information of a recording start physical address of real data of a recording area set on the optical recording medium, information of a recording size of the real data, and information of a size of a slipping buffer area functioning as the buffer area set to perform replacement over the defect occurrence area.

(5) The recording apparatus according to (4),
wherein the control unit secures, according to occurrence of a defect, a recording area obtained by adding at least the slipping buffer area to a recording section of the real data after an occurrence section of the defect, and registers at least the information of the recording start physical address of the real data, the information of the recording size of the real data, and the information of the size of the slipping buffer area of the secured recording area as entry information of the spiral management information.

(6) The recording apparatus according to (5),
wherein the control unit determines whether a current recording position comes within a predetermined distance from an end position of recording area that is managed based on the spiral management information and recording is currently performed in, stops recording performed by the recording unit, when the control unit determines that the current recording position comes within the predetermined distance from the end position, and registers, in the defect list, information of a head virtual address and an end virtual address of remaining data generated by stopping the recording and information of a head virtual address and an end virtual address of a replacement area secured in the spare area to control the recording unit in a manner that recording of the remaining data into the replacement area is executed.

(7) The recording apparatus according to (6),
wherein the control unit updates the spiral management information in a manner that information of a recording size of real data of a recording area that is managed based on the spiral management information and recording is stopped in shows a recording size to a recording stop position, according to a stop of the recording.

(8) The recording apparatus according to any one of (1) to (7),
wherein the control unit controls the recording unit in a manner that, per predetermined section of recording data, a virtual address corresponding to a physical address of the section is embedded.

(9) The recording apparatus according to (8),
wherein the control unit controls the recording unit in a manner that, per minimum recording unit section, the virtual address is embedded.

(10) The recording apparatus according to any one of (1) to (9),
wherein the optical recording medium has a recording layer provided with the physical address in recording data, and a reference surface provided with a preaddress in forming a position guider, and
wherein the light radiating unit radiates laser light for the recording layer to be radiated to the recording layer and laser light for the reference surface to be radiated to the reference surface though a common objective lens, and
wherein the control unit controls the recording unit in a manner that dummy data as a prespiral is recorded onto a front side of a recording section of real data.

(11) The recording apparatus according to (10),
wherein the control unit generates, as the spiral management information, information including information of a recording start physical address of the prespiral, information of a recording start physical address of the real data, information of a recording size of the real data, and information of a size of the slipping buffer area.

(12) The recording apparatus according to (11),
wherein the control unit secures, according to occurrence of a defect, a recording area obtained by adding a recording section of the prespiral and the slipping buffer area to a recording section of the real data after an occurrence section of the defect, and registers the information of the recording start physical address of the prespiral, the information of the recording start physical address of the real data, the information of the recording size of the real data, and the information of the size of the slipping buffer area of the secured recording area as entry information of the spiral management information.

(13) A reproducing apparatus including:
a light radiating unit that radiates light to an optical recording medium in which, in a state in which a logical address space, a virtual address space obtained by adding at least a spare area to the logical address space, and a physical address space obtained by adding a buffer area to the virtual address space are defined, a process for replacing a recording area of the optical recording medium with a spare area is executed using a virtual address;
a reproducing unit that reproduces recording information of the optical recording medium, on the basis of a light reception signal with respect to the light radiated to the optical recording medium by the light radiating unit; and
a control unit that causes the reproducing unit to execute a reproducing operation on the basis of first relationship information showing a relationship between a logical address and the virtual address, according to a reproducing instruction based on the logical address.

(14) The reproducing apparatus according to (13),
wherein a defect list associated with information of a head virtual address and an end virtual address of replacement source data and information of a head virtual address and an end virtual address of a replacement area secured in the spare area is recorded on the optical recording medium, and
wherein the control unit causes the reproducing unit to execute the reproducing operation, on the basis of the first relationship information and the defect list.

(15) The reproducing apparatus according to (14),
wherein spiral management information is recorded on the optical recording medium, the spiral management information including at least information of a recording start physical address of real data of a recording area set on the optical recording medium, information of a recording size of the real data, and information of a size of a slipping buffer area functioning as the buffer area set to perform replacement over a defect occurrence area, and wherein the control unit generates second relationship information showing a relationship between the virtual address and the physical address, on the basis of the spiral management information, and causes the reproducing unit to execute the reproducing operation, on the basis of information of the virtual address identified from the first relationship information, information of the defect list, and the second relationship information.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A recording apparatus comprising:
a light radiating unit that radiates light to an optical recording medium;
a recording unit that performs light emission control of the light radiating unit, and performs recording on the optical recording medium; and
a control unit that performs execution of a process for replacing a recording area of the optical recording medium with a spare area using a virtual address that corresponds to the spare area, wherein the process is executed in a state in which a logical address space, a virtual address space, and a physical address space are defined, wherein the virtual address space is obtained by adding at least the spare area to the logical address space, and wherein the physical address space is obtained by adding a buffer area to the virtual address space,
wherein the control unit registers in a defect list, based on the virtual address space, information of virtual addresses of a replacement source and a replacement area that corresponds to the spare area, after the replacement area is secured.

2. The recording apparatus according to claim 1, wherein the control unit registers, in the defect list, information of a head virtual address and an end virtual address of replacement source data and information of a head virtual address and an end virtual address of the replacement area secured in the spare area, and causes the recording unit to record the replacement source data in the replacement area.

3. The recording apparatus according to claim 1, wherein the control unit controls the recording unit in a manner that recording of remaining data starts from a position after a defect occurrence area.

4. The recording apparatus according to claim 3, wherein the control unit generates spiral management information comprising information of a recording start physical address of real data of a recording area set on the optical recording medium, information of a recording size of the real data, and information of a size of a slipping buffer area functioning as the buffer area set to perform replacement for the defect occurrence area.

5. The recording apparatus according to claim 4, wherein the control unit secures a recording area obtained by adding at least the slipping buffer area to a recording section of the real data after an occurrence section of a defect, and registers the information of the recording start physical address of the real data, the information of the recording size of the real data, and the information of the size of the slipping buffer area corresponding to the secured recording area as entry information of the spiral management information.

6. The recording apparatus according to claim 5, wherein the control unit:
determines whether a current recording position is within a predetermined distance from an end position of recording area that is managed based on the spiral management information and in which recording is currently performed;
stops recording performed by the recording unit, when the control unit determines that the current recording position is within the predetermined distance from the end position; and
registers, in the defect list, information of a head virtual address and an end virtual address of another remaining data generated by stopping the recording, and information of a head virtual address and an end virtual address of the replacement area secured in the spare area to control the recording unit in a manner that recording of the another remaining data into the replacement area is executed.

7. The recording apparatus according to claim 1, wherein the control unit controls the recording unit in a manner that, for each predetermined section of recording data, the virtual address corresponding to a physical address of the section is stored.

8. The recording apparatus according to claim 1, wherein the control unit controls the recording unit in a manner that, for each recording unit section, the virtual address is stored.

9. The recording apparatus according to claim 1, wherein the optical recording medium has a recording layer provided with a physical address in recording data, and a reference surface provided with a preaddress in forming a position guider, and wherein the light radiating unit radiates laser light to be radiated to a recording layer and laser light to be radiated to a reference surface through a common objective lens, and
wherein the control unit controls the recording unit in a manner that a prespiral corresponding to dummy data is recorded onto a front side of a recording section of real data.

10. The recording apparatus according to claim 9, wherein the control unit generates, as spiral management information, information of a recording start physical address of the prespiral, information of a recording start physical address of the real data, information of a recording size of the real data, and information of a size of a slipping buffer area functioning as the buffer area.

11. The recording apparatus according to claim 10, wherein the control unit secures a recording area obtained by adding a recording section of the prespiral and the slipping buffer area to a recording section of the real data after an occurrence section of a defect, and registers the information of the recording start physical address of the prespiral, the information of the recording start physical address of the real data, the information of the recording size of the real data, and the information of the size of the slipping buffer area of the secured recording area as entry information of the spiral management information.

12. A recording method comprising:
executing a process for replacing a recording area of an optical recording medium with a spare area using a virtual address that corresponds to the spare area, wherein the process is executed in a state in which a logical address space, a virtual address space and a physical address space are defined, wherein the virtual address space is obtained by adding at least the spare area to the logical address space, and wherein the physical address space is obtained by adding a buffer area to the virtual address space,
wherein information of virtual addresses of a replacement source and a replacement area that corresponds to the spare area is registered in a defect list based on the virtual address space, after the replacement area is secured.

13. A reproducing apparatus comprising:
a light radiating unit that radiates light to an optical recording medium, wherein a process for replacing a recording area of the optical recording medium with a spare area is executed using a virtual address that corresponds to the spare area, in a state in which a logical address space, a virtual address space and a physical address space are defined, wherein the virtual address space is obtained by adding at least the spare area to the logical address space, and wherein the physical address space is obtained by adding a buffer area to the virtual address space;
a reproducing unit that reproduces recording information of the optical recording medium based on a light reception signal received in response to the light radiated to the optical recording medium by the light radiating unit; and
a control unit that causes the reproducing unit to execute a reproducing operation based on first relationship information indicating a relationship between a logical address and the virtual address, according to a reproducing instruction based on the logical address,
wherein the control unit registers in a defect list, based on the virtual address space, information of virtual addresses of a replacement source and a replacement area that corresponds to the spare area, after the replacement area is secured.

14. The reproducing apparatus according to claim 13, wherein the defect list associated with information of a head virtual address and an end virtual address of replacement source data and information of a head virtual address and an end virtual address of the replacement area secured in the spare area is recorded on the optical recording medium, and
wherein the control unit causes the reproducing unit to execute the reproducing operation based on the first relationship information and the defect list.

15. The reproducing apparatus according to claim 14, wherein spiral management information is recorded on the optical recording medium, the spiral management information comprising information of a recording start physical address of real data of a recording area set on the optical recording medium, information of a recording size of the real data, and information of a size of a slipping buffer area functioning as the buffer area set to perform replacement after a defect occurrence area, and
wherein the control unit generates second relationship information showing a relationship between the virtual address and the physical address, based on the spiral management information, and causes the reproducing unit to execute the reproducing operation, based on information of the virtual address identified from the first relationship information, information of the defect list, and the second relationship information.

16. A reproducing method, comprising:
performing a reproducing operation on an optical recording medium, wherein a process for replacing a recording area of the optical recording medium with a spare area is executed using a virtual address that corresponds to the spare area, based on first relationship information indicating a relationship between a logical address and the virtual address according to a reproducing instruction based on the logical address,
wherein the process is executed in a state in which a logical address space, a virtual address space, and a physical address space are defined, wherein the virtual address space is obtained by adding at least the spare area to the logical address space, and wherein the physical address space is obtained by adding a buffer area to the virtual address space,
wherein information of virtual addresses of a replacement source and a replacement area that corresponds to the spare area is registered in a defect list based on the virtual address space, after the replacement area is secured.

17. The method according to claim 16, further comprising converting the logical address space to the virtual address space based on the first relationship information.

18. The method according to claim 16, further comprising converting the virtual address space to the physical address space based on second relationship information showing a relationship between the virtual address and a physical address.

* * * * *